United States Patent
Muratani et al.

(10) Patent No.: US 12,298,593 B2
(45) Date of Patent: May 13, 2025

(54) OPTICAL SYSTEM, OPTICAL EQUIPMENT, AND MANUFACTURING METHOD FOR OPTICAL SYSTEM

(71) Applicant: Nikon Corporation, Tokyo (JP)

(72) Inventors: Mami Muratani, Tokyo (JP); Fumiaki Ohtake, Tokyo (JP)

(73) Assignee: Nikon Corporation, Tokyo (JP)

( * ) Notice: Subject to any disclaimer, the term of this patent is extended or adjusted under 35 U.S.C. 154(b) by 1361 days.

(21) Appl. No.: 16/955,671

(22) PCT Filed: Dec. 20, 2018

(86) PCT No.: PCT/JP2018/047010
§ 371 (c)(1),
(2) Date: Sep. 17, 2020

(87) PCT Pub. No.: WO2019/124499
PCT Pub. Date: Jun. 27, 2019

(65) Prior Publication Data
US 2021/0011256 A1    Jan. 14, 2021

(30) Foreign Application Priority Data

Dec. 20, 2017  (JP) ................ 2017-244352
Dec. 20, 2017  (JP) ................ 2017-244353

(51) Int. Cl.
*G02B 9/08*    (2006.01)
*G02B 5/00*    (2006.01)
*G02B 27/00*   (2006.01)

(52) U.S. Cl.
CPC .............. *G02B 9/08* (2013.01); *G02B 5/005* (2013.01); *G02B 27/0025* (2013.01)

(58) Field of Classification Search
CPC . G02B 5/005; G02B 9/08; G02B 9/64; G02B 13/04; G02B 15/143503; G02B 27/0025
See application file for complete search history.

(56) References Cited

U.S. PATENT DOCUMENTS 5,751,485 A    5/1998  Suzuki
2014/0176782 A1  6/2014  Yokoyama
(Continued)

FOREIGN PATENT DOCUMENTS

JP   H07-152001 A   6/1995
JP   H11-316341 A   11/1999
(Continued)

OTHER PUBLICATIONS

International Search Report from International Patent Application No. PCT/JP2018/047010, Apr. 2, 2019.
(Continued)

*Primary Examiner* — Jack Dinh
(74) *Attorney, Agent, or Firm* — Potomac Law Group, PLLC

(57) ABSTRACT

An optical system comprises, in order from an object side, a front group GF having positive refractive power, an aperture stop S and a rear group GR. The front group FR comprises a front focusing group GFF having positive refractive power, and the rear group GR comprises a rear focusing group GRF having positive refractive power, upon focusing the front focusing group GFF and the rear focusing group GRF being moved toward the object side, and a predetermined condition being satisfied. Thus, an optical system having a superb optical performance, an optical equipment equipped therewith and a manufacturing method for the optical system are provided.

29 Claims, 26 Drawing Sheets

(56) References Cited

U.S. PATENT DOCUMENTS

2016/0178875 A1 6/2016 Matsumura et al.
2017/0031071 A1 2/2017 Ishibashi

FOREIGN PATENT DOCUMENTS

| JP | 2014-123018 A | 7/2014 |
| JP | 2016-021011 A | 2/2016 |
| JP | 2016-118770 A | 6/2016 |
| JP | 2017-026962 A | 2/2017 |
| JP | 2017-156432 A | 9/2017 |

OTHER PUBLICATIONS

Office Action issued Mar. 9, 2021, in Japanese Patent Application No. 2017-244353.
Office Action issued Sep. 7, 2021, in Japanese Patent Application No. 2017-244352.
Notification issued Aug. 5, 2021, in Chinese Patent Application No. 201880081941.9.
Office Action issued Feb. 8, 2022, in Chinese Patent Application No. 201880081941.9.

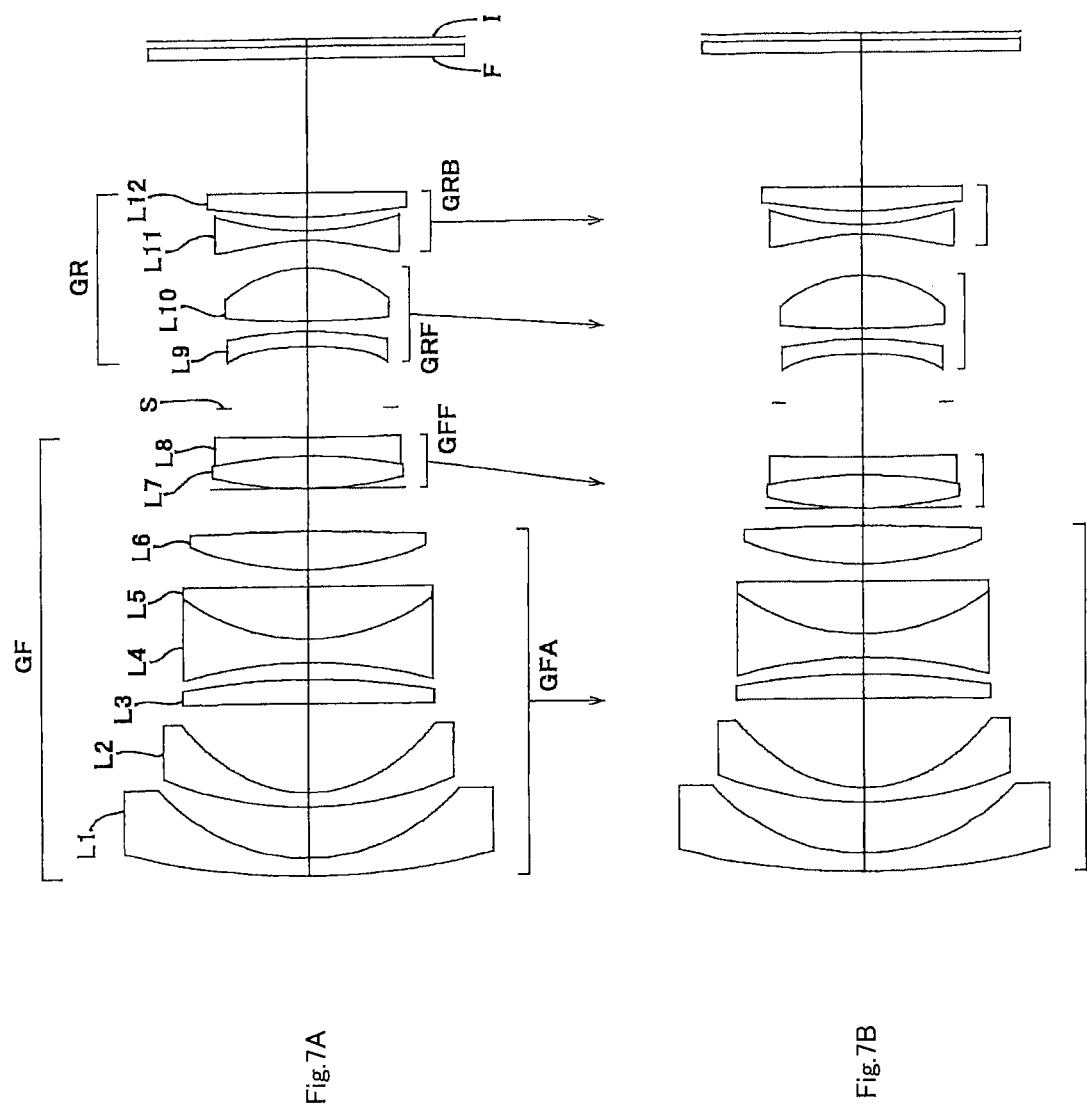

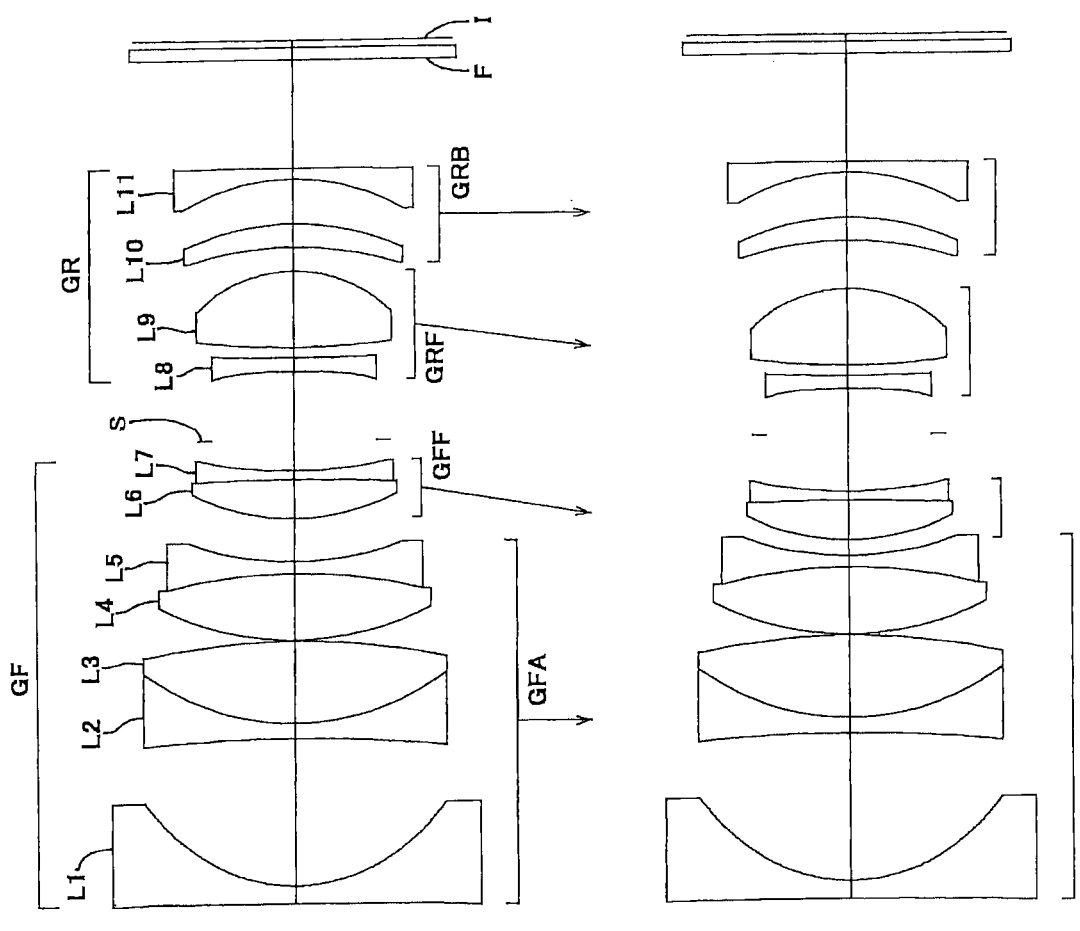

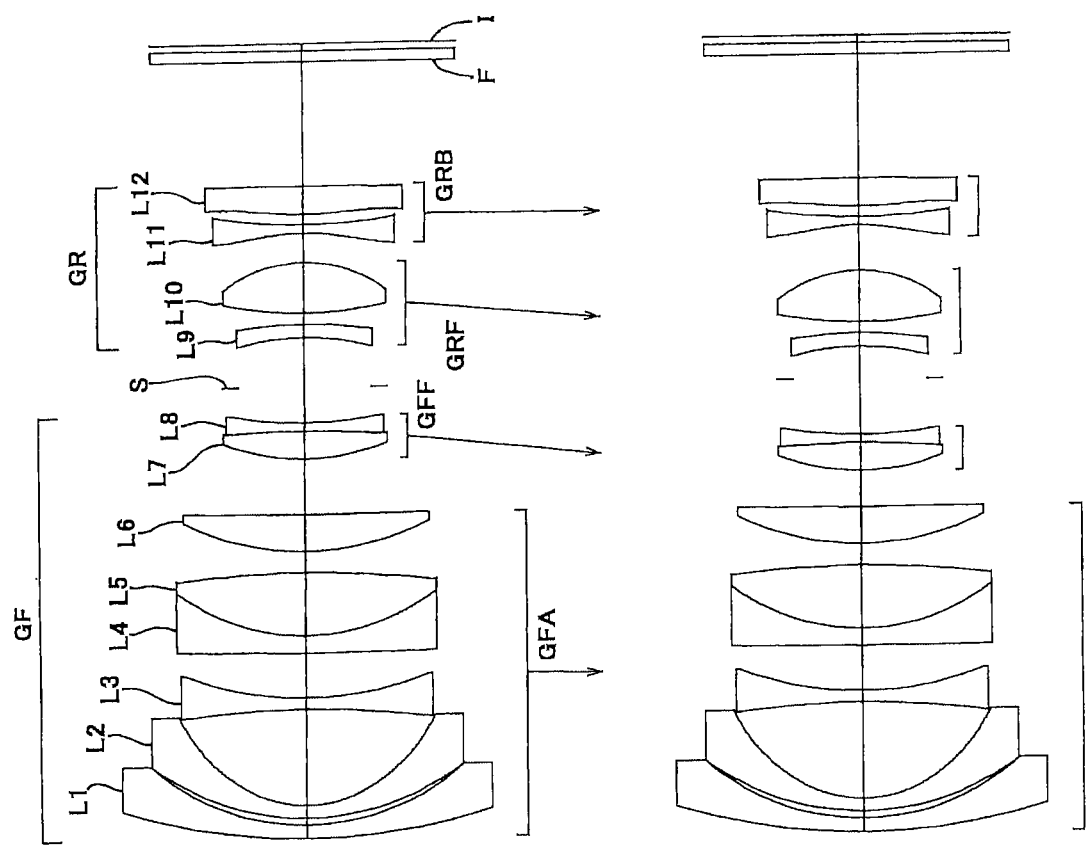

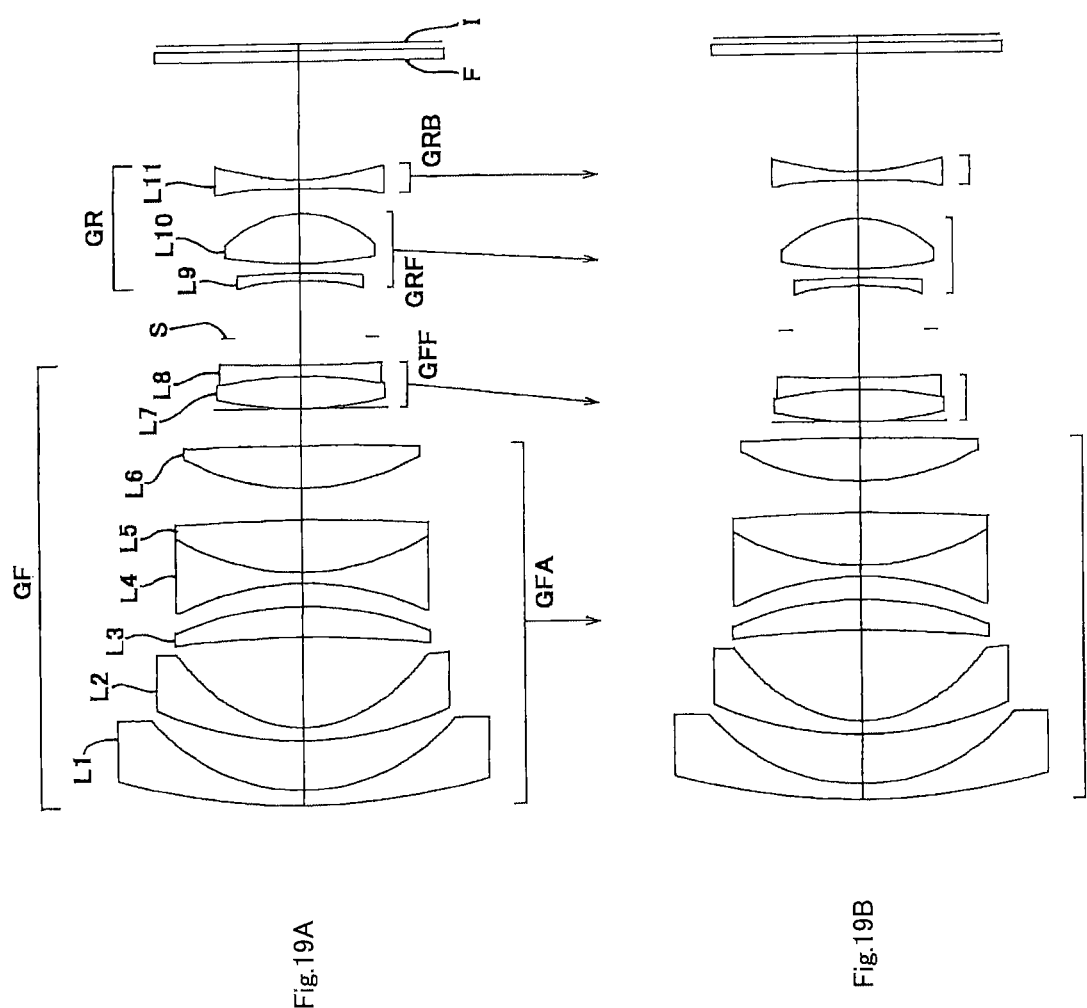

OPTICAL SYSTEM, OPTICAL EQUIPMENT, AND MANUFACTURING METHOD FOR OPTICAL SYSTEM

TECHNICAL FIELD

The present invention relates to an optical system, an optical equipment and a manufacturing method for the optical system.

BACKGROUND ART

There has been proposed, as a focusing type of an optical system, a rear focusing type in which an image side lens group in the optical system is moved, or an inner focusing type in which an intermediate lens group in the optical system is moved. For example, refer to Japanese Patent Application Laid Open No. 2014-123018. However, there has been a problem that, in a large diameter lens whose an F-number is small and which is apt to easily generate various aberrations, variations in aberrations caused due to lens group movement are large.

PRIOR ART REFERENCE

Patent Document

Patent Document 1: Japanese Patent Application Laid-Open Gazette No. 2014-123018.

SUMMARY OF THE INVENTION

According to a first aspect of the present invention, there is provided an optical system comprising, in order from an object side, a front group having positive refractive power, an aperture stop, and a rear group; said front group comprising a front focusing group having positive refractive power;

said rear group comprising a rear focusing group having positive refractive power;

upon carrying out focusing, said front focusing group and said rear focusing group being moved toward the object side; and the following conditional expression being satisfied:

$$0.250 < XRF/XFF < 1.500$$

where XFF denotes an amount of movement of said front focusing group at the time of carrying out focusing from an infinitely distant object to a closely distant object; and XRF denotes an amount of movement of said rear focusing group at the time of carrying out focusing from the infinitely distant object to the closely distant object.

According to a second aspect of the present invention, there is provided an optical system comprising, in order from an object side, a front group having positive refractive power, an aperture stop, and a rear group having positive refractive power;

said front group comprising, in order from the object side, a positive lens group having positive refractive power and a front focusing group having positive refractive power;

said rear group comprising, in order from the object side,
a rear focusing group having positive refractive power and a negative lens group having negative refractive power;

upon carrying out focusing, said front focusing group and said rear focusing group being moved in the direction of the optical axis; and a lens located at a most object side having negative refractive power.

According to a third aspect of the present invention, there is provided a manufacturing method for an optical system configuring to comprise, in order from an object side, a front group having positive refractive power, an aperture stop, and a rear group;

for said front group to comprise a front focusing group having positive refractive power;

for said rear group to comprise a rear focusing group having positive refractive power;

upon carrying out focusing, for said front focusing group and said rear focusing group to be moved toward the object side; and for the following conditional expression to be satisfied:

$$0.250 < XRF/XFF < 1.500$$

where XFF denotes an amount of movement of said front focusing group at the time of carrying out focusing from an infinitely distant object to a closely distant object; and XRF denotes an amount of movement of said rear focusing group at the time of carrying out focusing from the infinitely distant object to the closely distant object.

According to a fourth aspect of the present invention, there is provided a manufacturing method for an optical system configuring to comprise, in order from an object side, a front group having positive refractive power, an aperture stop, and a rear group having positive refractive power;

for said front group to comprise, in order from the object side, a positive lens group having positive refractive power and a front focusing group having positive refractive power;

for said rear group to comprise, in order from the object side, a rear focusing group having positive refractive power and a negative lens group having negative refractive power;

upon carrying out focusing, for said front focusing group and said rear focusing group to be moved in the direction of the optical axis; and for a most object side lens to have negative refractive power.

BRIEF DESCRIPTION OF THE DRAWINGS

FIG. 7 is a sectional view showing an optical system according to a Fourth Example.

FIG. 15 is a sectional view showing an optical system according to an Eighth Example.

FIG. 17 is a sectional view showing an optical system according to a Ninth Example.

FIG. 19 is a sectional view showing an optical system according to a Tenth Example.

EMBODIMENTS FOR CARRYING OUT THE INVENTION

Figure 1:
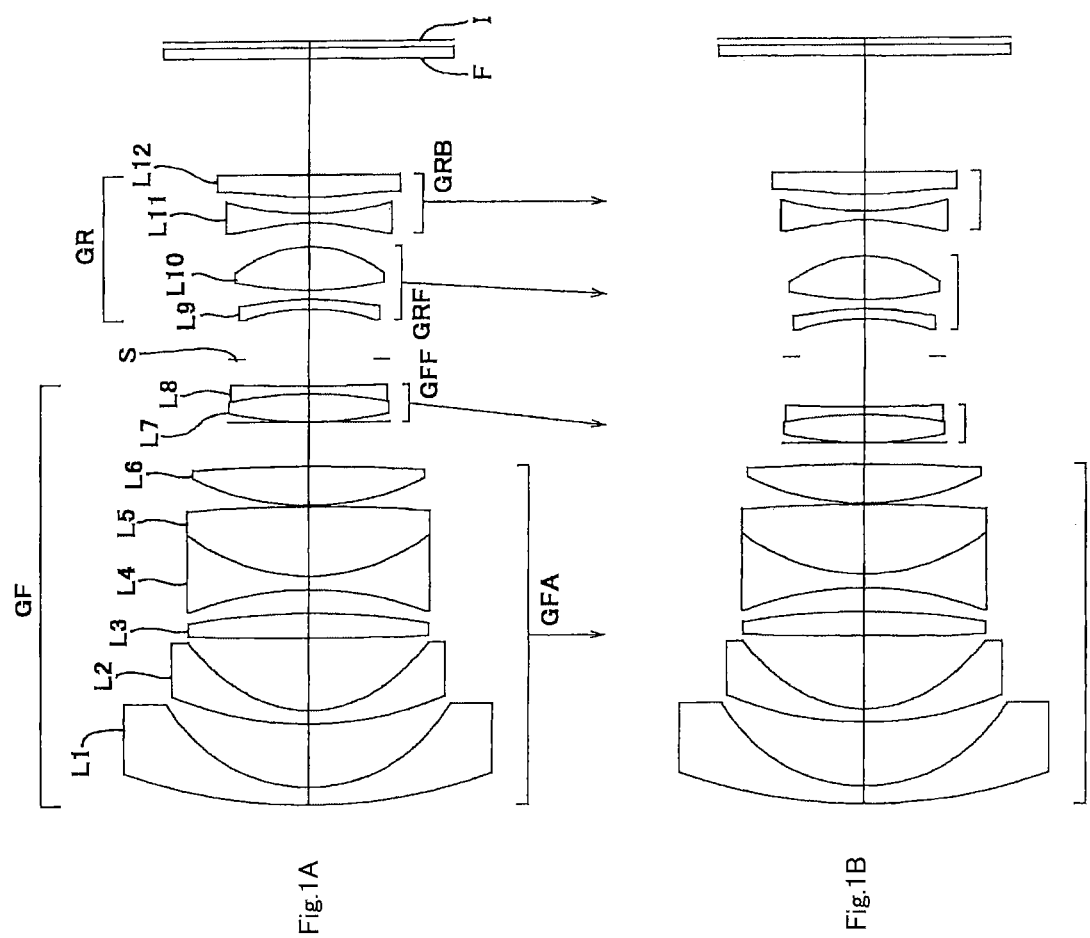
FIG. 1 is a sectional view showing an optical system according to a First Example.

Next, an optical system, an optical equipment and a manufacturing method for the optical system according to a first embodiment, will be explained.

The optical system according to the present embodiment comprises, in order from an object side, a front group having positive refractive power, an aperture stop, and a rear group;

said front group comprising a front focusing group having positive refractive power;

said rear group comprising a rear focusing group having positive refractive power;

upon carrying out focusing on at least a portion from an infinitely distant object to a closely distant object, said front focusing group and said rear focusing group being moved toward the object side; and the following conditional expression (1-1) being satisfied:

$$0.250 < XRF/XFF < 1.500 \tag{1-1}$$

where XFF denotes an amount of movement of said front focusing group at the time of carrying out focusing from an infinitely distant object to a closely distant object; and XRF denotes an amount of movement of said rear focusing group at the time of carrying out focusing from the infinitely distant object to the closely distant object.

In a conventional retrofocus type wide angle lens, in a case where a focusing group is a lens group located on an image side of an aperture stop, it is necessary to move largely toward an object side so as to suppress displacement of image plane.

In an optical system according to the present embodiment, it is so configured that a positive lens group disposed at an object side of the aperture stop and a positive lens group disposed at an image side of the aperture stop are made to be focusing groups to be moved toward the image side and carry out focusing, and thus it is possible to suppress variations in various aberrations upon carrying out focusing and, in particular, correct superbly spherical aberration and curvature of field. Further, the two focusing groups can be respectively made to be reduced in weight, and high speed focusing operation can be attained.

The conditional expression (1-1) defines an appropriate range of amounts of movement of the two focusing groups at the time when focusing is carried out. Incidentally, amount of movement of a focusing group toward the object side is assumed to be positive. This is applied also to the conditional expression (1-7) described later.

When the value of XRF/XFF is equal to or falls below the lower limit of the conditional expression (1-1), refractive power of the rear focusing group becomes too large and it becomes impossible to correct sufficiently spherical aberration, coma aberration and others. Meanwhile, in order to ensure the advantageous effect of the present embodiment, it is preferable to set the lower limit value of the conditional expression (1-1) to 0.300. It is more preferable to set the lower limit value to 0.350, 0.400 and 0.450.

On the other hand, when the value of XRF/XFF is equal to or exceeds the upper limit value of the conditional expression (1-1), refractive power of the rear focusing group becomes too small and it becomes impossible to secure sufficient performance at the time when focusing on an extremely closely distant object is carried out. And, correction of curvature of field becomes insufficient. Meanwhile, in order to ensure the advantageous effect of the present embodiment, it is preferable to set the upper limit value of the conditional expression (1-1) to 1.400. It is more preferable to set the upper limit value to 1.300, 1.200, 1.100, 1.000, and 0.900.

According to the above described configuration, it is possible to realize an optical system which is suitable to be used for a mirror-less camera, and in which focusing group(s) be reduced in weight and which has (have) excellent optical performance(s) that variations in various aberrations are reduced.

Further, it is desirable that, in the optical system according to the present embodiment, said aperture stop is fixed in position upon carrying out focusing. With taking this configuration, it is possible to correct superbly various aberrations such as spherical aberration and coma aberration, and also it is possible to suppress variations in those various aberrations upon carrying out focusing.

In the optical system according to the present embodiment, it is preferable that the following conditional expression (1-2) is satisfied:

$$0.400 < Bf/f < 2.000 \tag{1-2}$$

where Bf denotes a distance from an image side lens surface of a lens located on the most image side upon focusing on an infinitely distant object to the image plane, in other words, a back focus; and f denotes a focal length of said optical system upon focusing on the infinitely distant object.

The conditional expression (1-2) defines an appropriate range of the back focus and the focal length of the entire optical system. Meanwhile, in a case where a parallel plate such as a filter is disposed in the optical system, the back focus in the conditional expression (1-2), is an air converted value calculated where the parallel plate is converted to an air. This is same also with respect to ST, TL and Bf in the conditional expressions (1-3), (1-6) and (1-13) described later.

When the value of Bf/f is equal to or exceeds the upper limit value of the conditional expression (1-2), the back focus becomes large and, though telecentricity being maintained, the optical system in the entirety thereof becomes large. Further, if it is intended to prevent a front lens group from being enlarged with following to enlargement of the system, it becomes difficult to correct distortion and the like. Meanwhile, in order to ensure the advantageous effect of the present embodiment, it is preferable to set the upper limit value of the conditional expression (1-2) to 1.900. It is more preferable to set the upper limit value to 1.800, 1.700, 1.600, 1.500, 1.400, 1.300, 1.200, and 1.100.

On the other hand, when the value of Bf/f is equal to or falls below the lower limit value of the conditional expression (1-2), position of the exit pupil is displaced toward the object side. For this reason, shading becomes apparent, and in particular resolution in the periphery of the image view would be deteriorated. Meanwhile, in order to ensure the advantageous effect of the present embodiment, it is preferable to set the lower limit value of the conditional expression (1-2) to 0.450. It is more preferable to set the lower limit value to 0.500, 0.550, 0.600, and 0.700.

In the optical system according to the present embodiment, it is preferable that the following conditional expression (1-3) is satisfied:

$$0.100 < ST/TL < 0.600 \quad (1\text{-}3)$$

where ST denotes a distance from said aperture stop to the image plane at the time when an infinitely distant object is focused; and TL denotes a distance from an object side lens surface of said most object side lens to the image plane at the time when the infinitely distant object is focused, that is, a whole length of the optical system.

The conditional expression (1-3) is the conditional expression that defines an appropriate range of the distance from the aperture stop to the image plane and the whole length of the optical system and assumes position of the exit pupil from position of the aperture stop in the optical system.

When the value of ST/TL is equal to or exceeds the upper limit value of the conditional expression (1-3), the whole length of the optical system becomes large, though telecentricity being maintained, so it is impossible to make the optical system small in size. If it is intended to make the front lens group small in diameter in the state where the whole length of the optical system has been increased, it becomes impossible to correct sufficiently distortion and the like. Meanwhile, in order to ensure the advantageous effect of the present embodiment, it is preferable to set the upper limit value of the conditional expression (1-3) to 0.570. It is more preferable to set the upper limit value to 0.550, 0.530, 0.500, 0.480 and 0.460.

On the other hand, when the value of ST/TL is equal to or falls below the lower limit value of the conditional expression (1-3), the aperture stop is disposed at a more object side than its appropriate position. For this configuration, light rays can not be shaded uniformly by the aperture stop, and point image upon stopping down the aperture is distorted and peripheral light reduction is deteriorated. Further, it becomes difficult to correct chromatic aberration of magnification also. Meanwhile, in order to ensure the advantageous effect of the present embodiment, it is preferable to set the lower limit value of the conditional expression (1-3) to 0.120. It is more preferable to set the lower limit value to 0.140, 0.170, 0.200, 0.250, 0.300 and 0.350.

Further, in the optical system according to the present embodiment, it is desirable that the following conditional expression (1-4) is satisfied:

$$0.200 < \beta RF/\beta FF < 1.100 \quad (1\text{-}4)$$

where $\beta FF$ denotes a magnification of said front focusing group; and $\beta RF$ denotes a magnification of said rear focusing group.

The conditional expression (1-4) is a conditional expression that defines an appropriate range of the front focusing group and the rear focusing group.

When the value of $\beta RF/\beta FF$ is equal to or exceeds the upper limit value of the conditional expression (1-4), refractive power of the rear focusing group becomes too large, and it becomes impossible to correct sufficiently spherical aberration, coma aberration and the like. Meanwhile, in order to ensure the advantageous effect of the present embodiment, it is preferable to set the upper limit value of the conditional expression (1-4) to 1.000.

It is more preferable to set the upper limit value to 0.950, 0.900, 0.850, 0.800, 0.750 and 0.700.

On the other hand, when the value of $\beta RF/\beta FF$ is equal to or falls below the lower limit value of the conditional expression (1-4), refractive power of the rear focusing group becomes too small, and it becomes impossible to obtain magnification required for focusing. For this reason, it is not possible to secure sufficient performance for conducting focusing on very close distance object, and correction of curvature of field becomes insufficient. Meanwhile, in order to ensure the advantageous effect of the present embodiment, it is preferable to set the lower limit value of the conditional expression (1-4) to 0.220. It is more preferable to set the lower limit value to 0.240, 0.260, 0.280, 0.300, 0.320, 0.350 and 0.370.

Further, it is desirable that, in the optical system according to the present embodiment, a lens group located at a most object side at the time when focusing is carried out, is fixed in position. With taking this configuration, variation in image magnification upon conducting focusing is small, and excellent image can be obtained, and mechanical configuration of the optical system according to the present embodiment may be simplified.

Further, it is desirable that, in the optical system according to the present embodiment, a lens group located at a most object side at the time when focusing is carried out, is fixed in position. With taking this configuration, it is possible to secure a back focus having appropriate length and sufficient distance for exit pupil, so mechanical configuration of the optical system according to the present embodiment may be simplified.

Further, it is desirable that, in the optical system according to the present embodiment, said front focusing group comprises at least one positive lens and at least one negative lens. With this configuration, various aberrations such as chromatic aberration of magnification and the like can be corrected superbly.

Further, it is desirable that, in the optical system according to the present embodiment, said rear focusing group comprises at least one positive lens and at least one negative lens. With this configuration, various aberrations such as chromatic aberration of magnification and the like can be corrected superbly.

Further, it is desirable that, in the optical system according to the present embodiment, said rear group comprises, in order from the object side, said rear focusing group, and a negative lens group having negative refractive power. With this configuration, various aberrations such as spherical aberration, curvature of field and the like can be corrected superbly, and also variations in those various aberrations upon conducting focusing can be suppressed. Furthermore, when the optical system according to the embodiment is mounted on a camera, light rays can be led to the imaging device effectively.

Further, in the optical system according to the present embodiment, it is desirable that the following conditional expression (1-5) is satisfied:

$$0.800<(-fRB)/f<10.000 \tag{1-5}$$

where fRB denotes a focal length of said negative lens group; and f denotes a focal length of said optical system upon focusing on the infinitely distant object.

The conditional expression (1-5) defines a focal length of the negative lens group and a focal length of the whole optical system.

When the value of (−fRB)/f is equal to or exceeds the upper limit value of the conditional expression (1-5), refractive power of the negative lens group becomes too small, and the back focus becomes too large, so the optical system becomes enlarged. Moreover, it becomes impossible to correct sufficiently coma aberrations and the like. Meanwhile, in order to ensure the advantageous effect of the present embodiment, it is preferable to set the upper limit value of the conditional expression (1-5) to 9.000.

It is more preferable to set the upper limit value to 8.000, 7.000, 6.000, and 5.000.

On the other hand, when the value of (−fRB)/f is equal to or falls below the lower limit value of the conditional expression (1-5), refractive power of the negative lens group becomes too large. Accordingly, it becomes not possible to secure sufficient distance of the exit pupil. Also, it becomes not possible to correct sufficiently distortion and the like. Meanwhile, in order to ensure the advantageous effect of the present embodiment, it is preferable to set the lower limit value of the conditional expression (1-5) to 1.000. It is more preferable to set the lower limit value to 1.200, 1.400, 1.600, 1.800 and 2.000.

In the optical system according to the present embodiment, it is desirable that the following conditional expression (1-6) is satisfied:

$$0.060<Bf/TL<0.650 \tag{1-6}$$

where Bf denotes a distance from an image side lens surface of a lens located on the most image side upon focusing on an infinitely distant object to the image plane; and TL denotes a distance from an object side lens surface of a lens located on the most object side upon focusing on the infinitely distant object to the image plane.

The conditional expression (1-6) defines the back focus and the whole length of the optical system, and assumes an approximate position of the exit pupil. The optical system according to the present embodiment, satisfying the conditional expression (1-6), is advantageous for making the optical system large in angle of view and small in size, since displacement of the exit pupil to the image side is relatively small even if the whole length is made small.

When the value of Bf/TL is equal to or exceeds the upper limit value of the conditional expression (1-6), the back focus becomes too large and the optical system in the entirety thereof becomes large in size. Alternatively, the whole length of the optical system becomes too small, and it becomes difficult to correct spherical aberration and coma aberration.

Meanwhile, in order to ensure the advantageous effect of the present embodiment, it is preferable to set the upper limit value of the conditional expression (1-6) to 0.600. It is more preferable to set the upper limit value to 0.550, 0.500, 0.480, 0.430, 0.400, 0.370 and 0.300.

On the other hand, when the value of Bf/TL is equal to or falls below the lower limit value of the conditional expression (1-6), position of the exit pupil becomes too close to the image plane, which causes shading or vignetting of light rays. If it is intended to prevent this phenomenon, it might be difficult to correct off-axis aberration, in particular coma aberration, so it is not preferable. Meanwhile, in order to ensure the advantageous effect of the present embodiment, it is preferable to set the lower limit value of the conditional expression (1-6) to 0.070. It is more preferable to set the lower limit value to 0.080, 0.090, 0.100, and 0.110.

Further, in the optical system according to the present embodiment, it is desirable that the following conditional expression (1-7) is satisfied:

$$0.010<XRF/f<0.240 \tag{1-7}$$

where XRF denotes an amount of movement of said rear focusing group at the time of carrying out focusing from the infinitely distant object to the closely distant object; and f denotes the focal length of said optical system upon focusing on the infinitely distant object.

The conditional expression (1-7) is a conditional expression which defines an appropriate range of amounts of movement of the rear focusing group by the focal length of said optical system.

When the value of XRF/f is equal to or exceeds the upper limit value of the conditional expression (1-7), refractive power of the rear focusing group becomes too small and it becomes impossible to secure sufficient performance at the time when focusing of an extremely closely distant object is carried out, inviting shortage of correction of curvature of field. Meanwhile, in order to ensure the advantageous effect of the present embodiment, it is preferable to set the upper limit value of the conditional expression (1-7) to 0.220. It is more preferable to set the upper limit value to 0.200, 0.180, and 0.150.

On the other hand, when the value of XRF/f is equal to or falls below the lower limit value of the conditional expression (1-7), refractive power of the rear focusing group becomes too large and it becomes impossible to correct sufficiently spherical aberration, coma aberration, and the like. Meanwhile, in order to ensure the advantageous effect of the present embodiment, it is preferable to set the lower limit value of the conditional expression (1-7) to 0.013. It is more preferable to set the lower limit value to 0.016, 0.019, 0.022, 0.024, 0.030 0.040 and 0.050.

Further, in the optical system according to the present embodiment, it is desirable that, in the optical system according to the present embodiment, a lens disposed at a most object side has negative refractive power. In such a retrofocus type optical system whose front lens group in the entirety thereof has positive refractive power, the most object side lens group can be made compact while securing large angle of view, and the entire length can be reduced while ensuring appropriate back focus.

Further, it is desirable that, in the optical system according to the present embodiment, said rear focusing group has positive refractive power. With this configuration, it is possible to correct superbly various aberrations, such as spherical aberration and curvature of field, and also it is possible to suppress variations in aberrations upon carrying out focusing.

Further, in the optical system according to the present embodiment, it is desirable that the following conditional expression (1-8) is satisfied:

$$0.010<fRF/fFF<0.900 \tag{1-8}$$

where fFF denotes a focal length of said front focusing group; and fRF denotes a focal length of said rear focusing group.

The conditional expression (1-8) is an appropriate allocation of refractive powers of the two focusing groups expressed by the ratio of focal lengths.

When the value of fRF/fFF is equal to or falls below the lower limit value of the conditional expression (1-8), refractive power of the front focusing group becomes too small. Accordingly, a stroke of the front focusing group upon carrying out focusing becomes too large so that the front focusing group would interfere with the positive lens group, or it could not be possible to correct sufficiently curvature of field. Meanwhile, in order to ensure the advantageous effect of the present embodiment, it is preferable to set the lower limit value of the conditional expression (1-8) to 0.015. It is more preferable to set the lower limit value to 0.020, and 0.024.

On the other hand, when the value of fRF/fFF is equal to or exceeds the upper limit value of the conditional expression (1-8), refractive power of the rear focusing grope becomes too large, and it becomes difficult to correct spherical aberration and the like. Meanwhile, in order to ensure the advantageous effect of the present embodiment, it is preferable to set the upper limit value of the conditional expression (1-8) to 0.700. It is more preferable to set the upper limit value to 0.500, 0.400, 0.300 and 0.250.

Further, in the optical system according to the present embodiment, it is desirable that the following conditional expression (1-9) is satisfied:

$$0.300 < fF/fR < 1.300 \quad (1\text{-}9)$$

where fF denotes a focal length of said front group upon focusing on an infinitely distant object; and fR denotes a focal length of said rear group upon focusing on the infinitely distant object.

The conditional expression (1-9) is a conditional expression that defines an allocation of refractive powers of the front group and the rear group.

When the value of fF/fR is equal to or exceeds the upper limit value of the conditional expression (1-9), refractive power of the rear group becomes too large, and it becomes impossible to correct sufficiently spherical aberration, coma aberrations and the like. Meanwhile, in order to ensure the advantageous effect of the present embodiment, it is preferable to set the upper limit value of the conditional expression (1-9) to 1.200. It is more preferable to set the upper limit value to 1.150, 1.100, 1.050, 1.000, 0.950, 0.900, 0.850, and 0.800.

On the other hand, when the value of fF/fR is equal to or falls below the lower limit value of the conditional expression (1-9), refractive power of the rear group becomes too small, and it becomes not possible to secure a magnification required for carrying out focusing. Accordingly, it is not possible to secure performance enough to carry out focusing on an extremely close distance object, so curvature of field could not be corrected sufficiently. Meanwhile, in order to ensure the advantageous effect of the present embodiment, it is preferable to set the lower limit value of the conditional expression (1-9) to 0.330. It is more preferable to set the lower limit value to 0.350, 0.380, 0.400, 0.430, 0.450, 0.480 and 0.500.

Further, it is desirable that, in the optical system according to the present embodiment, said front group comprises, in order from the object, a positive lens group having positive refractive power, and said front focusing group. With this configuration, it is possible to correct superbly various aberrations, such as spherical aberration and curvature of field, and also it is possible to suppress variations in those aberrations upon carrying out focusing.

In the optical system according to the present embodiment, it is desirable that the following conditional expression (1-10) is satisfied:

$$0.010 < fFA/fFF < 0.750 \quad (1\text{-}10)$$

where fFA denotes a focal length of said positive lens group; and fFF denotes a focal length of said front focusing group.

The conditional expression (1-10) is a conditional expression that defines the focal length of the front focusing group and the focal length of the positive lens group.

When the value of fFA/fFF is equal to or exceeds the upper limit value of the conditional expression (1-10), refractive power of the front focusing group becomes too large, and it becomes difficult to correct sufficiently chromatic aberration of magnification and the like. Meanwhile, in order to ensure the advantageous effect of the present embodiment, it is preferable to set the upper limit value of the conditional expression (1-10) to 0.700.

It is more preferable to set the upper limit value to 0.650, 0.600, 0.550, 0.500, 0.450, 0.400, 0.350, 0.300 and 0.250.

On the other hand, when the value of fFA/fFF is equal to or falls below the lower limit value of the conditional expression (1-10), refractive power of the front focusing group becomes too small, and it becomes difficult to correct curvature of field and the like. Meanwhile, in order to ensure the advantageous effect of the present embodiment, it is preferable to set the lower limit value of the conditional expression (1-10) to 0.015. It is more preferable to set the lower limit value to 0.020, 0.025, 0.030, 0.035, 0.040, 0.045, 0.050, 0.060, 0.070 and 0.080.

In the optical system according to the present embodiment, it is desirable that the following conditional expression (1-11) is satisfied:

$$0.010 < f/fFF < 0.300 \quad (1\text{-}11)$$

where f denotes a focal length of said optical system upon focusing on an infinitely distant object; and fFF denotes a focal length of said front focusing group.

The conditional expression (1-11) defines the focal length of the front focusing group and the focal length of the entire optical system.

When the value of f/fFF is equal to or exceeds the upper limit value of the conditional expression (1-11), refractive power of the front focusing group becomes too large, and it becomes difficult to correct chromatic aberration of magnification and the like. Meanwhile, in order to ensure the advantageous effect of the present embodiment, it is preferable to set the upper limit value of the conditional expression (1-11) to 0.280. It is more preferable to set the upper limit value to 0.250, 0.230, 0.200, 0.180, 0.160, 0.140, 0.120, 0.100 and 0.080.

On the other hand, when the value of f/fFF is equal to or falls below the lower limit value of the conditional expression (1-11), refractive power of the front focusing group becomes too small, and it becomes difficult to correct curvature of field and the like. Meanwhile, in order to ensure the advantageous effect of the present embodiment, it is preferable to set the lower limit value of the conditional expression (1-11) to 0.012. It is more preferable to set the lower limit value to 0.014, 0.016, 0.017, 0.020, 0.025, 0.030 and 0.035.

Further, in the optical system according to the present embodiment, it is desirable that the following conditional expression (1-12) is satisfied:

$$0.300 < f/fRF < 1.100 \quad (1\text{-}12)$$

where f denotes a focal length of said optical system upon focusing on the infinitely distant object; and fRF denotes a focal length of said rear focusing group.

The conditional expression (1-12) defines the focal length of the rear focusing group and the focal length of the whole optical system.

When the value of f/fRF is equal to or exceeds the upper limit value of the conditional expression (1-12), refractive power of the rear focusing group becomes too small, and a stroke of the rear focusing group upon carrying out focusing becomes too large, so the optical system becomes enlarged, or it becomes difficult to correct sufficiently curvature of field. Meanwhile, in order to ensure the advantageous effect of the present embodiment, it is preferable to set the upper limit value of the conditional expression (1-12) to 1.050. It is more preferable to set the upper limit value to 1.000, 0.950, 0.900, and 0.850.

On the other hand, when the value of f/fRF is equal to or falls below the lower limit value of the conditional expression (1-12), refractive power of the rear focusing group becomes too large. Accordingly, it becomes difficult to correct spherical aberration and the like. Meanwhile, in order to ensure the advantageous effect of the present embodiment, it is preferable to set the lower limit value of the conditional expression (1-12) to 0.350. It is more preferable to set the lower limit value to 0.400, 0.450, 0.500, 0.550, and 0.600.

In the optical system according to the present embodiment, it is desirable that the following conditional expression (1-13) is satisfied:

$$0.800 < TL/(Fno \cdot Bf) < 6.000 \quad (1\text{-}13)$$

where TL denotes a distance from an object side lens surface of a lens located on the most object side upon focusing on the infinitely distant object to the image plane; Fno denotes a full open F-number of said optical system; and Bf denotes a distance from an image side lens surface of a lens located on the most image side upon focusing on the infinitely distant object to the image plane.

The conditional expression (1-13) is a conditional expression showing an optimum balance between the whole length and the back focus of the optical system in order to make the optical system to a bright wide angle lens.

When the value of TL/(Fno·Bf) is equal to or exceeds the upper limit value of the conditional expression (1-13), the whole length of the optical system becomes large and the optical system in the entirety thereof becomes large in size. Alternatively, the F-number of the optical system becomes small, and it becomes difficult to correct spherical aberration.

Meanwhile, in order to ensure the advantageous effect of the present embodiment, it is preferable to set the upper limit value of the conditional expression (1-13) to 5.500. It is more preferable to set the upper limit value to 5.000, 4.500, 4.300, 4.100, 4.000, 3.800, and 3.600.

On the other hand, when the value of TL/(Fno·Bf) is equal to or falls below the lower limit value of the conditional expression (1-13), the whole length of the optical system becomes too small, and it becomes difficult to correct coma aberration and the like. Meanwhile, in order to ensure the advantageous effect of the present embodiment, it is preferable to set the lower limit value of the conditional expression (1-13) to 0.900. It is more preferable to set the lower limit value to 1.000, 1.100, 1.300, 1.500, 1.800, 2.000, 2.200 and 2.500.

Further, in the optical system according to the present embodiment, it is desirable that the following conditional expression (1-14) is satisfied:

$$|Ainf - Amod|/f < 0.070 \quad (1\text{-}14)$$

where Ainf denotes a half angle of view (unit"°") of said optical system upon focusing on an infinitely distant object; and Amod denotes a half angle of view (unit "°") of said optical system upon focusing on an extremely close distant object.

The conditional expression (1-14) is a conditional expression that defines a ratio of an angle of incident of light rays upon focusing on an infinitely distant object with an angle of incident of light rays upon focusing on an extremely close distant object, thereby assuming variation in image magnification upon carrying out focusing.

When the value of |Ainf-Amod|/f is equal to or exceeds the upper limit value of the conditional expression (1-14), image magnification varies upon carrying out focusing, and it becomes impossible to obtain excellent image. Meanwhile, in order to ensure the advantageous effect of the present embodiment, it is preferable to set the upper limit value of the conditional expression (1-14) to 0.065.

It is more preferable to set the upper limit value to 0.060, 0.055, 0.050, 0.045, and 0.040.

Further, in the optical system according to the present embodiment, it is desirable that said front focusing group consists of one positive lens and one negative lens; and the following conditional expression (1-15) is satisfied:

$$30.00 < vFFp - vFFn < 75.00 \quad (1\text{-}15)$$

where vFFp denotes an Abbe number of said positive lens in said front focusing group for d-line (wave length λ=587.6 nm) ; and vFFn denotes an Abbe number of said negative lens in said front focusing group for d-line (wave length λ=587.6 nm).

The conditional expression (1-15) defines a formula relating to dispersions of the positive lens and the negative lens included in the front focusing group. The optical system according to the present embodiment can correct chromatic aberration superbly by satisfying the conditional expression (1-15).

Meanwhile, in order to ensure the advantageous effect of the present embodiment, it is preferable to set the upper limit value of the conditional expression (1-15) to 70.00. It is more preferable to set the upper limit value to 65.00, 61.00, 58.00, and 56.00.

Meanwhile, in order to ensure the advantageous effect of the present embodiment, it is preferable to set the lower limit value of the conditional expression (1-15) to 35.00. It is more preferable to set the lower limit value to 40.00, 45.00 and 50.00.

Further, in the optical system according to the present embodiment, it is desirable that the following conditional expression (1-16) is satisfied:

$$-1.000 < (FFr2 + FFr1)/(FFr2 - FFr1) < 2.000 \quad (1\text{-}16)$$

where FFr1 denotes a radius of curvature of an object side lens surface of a positive lens located at a most image side in said front focusing group; and FFr2 denotes a radius of curvature of an image side lens surface of the positive lens located at the most image side in said front focusing group.

The conditional expression (1-16) is a conditional expression defining a shape factor of the positive lens located at the most image side in the front focusing group.

When the value of (FFr2+FFr1)/(FFr2−FFr1) is equal to or exceeds the upper limit value of the conditional expression (1-16), curvature of the object side lens surface of the said positive lens becomes large, and it becomes difficult to correct spherical aberration. Meanwhile, in order to ensure the advantageous effect of the present embodiment, it is preferable to set the upper limit value of the conditional expression (1-16) to 1.500. It is more preferable to set the upper limit value to 1.300, 1.000, 0.900, 0.800, 0.700 and 0.600.

On the other hand, when the value of (FFr2+FFr1)/(FFr2−FFr1) is equal to or falls below the lower limit value of the conditional expression (1-16), it becomes difficult to correct coma aberration and the like. Meanwhile, in order to ensure the advantageous effect of the present embodiment, it is preferable to set the lower limit value of the conditional expression (1-16) to −0.800. It is more preferable to set the lower limit value to −0.600, −0.400, −0.200 and 0.000.

In the optical system according to the present embodiment, it is desirable that said front focusing group consists of two or three lenses. With this configuration, the front focusing group may be made light in weight to attain high speed auto-focusing.

Further, in the optical system according to the present embodiment, it is desirable that the rear focusing group consists of four or less lenses. With this configuration, the rear focusing group may be made light in weight to attain high speed auto-focusing.

Further, in the optical system according to the present embodiment, it is desirable that the lens group located at the most image side comprises, in order from the image side, a positive lens and a negative lens. With this configuration, it is possible to secure the back focus having an appropriate length and a sufficient exit pupil distance.

Further, in the optical system according to the present embodiment, it is desirable that the following conditional expression (1-17) is satisfied:

$$0.030 < nRBp - nRBn \quad (1\text{-}17)$$

where nRBp denotes a refractive index for d-line (wave length λ=587. 6 nm) of the positive lens in the lens group located at the most image side; and nRBn denotes a refractive index for d-line (wave length λ=587. 6 nm) of the negative lens in the lens group located at the most image side.

The conditional expression (1-17) is a conditional expression which defines a difference in the refractive index between the positive lens and the negative lens in the lens group located at the most image side.

When the value of (nRBp−nRBn) is equal to or falls below the lower limit value of the conditional expression (1-17), it becomes impossible to correct Petzval sum, and it becomes impossible to maintain exit pupil distance and back focus appropriately. Meanwhile, in order to ensure the advantageous effect of the present embodiment, it is preferable to set the lower limit value of the conditional expression (1-17) to 0.040. It is more preferable to set the lower limit value to 0.050, 0.060, 0.070, 0.080, 0.090, and 0.100.

Further, in the optical system according to the present embodiment, it is desirable that an image side lens surface of the most image side lens in the lens group located at the most image side is convexed toward the image side. With this configuration, appropriate exit pupil distance and back focus can be secured.

Further, in the optical system according to the present embodiment, it is desirable that the following conditional expressions (1-18) and (1-19) are satisfied:

$$1.000 < nRBp + 0.005\nu RBp < 2.500 \quad (1\text{-}18)$$

$$1.000 < nRBn + 0.005\nu RBn < 2.500 \quad (1\text{-}19)$$

where nRBp denotes a refractive index for d-line (wave length λ=587. 6 nm) of a positive lens in the lens group located at the most image side; nRBn denotes a refractive index for d-line (wave length λ=587.6 nm) of a negative lens in the lens group located at the most image side; νRBp denotes an Abbe number for d-line (wave length λ=587.6 nm) of the positive lens in the lens group located at the most image side; and νRBn denotes an Abbe number for d-line (wave length λ=587. 6 nm) of the negative lens in the lens group located at the most image side.

The conditional expression (1-18) is a conditional expression that defines a relation of refractive index and dispersion of the positive lens included in the lens group located at the most image side. With satisfying the conditional expression (1-18), in the optical system according to the present embodiment, chromatic aberration can be superbly corrected.

Meanwhile, in order to ensure the advantageous effect of the present embodiment, it is preferable to set the upper limit value of the conditional expression (1-18) to 2.400. It is more preferable to set the upper limit value to 2.300, 2.200 and 2.100.

Meanwhile, in order to ensure the advantageous effect of the present embodiment, it is preferable to set the lower limit value of the conditional expression (1-18) to 1.200. It is more preferable to set the lower limit value to 1.400, 1.600 and 1.800.

The conditional expression (1-19) is a conditional expression that defines a relation of refractive index and dispersion of the negative lens included in the lens group located at the most image side. With satisfying the conditional expression (1-19), in the optical system according to the present embodiment, chromatic aberration can be superbly corrected.

Meanwhile, in order to ensure the advantageous effect of the present embodiment, it is preferable to set the upper limit value of the conditional expression (1-19) to 2.400. It is more preferable to set the upper limit value to 2.300, 2.200 and 2.100.

Meanwhile, in order to ensure the advantageous effect of the present embodiment, it is preferable to set the lower limit value of the conditional expression (1-19) to 1.200. It is more preferable to set the lower limit value to 1.400, 1.600 and 1.800.

Further, in the optical system according to the present embodiment, it is desirable that said front focusing group and said aperture stop are next to each other. With this configuration, various aberrations such as spherical aberration and curvature of field can be superbly corrected and variations in those various aberrations upon carrying out focusing can be suppressed.

Further, in the optical system according to the present embodiment, it is desirable that said aperture stop and said rear focusing group are next to each other. With this configuration, various aberrations such as spherical aberration and curvature of field can be superbly corrected and variations in those various aberrations upon carrying out focusing can be suppressed.

Further, in the optical system according to the present embodiment, it is desirable that said front group further comprises a lens group between said front focusing group and said aperture stop, which lens group is fixed in position upon carrying out focusing. With this configuration, various aberrations such as spherical aberration and curvature of field can be superbly corrected and variations in those various aberrations upon carrying out focusing can be suppressed.

Further, in the optical system according to the present embodiment, it is desirable that said rear group further comprises, between said aperture stop and said rear focusing group, a lens group which is fixed in position upon carrying out focusing. With this configuration, various aberrations such as spherical aberration and curvature of field can be superbly corrected and variations in those various aberrations upon carrying out focusing can be suppressed.

The optical equipment according to the present embodiment is provided with the optical system having the above described configuration, so it is possible to realize an optical equipment which is suitable for a mirror-less camera and whose focusing group is reduced in weight and which can suppress variations in various aberrations upon carrying out focusing, thereby attaining excellent optical performance.

Further, the manufacturing method for an optical system according to the first embodiment, is a manufacturing method for an optical system comprising, in order from an object side, a front group having positive refractive power, an aperture stop, and a rear group; comprising steps of:

configuring said front group to comprise a front focusing group having positive refractive power;

configuring said rear group to comprise a rear focusing group having positive refractive power;

configuring such that, upon carrying out focusing, said front focusing group and said rear focusing group are moved toward the object side; and configuring such that said front focusing group and said rear focusing group satisfy the following conditional expression (1-1):

$$0.250 < XRF/XFF < 1.500 \quad (1\text{-}1)$$

where XFF denotes an amount of movement of said front focusing group at the time of carrying out focusing from an infinitely distant object to a closely distant object; and XRF denotes an amount of movement of said rear focusing group at the time of carrying out focusing from the infinitely distant object to the closely distant object.

With this configuration, an optical system which is suitable for a mirror-less camera and whose focusing group is reduced in weight and which can suppress variations in various aberrations upon carrying out focusing, thereby attaining excellent optical performance, can be manufactured.

Next, an optical system, an optical equipment and a manufacturing method for the optical system according to a second embodiment of the present application, will be explained.

The optical system according to the present embodiment comprises, in order from an object side, a front group having positive refractive power, an aperture stop, and a rear group having positive refractive power;

said front group comprising, in order from the object side, a positive lens group having positive refractive power, and a front focusing group having positive refractive power;

said rear group comprising, in order from the object side, a rear focusing group having positive refractive power and a negative lens group having negative refractive power;

upon carrying out focusing on at least a portion from an infinitely distant object to a closely distant object, said front focusing group and said rear focusing group being moved in the direction of the optical axis; and a lens located at the most object side having negative refractive power.

In a conventional retrofocus type wide angle lens system, in a case where a focusing group is a lens group located on an image side of an aperture stop, it is necessary to move the focusing lens group largely toward an object side so as suppress displacement of image plane.

In the optical system according to the present embodiment, it is so configured that a positive lens group disposed at an object side of the aperture stop and a positive lens group disposed at an image side of the aperture stop are made to be focusing groups to be moved toward the object side and carry out focusing, and thus it is possible to suppress variations in various aberrations upon carrying out focusing and, in particular, correct superbly spherical aberration and curvature of field. Further, the two focusing groups can be respectively made to be reduced in weight and speedy in focusing operation.

Further, it is desirable that, in the optical system according to the present embodiment, while a lens disposed at a most object side has negative refractive power, refractive power of the entire front group is positive. Taking such a configuration, the most object side lens group can be made compact while securing large angle of view, and the entire length can be reduced while ensuring appropriate back focus.

By such a configuration, it is possible to realize an optical system which is suitable for a mirror-less camera and whose focusing group is reduced in weight and which can suppress variations in various aberrations upon carrying out focusing, thereby attaining excellent optical performance.

Further, in the optical system according to the present embodiment, it is desirable that said aperture stop is fixed in position upon carrying out focusing. With taking this configuration, it is possible to correct superbly various aberrations such as spherical aberration and curvature of field, and also it is possible to suppress variations in those various aberrations upon carrying out focusing.

Further, in the optical system according to the present embodiment, it is desirable that the following conditional expression (2-1) is satisfied:

$$0.010 < fRF/fFF < 0.900 \quad (2\text{-}1)$$

where fFF denotes a focal length of said front focusing group; and fRF a focal length of said rear focusing group.

The conditional expression (2-1) is an appropriate allocation of refractive powers of the two focusing groups expressed by the ratio of focal lengths.

When the value of fRF/fFF is equal to or falls below the lower limit value of the conditional expression (2-1), refractive power of the front focusing group becomes too small. Accordingly, a stroke of the front focusing group upon carrying out focusing becomes too large so that the front focusing group would interfere with the positive lens group, or it could not be possible to correct sufficiently curvature of field. Meanwhile, in order to ensure the advantageous effect of the present embodiment, it is preferable to set the lower limit value of the conditional expression (2-1) to 0.015. It is more preferable to set the lower limit value to 0.020, and 0.024.

On the other hand, when the value of fRF/fFF is equal to or exceeds the upper limit value of the conditional expression (2-1), refractive power of the rear focusing grope becomes too large, and it becomes difficult to correct spherical aberration and the like. Meanwhile, in order to ensure the advantageous effect of the present embodiment, it is preferable to set the upper limit value of the conditional expression (2-1) to 0.700. It is more preferable to set the upper limit value to 0.500, 0.400, 0.300 and 0.250.

In the optical system according to the present embodiment, it is preferable that the following conditional expression (2-2) is satisfied:

$$0.400 < Bf/f < 2.000 \qquad (2\text{-}2)$$

where Bf denotes a distance from an image side lens surface of a lens located on the most image side upon focusing on an infinitely distant object to the image plane, in other words, a back focus; and f denotes a focal length of said optical system upon focusing on the infinitely distant object.

The conditional expression (2-2) defines an appropriate range of the back focus and the focal length of the entire optical system. Meanwhile, in a case where a parallel plate such as a filter is disposed in the optical system, the back focus in the conditional expression (2-2), is an air converted value calculated where the parallel plate is converted to an air. This is same also with respect to ST, TL and Bf in the conditional expressions (2-3) and (2-9) described later.

When the value of Bf/f is equal to or exceeds the upper limit value of the conditional expression (2-2), the back focus becomes large and, though telecentricity being maintained, the optical system in the entirety thereof becomes large. Further, if it is intended to prevent diameter of a front lens group from being enlarged with following to enlargement of the system, it becomes difficult to correct distortion and the like. Meanwhile, in order to ensure the advantageous effect of the present embodiment, it is preferable to set the upper limit value of the conditional expression (2-2) to 1.900. It is more preferable to set the upper limit value to 1.800, 1.700, 1.600, 1.500, 1.400, 1.300, 1.200, and 1.100.

On the other hand, when the value of Bf/f is equal to or falls below the lower limit value of the conditional expression (2-2), position of the exit pupil is displaced toward the image side. For this reason, shading becomes apparent, and in particular resolution in the periphery of the image view would be deteriorated. Meanwhile, in order to ensure the advantageous effect of the present embodiment, it is preferable to set the lower limit value of the conditional expression (2-2) to 0.450. It is more preferable to set the lower limit value to 0.500, 0.550, 0.600, and 0.700.

Further, in the optical system according to the present embodiment, it is preferable that the following conditional expression (2-3) is satisfied:

$$0.100 < ST/TL < 0.600 \qquad (2\text{-}3)$$

where ST denotes a distance from said aperture stop to the image plane at the time when an infinitely distant object is focused; and TL denotes a distance from an object side lens surface of the lens located at said most object side to the image plane, that is, a whole length of the optical system, at the time when the infinitely distant object is focused.

The conditional expression (2-3) is a conditional expression that defines an appropriate range of the distance from the aperture stop to the image plane and the whole length of the optical system and assumes a position of the exit pupil from position of the aperture stop in the optical system.

When the value of ST/TL is equal to or exceeds the upper limit value of the conditional expression (2-3), the whole length of the optical system becomes large, though telecentricity being maintained, so it is impossible to make the optical system small in size. If it is intended to make the front lens group small in diameter in the state where the whole length of the optical system has been increased, it becomes impossible to correct sufficiently distortion and the like. Meanwhile, in order to ensure the advantageous effect of the present embodiment, it is preferable to set the upper limit value of the conditional expression (2-3) to 0.570. It is more preferable to set the upper limit value to 0.550, 0.530, 0.500, 0.480 and 0.460.

On the other hand, when the value of ST/TL is equal to or falls below the lower limit value of the conditional expression (2-3), the aperture stop is disposed at a more object side than its appropriate position. For this configuration, light rays can not be shaded uniformly by the aperture stop, and point image upon stopping down the aperture is distorted and peripheral light reduction is deteriorated. Further, it becomes difficult to correct chromatic aberration of magnification also. Meanwhile, in order to ensure the advantageous effect of the present embodiment, it is preferable to set the lower limit value of the conditional expression (2-3) to 0.120. It is more preferable to set the lower limit value to 0.140, 0.170, 0.200, 0.250, 0.300 and 0.350.

Further, in the optical system according to the present embodiment, it is preferable that the following conditional expression (2-4) is satisfied:

$$0.200 < \beta RF/\beta FF < 1.100 \qquad (2\text{-}4)$$

where $\beta FF$ denotes a magnification of said front focusing group upon focusing on an infinitely distant object; and $\beta RF$ a magnification of said rear focusing group upon focusing on the infinitely distant object.

The conditional expression (2-4) is a conditional expression that defines an appropriate ratio of magnifications of the front focusing group and the rear focusing group.

When the value of $\beta RF/\beta FF$ is equal to or exceeds the upper limit value of the conditional expression (2-4), refractive power of the rear focusing group becomes too large, and it becomes impossible to correct sufficiently spherical aberration, coma aberration and the like.

Meanwhile, in order to ensure the advantageous effect of the present embodiment, it is preferable to set the upper limit value of the conditional expression (2-4) to 1.000. It is more preferable to set the upper limit value to 0.950, 0.900, 0.850, 0.800, 0.750 and 0.700.

On the other hand, when the value of $\beta RF/\beta FF$ is equal to or falls below the lower limit value of the conditional expression (2-4), refractive power of the rear focusing group becomes too small, and it becomes impossible to obtain magnification required for focusing. For this reason, it is not possible to secure sufficient performance for conducting focusing on very close distance object, and correction of curvature of field becomes insufficient. Meanwhile, in order to ensure the advantageous effect of the present embodiment, it is preferable to set the lower limit value of the conditional expression (2-4) to 0.220. It is more preferable to set the lower limit value to 0.240, 0.260, 0.280, 0.300, 0.320, 0.350 and 0.370.

Further, it is desirable that, in the optical system according to the present embodiment, said positive lens group is fixed in position upon carrying out focusing. With taking this configuration, variation in image magnification upon carrying out focusing becomes small, and excellent image can be obtained, and mechanical configuration of the optical system according to the present embodiment may be simplified.

Further, it is desirable that, in the optical system according to the present embodiment, a lens group located at a most image side at the time when focusing is carried out, is fixed in position. With taking this configuration, it is possible to secure a back focus having appropriate length and sufficient distance for exit pupil, so mechanical configuration of the optical system according to the present embodiment may be simplified.

Further, it is desirable that, in the optical system according to the present embodiment, said front focusing group comprises at least one positive lens and at least one negative lens. With this configuration, various aberrations such as chromatic aberration of magnification and the like can be corrected superbly.

Further, it is desirable that, in the optical system according to the present embodiment, said rear focusing group comprises at least one positive lens and at least one negative lens. With this configuration, various aberrations such as chromatic aberration of magnification and the like can be corrected superbly.

Further, in the optical system according to the present embodiment, it is desirable that the following conditional expression (2-5) is satisfied:

$$0.300 < fF/fR < 1.300 \qquad (2\text{-}5)$$

where fF denotes a focal length of said front group upon focusing on an infinitely distant object; and fR denotes a focal length of said rear group upon focusing on the infinitely distant object.

The conditional expression (2-5) is a conditional expression that defines an allocation of refractive powers of the front group and the rear group.

When the value of fF/fR is equal to or exceeds the upper limit value of the conditional expression (2-5), refractive power of the rear group becomes too large, and it becomes impossible to correct sufficiently spherical aberration, coma aberrations and the like. Meanwhile, in order to ensure the advantageous effect of the present embodiment, it is preferable to set the upper limit value of the conditional expression (2-5) to 1.200. It is more preferable to set the upper limit value to 1.150, 1.100, 1.050, 1.000, 0.950, 0.900, 0.850, and 0.800.

On the other hand, when the value of fF/fR is equal to or falls below the lower limit value of the conditional expression (2-5), refractive power of the rear group becomes too small, and it becomes not possible to secure a magnification required for carrying out focusing. Accordingly, it is not possible to secure performance enough to carry out focusing on an extremely close distance object, so curvature of field could not be corrected sufficiently. Meanwhile, in order to ensure the advantageous effect of the present embodiment, it is preferable to set the lower limit value of the conditional expression (2-5) to 0.330. It is more preferable to set the lower limit value to 0.350, 0.380, 0.400, 0.430, 0.450, 0.480 and 0.500.

Further, it is desirable that, in the optical system according to the present embodiment, said front group is moved toward object side. With this configuration, it is possible to correct superbly various aberrations, such as spherical aberration and curvature of field, and also it is possible to suppress variations in those aberrations upon carrying out focusing.

Further, it is desirable that, in the optical system according to the present embodiment, said front focusing group is moved toward object side upon carrying out focusing. With this configuration, it is possible to correct superbly various aberrations, such as spherical aberration and curvature of field, and also it is possible to suppress variations in those aberrations upon carrying out focusing.

In the optical system according to the present embodiment, it is desirable that the following conditional expression (2-6) is satisfied:

$$0.010 < fFA/fFF < 0.750 \qquad (2\text{-}6)$$

where fFA denotes a focal length of said positive lens group; and fFF denotes a focal length of said front focusing group.

The conditional expression (2-6) is a conditional expression that defines the focal length of the front focusing group and the focal length of the positive lens group.

When the value of fFA/fFF is equal to or exceeds the upper limit value of the conditional expression (2-6), refractive power of the front focusing group becomes too large, and it becomes difficult to correct sufficiently chromatic aberration of magnification and the like. Meanwhile, in order to ensure the advantageous effect of the present embodiment, it is preferable to set the upper limit value of the conditional expression (2-6) to 0.700.

It is more preferable to set the upper limit value to 0.650, 0.600, 0.550, 0.500, 0.450, 0.400, 0.350, 0.300 and 0.250.

On the other hand, when the value of fFA/fFF is equal to or falls below the lower limit value of the conditional expression (2-6), refractive power of the front focusing group becomes too small, and it becomes difficult to correct curvature of field and the like. Meanwhile, in order to ensure the advantageous effect of the present embodiment, it is preferable to set the lower limit value of the conditional expression (2-6) to 0.015. It is more preferable to set the lower limit value to 0.020, 0.025, 0.030, 0.035, 0.040, 0.045, 0.050, 0.060, 0.070, and 0.080.

In the optical system according to the present embodiment, it is desirable that the following conditional expression (2-7) is satisfied:

$$0.010 < f/fFF < 0.300 \qquad (2\text{-}7)$$

where f denotes a focal length of said optical system upon focusing on an infinitely distant object; and fFF denotes a focal length of said front focusing group.

The conditional expression (2-7) defines the focal length of the front focusing group and the focal length of the entire optical system.

When the value of f/fFF is equal to or exceeds the upper limit value of the conditional expression (2-7), refractive power of the front focusing group becomes too large, and it becomes difficult to correct chromatic aberration of magnification and the like. Meanwhile, in order to ensure the advantageous effect of the present embodiment, it is preferable to set the upper limit value of the conditional expression (2-7) to 0.280. It is more preferable to set the upper limit value to 0.250, 0.230, 0.200, 0.180, 0.160, 0.140, 0.120, 0.100 and 0.080.

On the other hand, when the value of f/fFF is equal to or falls below the lower limit value of the conditional expression (2-7), refractive power of the front focusing group becomes too small, and it becomes difficult to correct curvature of field and the like. Meanwhile, in order to ensure the advantageous effect of the present embodiment, it is preferable to set the lower limit value of the conditional expression (2-7) to 0.012. It is more preferable to set the lower limit value to 0.014, 0.016, 0.017, 0.020, 0.025, 0.030 and 0.035.

Further, in the optical system according to the present embodiment, it is desirable that the following conditional expression (2-8) is satisfied: $0.300 < f/fRF < 1.100$ (2-8) where f denotes a focal length of said optical system upon focusing on an infinitely distant object; and fRF denotes a focal length of said rear focusing group.

The conditional expression (2-8) is a conditional expression that defines the focal length of the rear focusing group and the focal length of the whole optical system.

When the value of f/fRF is equal to or exceeds the upper limit value of the conditional expression (2-8), refractive power of the rear focusing group becomes too small. For this reason, a stroke of the rear focusing group upon carrying out focusing becomes large, so the optical system becomes enlarged, or it becomes difficult to correct sufficiently curvature of field. Meanwhile, in order to ensure the advantageous effect of the present embodiment, it is preferable to set the upper limit value of the conditional expression (2-8) to 1.050. It is more preferable to set the upper limit value to 1.000, 0.950, 0.900, and 0.850.

On the other hand, when the value of f/fRF is equal to or falls below the lower limit value of the conditional expression (2-8), refractive power of the rear focusing group becomes too large. Accordingly, it becomes difficult to correct spherical aberration and the like. Meanwhile, in order to ensure the advantageous effect of the present embodiment, it is preferable to set the lower limit value of the conditional expression (2-8) to 0.350.

It is more preferable to set the lower limit value to 0.400, 0.450, 0.500, 0.550, and 0.600.

In the optical system according to the present embodiment, it is desirable that the following conditional expression (2-9) is satisfied:

$$0.800 < TL/(Fno \cdot Bf) < 6.000 \qquad (2\text{-}9)$$

where TL denotes a distance from an object side lens surface of a lens located on the most object side upon focusing on the infinitely distant object to the image plane; Fno denotes a full open F-number of said optical system; and Bf denotes a distance from an image side lens surface of a lens located on the most image side upon focusing on the infinitely distant object to the image plane.

The conditional expression (2-9) is a conditional expression showing an optimum balance between the whole length and the back focus of the optical system in order to make the optical system to a bright wide angle lens.

When the value of TL/(Fno·Bf) is equal to or exceeds the upper limit value of the conditional expression (2-9), the whole length of the optical system becomes large and the optical system in the entirety thereof becomes large in size. Alternatively, the F-number of the optical system becomes small, and it becomes difficult to correct spherical aberration.

Meanwhile, in order to ensure the advantageous effect of the present embodiment, it is preferable to set the upper limit value of the conditional expression (2-9) to 5.500. It is more preferable to set the upper limit value to 5.000, 4.500, 4.300, 4.100, 4.000, 3.800, and 3.600.

On the other hand, when the value of TL/(Fno·Bf) is equal to or falls below the lower limit value of the conditional expression (2-9), the whole length of the optical system becomes too small, and it becomes difficult to correct coma aberration and the like. Meanwhile, in order to ensure the advantageous effect of the present embodiment, it is preferable to set the lower limit value of the conditional expression (2-9) to 0.900. It is more preferable to set the lower limit value to 1.000, 1.100, 1.300, 1.500, 1.800, 2.000, 2.200 and 2.500.

Further, in the optical system according to the present embodiment, it is desirable that the following conditional expression (2-10) is satisfied:

$$|Ainf - Amod|/f < 0.070 \qquad (2\text{-}10)$$

where Ainf denotes a half angle of view (unit "°") of said optical system upon focusing on an infinitely distant object; and Amod denotes a half angle of view (unit "°") of said optical system upon focusing on an extremely close distant object.

The conditional expression (2-10) is a conditional expression that defines a ratio of the angle of incident of light rays upon focusing on the infinitely distant object with the angle of incident of light rays upon focusing on the extremely close distant object, thereby assuming variation in image magnification upon focusing.

When the value of I Ainf-Amod I /f is equal to or exceeds the upper limit value of the conditional expression (2-10), image magnification varies upon carrying out focusing, and it becomes impossible to obtain excellent image.

Meanwhile, in order to ensure the advantageous effect of the present embodiment, it is preferable to set the upper limit value of the conditional expression (2-10) to 0.065. It is more preferable to set the upper limit value to 0.060, 0.055, 0.050, 0.045, and 0.040.

Further, in the optical system according to the present embodiment, it is desirable that said front focusing lens consists of one positive lens and one negative lens; and the following conditional expression (2-11) is satisfied:

$$30.00 < vFFp - vFFn < 75.00 \qquad (2\text{-}11)$$

where vFFp denotes an Abbe number of said positive lens in said front focusing group for d-line (wave length λ=587.6 nm); and vFFn denotes an Abbe number of said negative lens in said front focusing group for d-line (wave length λ=587.6 nm).

The conditional expression (2-11) defines a formula relating to dispersions of the positive lens and the negative lens included in the front focusing group. The optical system according to the embodiment can correct chromatic aberration superbly by satisfying the conditional expression (2-11).

Meanwhile, in order to ensure the advantageous effect of the present embodiment, it is preferable to set the upper limit value of the conditional expression (2-11) to 70.00. It is more preferable to set the upper limit value to 65.00, 61.00, 58.00 and 56.00.

Meanwhile, in order to ensure the advantageous effect of the present embodiment, it is preferable to set the lower limit value of the conditional expression (2-11) to 35.00. It is more preferable to set the lower limit value to 40.00, 45.00 and 50.00.

Further, in the optical system according to the present embodiment, it is desirable that the following conditional expression (2-12) is satisfied:

$$-1.000 < (FFr2 + FFr1)/(FFr2 - FFr1) < 2.000 \qquad (2\text{-}12)$$

where FFr1 denotes a radius of curvature of an object side lens surface of a positive lens located at a most image side in said front focusing group; and FFr2 denotes a radius of curvature of an image side lens surface of the positive lens located at the most image side in said front focusing group.

The conditional expression (2-12) is a conditional expression defining a shape factor of the positive lens located at the most image side in the front focusing group.

When the value of (FFr2+FFr1)/(FFr2−FFr1) is equal to or exceeds the upper limit value of the conditional expression (2-12), curvature of the object side lens surface of the said positive lens becomes large, and it becomes difficult to correct spherical aberration.

Meanwhile, in order to ensure the advantageous effect of the present embodiment, it is preferable to set the upper limit value of the conditional expression (2-12) to 1.500. It is more preferable to set the upper limit value to 1.300, 1.000, 0.900, 0.800, 0.700 and 0.600.

On the other hand, when the value of (FFr2+FFr1)/(FFr2−FFr1) is equal to or falls below the lower limit value of the conditional expression (2-12), it becomes difficult to correct coma aberration and the like. Meanwhile, in order to ensure the advantageous effect of the present embodiment, it is preferable to set the lower limit value of the conditional expression (2-12) to −0.800. It is more preferable to set the lower limit value to −0.600, −0.400, −0.200 and 0.000.

In the optical system according to the present embodiment, it is desirable that said front focusing group consists of two or three lenses. With this configuration, the front focusing group may be made light in weight to attain high speed auto-focusing.

Further, in the optical system according to the present embodiment, it is desirable that said rear focusing group consists of four or less lenses. With this configuration, the rear focusing group may be made light in weight to attain high speed auto-focusing.

Further, in the optical system according to the present embodiment, it is desirable that the following conditional expression (2-13) is satisfied:

$$0.800 < (-fRB)/f < 10.000 \quad (2\text{-}13)$$

where fRB denotes a focal length of said negative lens group; and f denotes a focal length of said optical system upon focusing on the infinitely distant object.

The conditional expression (2-13) defines a focal length of the negative lens group and a focal length of the whole optical system.

When the value of (−fRB)/f is equal to or exceeds the upper limit value of the conditional expression (2-13), refractive power of the negative lens group becomes too small. Therefore, the back focus becomes too large, and the optical system becomes enlarged. Moreover, it becomes impossible correct sufficiently coma aberrations and the like. Meanwhile, in order to ensure the advantageous effect of the present embodiment, it is preferable to set the upper limit value of the conditional expression (2-13) to 9.000. It is more preferable to set the upper limit value to 8.000, 7.000, 6.000, and 5.000.

On the other hand, when the value of (−fRB)/f is equal to or falls below the lower limit value of the conditional expression (2-13), refractive power of the negative lens group becomes too large. Accordingly, it becomes not possible to secure sufficient distance of the exit pupil. Also, it becomes not possible to correct sufficiently distortion and the like. Meanwhile, in order to ensure the advantageous effect of the present embodiment, it is preferable to set the lower limit value of the conditional expression (2-13) to 1.000. It is more preferable to set the lower limit value to 1.200, 1.400, 1.600, 1.800 and 2.000.

In the optical system according to the present embodiment, it is desirable that the lens group located at the most image side comprises, in order from the image side, a positive lens and a negative lens. With this configuration, it is possible to secure back focus having appropriate size and sufficient exit pupil distance.

Further, in the optical system according to the present embodiment, it is desirable that the following conditional expression (2-14) is satisfied:

$$0.030 < nRBp - nRBn \quad (2\text{-}14)$$

where nRBp denotes a refractive index for d-line (wave length $\lambda$=587. 6 nm) of the positive lens in the lens group located at the most image side; and nRBn denotes a refractive index for d-line (wave length $\lambda$=587. 6 nm) of the negative lens in the lens group located at the most image side.

The conditional expression (2-14) is a conditional expression which defines a difference in the refractive indices between the positive lens and the negative lens in the lens group located at the most image side.

When the value of (nRBp−nRBn) is equal to or falls below the lower limit value of the conditional expression (2-14), it becomes impossible to correct Petzval sum, and it becomes impossible to maintain exit pupil distance and back focus appropriately. Meanwhile, in order to ensure the advantageous effect of the present embodiment, it is preferable to set the lower limit value of the conditional expression (2-14) to 0.040. It is more preferable to set the lower limit value to 0.050, 0.060, 0.070, 0.080, 0.090, and 0.100.

Further, in the optical system according to the present embodiment, it is desirable that an image side lens surface of a most image side lens in the lens group located at the most image side is convex toward the image side. With this configuration, appropriate exit pupil distance and back focus can be secured.

Further, in the optical system according to the present embodiment, it is desirable that the following conditional expressions (2-15) and (2-16) are satisfied:

$$1.000 < nRBp + 0.005\nu RBp < 2.500 \quad (2\text{-}15)$$

$$1.000 < nRBn + 0.005\nu RBn < 2.500 \quad (2\text{-}16)$$

where nRBp denotes a refractive index for d-line (wave length $\lambda$=587. 6 nm) of the positive lens in the lens group located at the most image side; nRBn denotes a refractive index for d-line (wave length $\lambda$=587. 6 nm) of the negative lens in the lens group located at the most image side;

$\nu$RBp denotes an Abbe number for d-line (wave length $\lambda$=587. 6 nm) of the positive lens in the lens group located at the most image side; and $\nu$RBn denotes an Abbe number for d-line (wave length $\lambda$=587. 6 nm) of the negative lens in the lens group located at the most image side.

The conditional expression (2-15) is a conditional expression that defines a relation of refractive index and dispersion of the positive lens included in the lens group located at the most image side. With satisfying the conditional expression (2-15), chromatic aberration can be superbly corrected.

Meanwhile, in order to ensure the advantageous effect of the present embodiment, it is preferable to set the upper limit value of the conditional expression (2-15) to 2.400. It is more preferable to set the upper limit value to 2.300, 2.200 and 2.100.

Meanwhile, in order to ensure the advantageous effect of the present embodiment, it is preferable to set the lower limit value of the conditional expression (2-15) to 1.200. It is more preferable to set the lower limit value to 1.400, 1.600 and 1.800.

The conditional expression (2-16) is a conditional expression that defines a relation of refractive index and dispersion of the negative lens included in the lens group located at the most image side. With satisfying the conditional expression (2-16), chromatic aberration can be superbly corrected.

Meanwhile, in order to ensure the advantageous effect of the present embodiment, it is preferable to set the upper limit value of the conditional expression (2-16) to 2.400. It is more preferable to set the upper limit value to 2.300, 2.200 and 2.100.

Meanwhile, in order to ensure the advantageous effect of the present embodiment, it is preferable to set the lower limit value of the conditional expression (2-16) to 1.200. It is more preferable to set the lower limit value to 1.400, 1.600 and 1.800.

Further, in the optical system according to the present embodiment, it is desirable that said front focusing group and said aperture stop are next to each other. With this configuration, various aberrations such as spherical aberration and curvature of field can be superbly corrected and variations in those various aberrations upon carrying out focusing can be suppressed.

Further, in the optical system according to the present embodiment, it is desirable that said aperture stop and said rear focusing group are next to each other. With this configuration, various aberrations such as spherical aberration and curvature of field can be superbly corrected and variations in those various aberrations upon carrying out focusing can be suppressed.

Further, in the optical system according to the present embodiment, it is desirable that said front group further comprises a lens group between said front focusing group and said aperture stop, which lens group is fixed in position upon carrying out focusing. With this configuration, various aberrations such as spherical aberration and curvature of field can be superbly corrected and variations in those various aberrations upon carrying out focusing can be suppressed.

Further, in the optical system according to the present embodiment, it is desirable that said rear group further comprises, between said aperture stop and said rear focusing group, a lens group which is fixed in position upon carrying out focusing. With this configuration, various aberrations such as spherical aberration and curvature of field can be superbly corrected and variations in those various aberrations upon carrying out focusing can be suppressed.

The optical equipment according to the second embodiment is provided with the optical system having the above described configuration, so it is possible to realize an optical equipment which is suitable for a mirror-less camera and whose focusing group is reduced in weight and which can suppress variations in various aberrations upon carrying out focusing, thereby attaining excellent optical performance.

Further, the manufacturing method for an optical system according to the second embodiment, is a manufacturing method for an optical system comprising a front group having positive refractive power, an aperture stop, and a rear group having positive refractive power; comprising steps of:

configuring said front group to comprise, in order from an object side, a positive lens group having positive refractive power and a front focusing group having positive refractive power;

configuring said rear group to comprise, in order from the object side, a rear focusing group having positive refractive power and a negative lens group having negative refractive power;

configuring such that, upon carrying out focusing on at least a part from an infinite distance object to a close distance object, said front focusing group and said rear focusing group are moved in the direction of the optical axis; and configuring such that a lens located in a most object side, has negative refractive power.

With this configuration, an optical system which is suitable for a mirror-less camera and whose focusing group is reduced in weight and which can suppress variations in various aberrations upon carrying out focusing, thereby attaining excellent optical performance, can be manufactured.

Hereinafter, the examples relating to the optical systems according to the first and second embodiments, will be explained with reference to the accompanying drawings. Meanwhile, the First to Nineth Examples are common examples to the first and second embodiments, and the Tenth and Eleventh Examples are examples of the first embodiment.

FIRST EXAMPLE

FIGS. 1A and 1B are sectional views showing an optical system according to a First Example, respectively, upon focusing on an infinitely distant object and upon focusing on a closely distant object.

The optical system according to the First Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the object side, a positive lens group GFA having positive refractive power and a front focusing group GFF having positive refractive power.

The positive lens group GFA consists of, in order from the object side, a negative meniscus lens L1 having a convex surface toward the object side, a negative meniscus lens L2 having a convex surface toward the object side, a double convex positive lens L3, a cemented lens constructed by a double concave negative lens L4 cemented with a double convex positive lens L5, and a double convex positive lens L6.

The front focusing group GFF consists of a cemented lens constructed by, in order from the object side, a double convex positive lens L7 cemented with a double concave negative lens L8.

The rear group GR consists of, in order from the object side, a rear focusing group GRF having positive refractive power and a negative lens group GRB having negative refractive power.

The rear focusing group GRF consists of, in order from the object side, a negative meniscus lens L9 having a convex surface toward the image side, and a double convex positive lens L10.

The negative lens group GRB consists of, in order from the object side, a double concave negative lens L11 and a plano-convex positive lens L12 having a convex surface toward the object side.

In the optical system according to the First Example, focusing from an infinite distance object to a close distance object is carried out by moving the front focusing group GFF and the rear focusing group GRF along the optical axis toward the object side. Meanwhile, upon carrying out focusing, the positive lens group GFA, the aperture stop S and the negative lens group GRB are fixed in position.

Table 1 below shows various values of the optical system according to the First Example.

In table 1, "f" denotes a focal length, and "Bf" denotes a back focus, in other words, a distance on the optical axis between the most image side lens surface and the image plane I.

In [Surface Data], "m" denotes a surface number that is an order of a lens surface counted from the object side, "r" denotes a radius of curvature, "d" denotes a surface to surface distance, that is, an interval from an n-th surface to an (n+1)-th surface, where n is an integer, "nd" denotes refractive index for d-line (wavelength λ=587.6 nm) and "vd" denotes an Abbe number for d-line (wavelength λ=587.6 nm). Further, "OP" denotes an object surface, "variable" denotes a variable surface-to-surface distance, "IP" denotes an imaginary plane, "Stop S" denotes an aperture stop S, and "Image plane" denotes an image plane I. Meanwhile, radius of curvature r=∞ denotes a plane surface. In addition, an aspherical surface is expressed by attaching "*" to the surface number, and in the column of the radius of curvature "r", a paraxial radius of curvature is shown.

In [Aspherical Surface Data], with respect to an aspherical surface shown in [Surface Data], an aspherical surface coefficient and a conical coefficient are shown in the case where the aspherical surface is exhibited by the following expression:

$$x=(h^2/r)/[1+\{1-\kappa(h/r)^2\}^{1/2}]+A4h^4+A6h^6+A8h^8$$

where "h" denotes a height in a direction perpendicular to the optical axis; "x" denotes a sag amount that is a distance in the direction of the optical axis from the tangent surface at the vertex of aspherical surface to the aspherical surface at the height "h"; "κ" denotes a conical coefficient; "A4", "A6", and "A8" denote respective aspherical coefficients, and "r" denotes a paraxial radius of curvature that is a radius of curvature of a reference sphere. Meanwhile, "E-n", where n is an integer, denotes "×10$^{-n}$", for example, "1.23456E-07" denotes "1.23456×10$^{-7}$". Secondary aspherical surface coefficient "A2" is "0", and omitted.

In [Various Data], "Fno" denotes an F-number, "2ω" denotes an angle of view (unit "°"), "ω" denotes a half angle of view (unit "°"), "Ymax" denotes a largest image height, "β" denotes an extremely short distance taking magnification, "TL" denotes a total length of the optical system according to the First Example, that is, a distance along the optical axis from the first surface to the image plane I, and "dn" denotes a variable distance between an n-th surface and an (n+1)-th surface. "Air converted Bf" and "Air converted TL" denote, respectively, Bf and TL in which a thickness of a filter F is air converted. "Ainf" denotes a half angle of view (unit "°") upon focusing on an infinitely distant object, and "Amod" denotes a half angle of view (unit "°") upon focusing on an extremely close distance object. Meanwhile, "INF" and "CLO" denote, respectively, upon focusing on an infinitely distant object and upon focusing on a closely distant object.

In [Lens Group Data], a starting surface and a focal length of each lens group are shown.

In [Values for Conditional Expressions], values corresponding to respective conditional expressions of the optical system according to the First Example, are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to Incidentally, the explanation of reference symbols in Table 1 described above, is the same in Tables for the other Examples described later.

TABLE 1

First Example

[Surface Data]

| m | r | d | nd | vd |
|---|---|---|---|---|
| OP | ∞ | | 1.000000 | |
| 1) | 85.0000 | 2.7000 | 1.744000 | 44.80 |
| 2) | 25.0533 | 9.4392 | 1.000000 | |
| 3) | 54.7416 | 2.0000 | 1.588870 | 61.13 |
| *4) | 18.4256 | 10.7082 | 1.000000 | |
| 5) | 516.8640 | 3.7787 | 1.903658 | 31.31 |
| 6) | −114.1419 | 3.5370 | 1.000000 | |
| 7) | −50.2377 | 2.0000 | 1.620040 | 36.40 |
| 8) | 30.6947 | 10.4006 | 1.851500 | 40.78 |
| 9) | −261.5465 | 0.2000 | 1.000000 | |
| 10) | 41.0143 | 5.7649 | 1.851500 | 40.78 |
| 11) | −317.4121 | variable | 1.000000 | |
| 12) (IP) | ∞ | 0.0000 | 1.000000 | |
| 13) | 56.6941 | 4.1550 | 1.497820 | 82.57 |
| 14) | −64.4398 | 1.2000 | 1.808090 | 22.74 |
| 15) | 364.1222 | variable | 1.000000 | |
| 16) (Stop S) | ∞ | variable | 1.000000 | |
| *17) | −38.5516 | 1.4869 | 1.860999 | 37.10 |
| *18) | −43.3477 | 1.3930 | 1.000000 | |
| 19) | 54.9022 | 6.5932 | 1.497820 | 82.57 |
| 20) | −18.1086 | variable | 1.000000 | |
| *21) | −26.4619 | 1.4000 | 1.689480 | 31.02 |
| 22) | 48.9165 | 2.3305 | 1.000000 | |
| *23) | 39.3225 | 3.4184 | 1.832199 | 40.10 |
| 24) | ∞ | 17.1751 | 1.000000 | |
| 25) | ∞ | 1.6000 | 1.516800 | 64.13 |
| 26) | ∞ | 0.9931 | 1.000000 | |
| Image plane | ∞ | | | |

[Aspherical Data]

| m | κ | A4 | A6 | A8 |
|---|---|---|---|---|
| 4 | 0.0000 | 8.15384E−06 | −6.41018E−09 | 3.11521E−11 |
| | | A10 | A12 | |
| | | −7.69764E−14 | 0.67523E−16 | |
| m | κ | A4 | A6 | A8 |
| 17 | 0.0000 | −3.75535E−05 | 4.12683E−08 | 9.77350E−10 |
| | | A10 | A12 | |
| | | −1.51945E−11 | 0.24817E−13 | |
| m | κ | A4 | A6 | A8 |

TABLE 1-continued

| First Example | | | | |
|---|---|---|---|---|
| 18 | 1.0000 | 7.81937E−06 | 1.19209E−07 | 1.46234E−09 |
| | | A10 | A12 | |
| | | −1.69623E−11 | 0.50939E−13 | |
| m | κ | A4 | A6 | A8 |
| 21 | 1.5918 | 1.17009E−04 | −7.89642E−07 | 5.72645E−09 |
| | | A10 | A12 | |
| | | −2.68019E−11 | 0.55035E−13 | |
| m | κ | A4 | A6 | A8 |
| 23 | 1.0000 | −7.49387E−05 | 4.05516E−07 | −2.44584E−09 |
| | | A10 | A12 | |
| | | 8.81114E−12 | −0.14105E−13 | |

[Various Data]

| | | |
|---|---|---|
| f | 20.1396 | |
| Fno | 1.85813 | |
| 2ω | 96.9415 | |
| Ymax | 21.60 | |
| TL | 113.97307 | |
| Air converted TL | 113.42787 | |
| Bf | 19.7682 | |
| Air converted Bf | 19.223 | |
| Ainf | 49.11334 | |
| Amod | 48.15531 | |
| | INF | CLO |
| f | 20.1396 | |
| β | | −0.1886 |
| d0 | ∞ | 86.0518 |
| d11 | 6.6882 | 3.2619 |
| d15 | 4.1566 | 7.5829 |
| d16 | 7.3258 | 5.5189 |
| d20 | 3.5287 | 5.3356 |
| 2ω | 96.9415 | |
| ω | 48.4707 | |

[Lens Group Data]

| Group | Starting surface | f |
|---|---|---|
| GF | 1 | 41.6168 |
| GR | 17 | 56.1686 |
| GFA | 1 | 50.4642 |
| GFF | 12 | 519.7498 |
| GRF | 17 | 29.1224 |
| GRB | 21 | −59.3852 |

[Values for Conditional Expressions]

(1-1) XRF/XFF = 0.5274
(1-2) Bf/f = 0.9545
(1-3) ST/TL = 0.4500
(1-4) 13RF/FF = 0.3989
(1-5) (−fRB)/f = 2.9486
(1-6) Bf/TL = 0.1695
(1-7) XRF/f = 0.0897
(1-8) fRF/fFF = 0.0560
(1-9) fF/fR = 0.7409
(1-10) fFA/fFF = 0.0971
(1-11) f/fFF = 20.0387
(1-12) f/fRF = 20.6916
(1-13) TL/(Fno · Bf) = 3.1756
(1-14) |Ainf−Amod|/f = 0.0476
(1-15) νFFp−νFFn = 59.8300
(1-16) (FFr2 + FFr1)/(FFr2−FFr1) = 0.0639
(1-17) nRBp−nRBn = 0.1427
(1-18) nRBp + 0.005νRBp = 2.0327
(1-19) nRBn + 0.005νRBn = 1.8446
(2-1) fRF/fFF = 0.0560
(2-2) Bf/f = 0.9545
(2-3) ST/TL = 0.4500
(2-4) βRF/βFF = 0.3989
(2-5) fF/fR = 0.7409
(2-6) fFA/fFF = 0.0971
(2-7) f/fFF = 0.0387
(2-8) f/fRF = 0.6916

TABLE 1-continued

First Example

| | | | |
|---|---|---|---|
| (2-9) | TL/(Fno · Bf) | = | 3.1756 |
| (2-10) | \|Ainf-Amod\|/f | = | 0.0476 |
| (2-11) | vFFp-vFFn | = | 59.8300 |
| (2-12) | (FFr2 + FFr1)/(FFr2-FFr1) | = | 0.0639 |
| (2-13) | (-fRB)/f | = | 2.9486 |
| (2-14) | nRBp-nRBn | = | 0.1427 |
| (2-15) | nRBp + 0.005vRBp | = | 2.0327 |
| (2-16) | nRBn + 0.005vRBn | = | 1.8446 |

Figure 2:
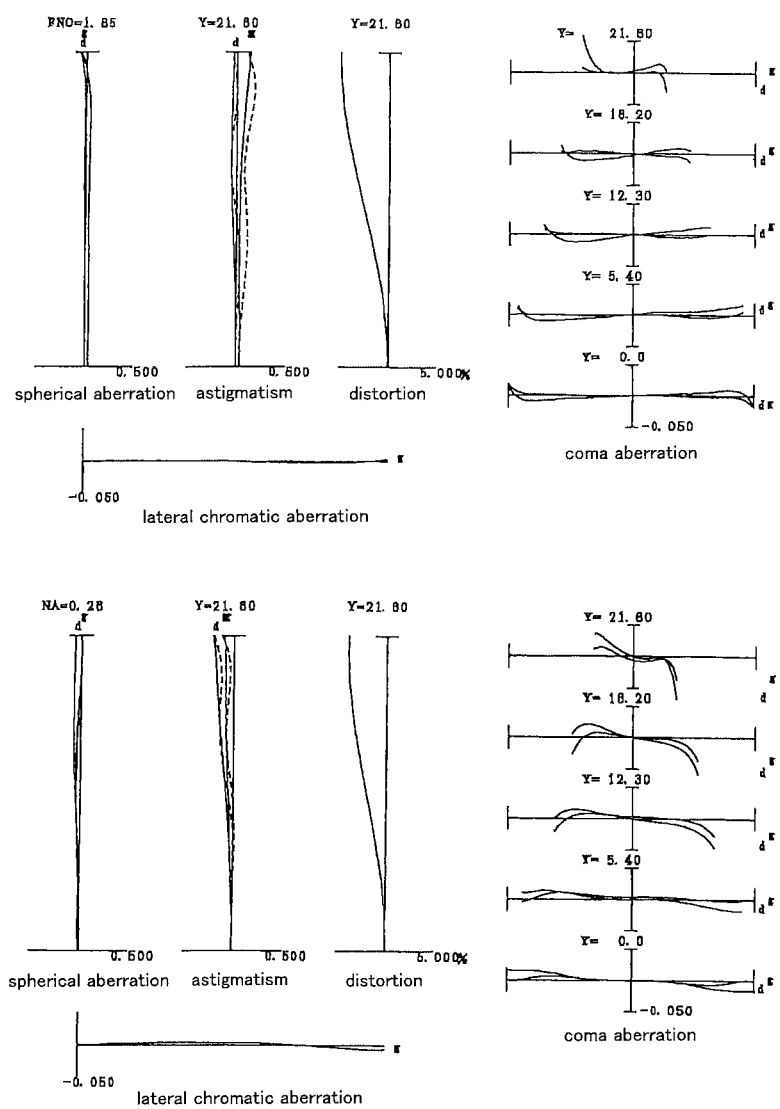
FIG. 2 is graphs showing various aberrations of the optical system according to the First Example.

FIG. 2A and FIG. 2B are graphs showing various aberrations of the First Example upon focusing on an infinitely distant object and on a close distance object, respectively.

In respective graphs, FNO denotes an F-number, Y denotes an image height, and NA denotes a numerical aperture. In more detail, in the graph of spherical aberration, a value of F-number FNO or a numerical aperture NA corresponding to the maximum aperture diameter is shown, and in the graph of astigmatism and the graph of distortion, the maximum values of the image height Y are respectively shown. In the graph of coma aberration, values of respective image heights are shown. In respective graphs, d denotes an aberration curve at d-line (wavelength $\lambda$=587.6 nm), and g denotes an aberration curve at g-line (wavelength $\lambda$=4 35.8 nm). In the graph showing astigmatism, a solid line indicates a sagittal image plane, and a broken line indicates a meridional image plane. In the graph of coma aberration, aberration curves at respective image heights Y are shown.

Incidentally, the above-described explanation regarding various aberration graphs is the same with respect to the other Examples.

As is apparent from the respective graphs, the optical system according to the present Example correct superbly various aberrations and has excellent optical performance, from the time when an infinite distance object is focused to the time when a close distance object is focused.

SECOND EXAMPLE

Figures 3A, 3B:
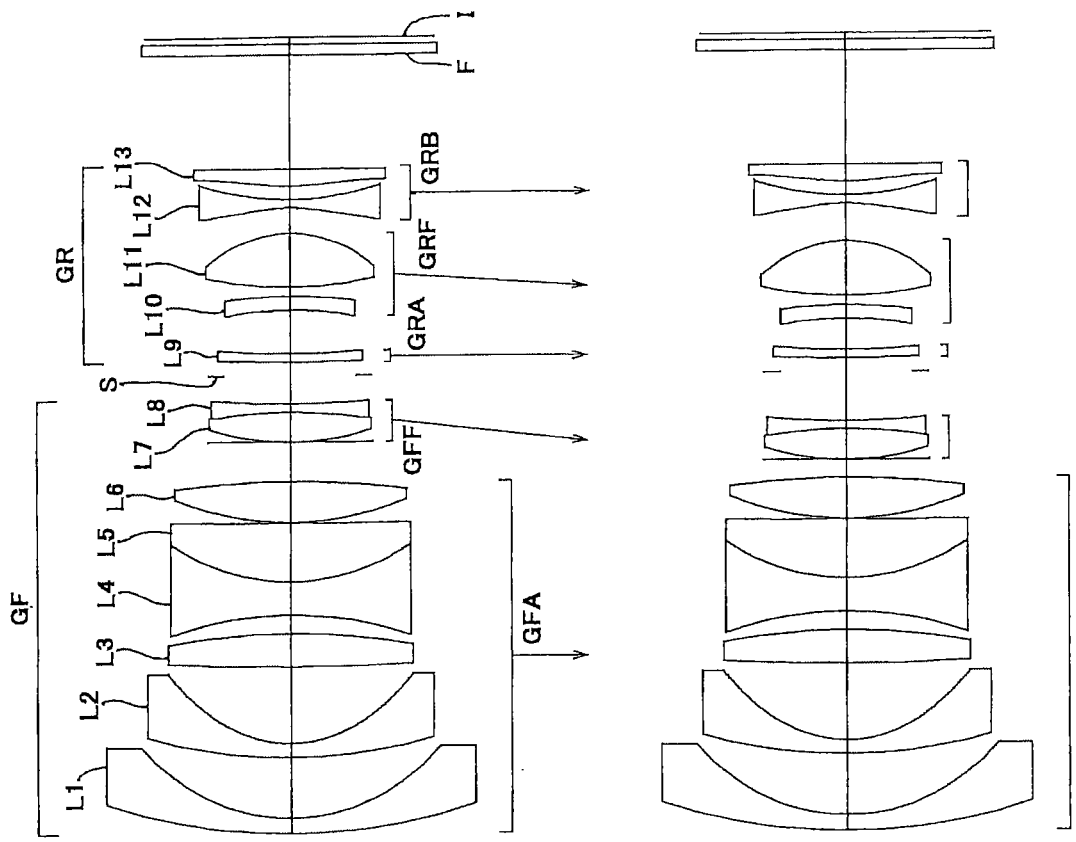
FIG. 3 is a sectional view showing an optical system according to a Second Example.

FIGS. 3A and 3B are sectional views showing an optical system according to a Second Example, respectively, upon focusing on an infinitely distant object and upon focusing on a closely distant object.

The optical system according to the Second Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the object side, a positive lens group GFA having positive refractive power and a front focusing group GFF having positive refractive power.

The positive lens group GFA consists of, in order from the object side, a negative meniscus lens L1 having a convex surface toward the object side, a negative meniscus lens L2 having a convex surface toward the object side, a double convex positive lens L3, a cemented lens constructed by a double concave negative lens L4 cemented with a positive lens L5 having a convex surface toward the object side, and a double convex positive lens L6.

The front focusing group GFF consists of a cemented lens constructed by, in order from the object side, a double convex positive lens L7 cemented with a double concave negative lens L8.

The rear group GR consists of, in order from the object side, a negative lens group GRA having negative refractive power, a rear focusing group GRF having positive refractive power, and a negative lens group GRB having negative refractive power.

The negative lens group GRA consists of a negative meniscus lens L9 having a convex surface toward the object side.

The rear focusing group GRF consists of, in order from the object side, a positive meniscus lens L10 having a convex surface toward the image side, and a double convex positive lens L11.

The negative lens group GRB consists of, in order from the object side, a double concave negative lens L12 and a plano-convex positive lens L13 having a convex surface toward the object side.

In the optical system according to the Second Example, focusing from an infinitely distant object to a close distance object is carried out by moving the front focusing group GFF and the rear focusing group GRF along the optical axis toward the object side. Meanwhile, upon carrying out focusing, the positive lens group GFA, the aperture stop S, the negative lens GRA and the negative lens group GRB are fixed in position.

Table 2 below shows various values of the optical system according to the Second Example.

TABLE 2

Second Example

[Surface Data]

| m | r | d | nd | vd |
|---|---|---|---|---|
| OP | ∞ | | 1.000000 | |
| 1) | 89.6637 | 2.3000 | 1.744000 | 44.80 |
| 2) | 29.1933 | 8.8855 | 1.000000 | |
| 3) | 80.9611 | 2.0000 | 1.588870 | 61.13 |
| *4) | 18.6119 | 11.2072 | 1.000000 | |
| 5) | 363.7622 | 4.9254 | 1.903658 | 31.31 |
| 6) | −101.1501 | 2.7468 | 1.000000 | |

TABLE 2-continued

| Second Example | | | | |
|---|---|---|---|---|
| 7) | −54.6987 | 5.0000 | 1.620040 | 36.40 |
| 8) | 32.2537 | 8.4862 | 1.851500 | 40.78 |
| 9) | 1296.4983 | 0.2000 | 1.000000 | |
| 10) | 45.2794 | 5.9980 | 1.851500 | 40.78 |
| 11) | −141.1734 | variable | | |
| 12) (IP) | ∞ | 0.0000 | 1.000000 | |
| 13) | 41.5816 | 4.4074 | 1.497820 | 82.57 |
| 14) | −76.5015 | 1.2000 | 1.808090 | 22.74 |
| 15) | 129.2012 | variable | | |
| 16) (Stop S) | ∞ | 2.0000 | 1.000000 | |
| 17) | 340.8668 | 1.2000 | 1.487490 | 70.32 |
| 18) | 102.2210 | variable | | |
| *19) | −96.3223 | 2.0483 | 1.860999 | 37.10 |
| 20) | −78.6357 | 1.3930 | 1.000000 | |
| 21) | 60.1667 | 7.9457 | 1.497820 | 82.57 |
| 22) | −18.5027 | variable | | |
| *23) | −27.6858 | 1.3000 | 1.689480 | 31.02 |
| 24) | 44.6169 | 1.9137 | 1.000000 | |
| *25) | 37.7956 | 2.4912 | 1.832199 | 40.10 |
| 26) | ∞ | 16.6751 | 1.000000 | |
| 27) | ∞ | 1.6000 | 1.516800 | 63.88 |
| 28) | ∞ | 1.0000 | 1.000000 | |
| Image plane | ∞ | | | |

[Aspherical Data]

| m | κ | A4 | A6 | A8 | A10 | A12 |
|---|---|---|---|---|---|---|
| 4 | 0.0000 | 8.02959E−06 | 2.44201E−09 | 1.15819E−11 | −5.28374E−15 | 0.20308E−16 |
| 19 | 0.0000 | −3.96671E−05 | −9.87679E−08 | 2.89585E−11 | −4.23597E−12 | −0.17965E−15 |
| 23 | 1.5084 | 1.22824E−04 | −8.31232E−07 | 5.29431E−09 | −2.14010E−11 | 0.35630E−13 |
| 25 | 1.0000 | −8.30036E−05 | 4.42223E−07 | −2.36224E−09 | 7.62005E−12 | −0.96482E−14 |

[Various Data]

| | | |
|---|---|---|
| f | 20.4000 | |
| Fno | 1.86668 | |
| 2ω | 96.1606 | |
| Ymax | 21.60 | |
| TL | 117.00851 | |
| Air converted TL | 116.46331 | |
| Bf | 19.27514 | |
| Air converted Bf | 18.72994 | |
| Ainf | 18.75122 | |
| Amod | 47.95116 | |
| | INF | CLO |
| f | 20.4000 | |
| β | | −0.1896 |
| d0 | ∞ | 86.3709 |
| d11 | 5.7481 | 2.6300 |
| d15 | 4.1550 | 7.2731 |
| d18 | 6.4768 | 4.6001 |
| d22 | 3.7053 | 5.5821 |
| 2ω | 96.1606 | |
| ω | 48.0803 | |

[Lens Group Data]

| Group | Starting surface | f |
|---|---|---|
| GF | 1 | 41.2883 |
| GR | 19 | 54.7498 |
| GFA | 1 | 51.4084 |
| GFF | 12 | 485.7773 |
| GRA | 16 | −300.0000 |
| GRF | 19 | 27.7405 |
| GRB | 23 | −60.6065 |

[Values for Conditional Expressions]

(1-1) XRF/XFF = 0.6019
(1-2) Bf/f = 0.9181
(1-3) ST/TL = 0.4225
(1-4) βRF/βFF = 0.3322
(1-5) (−fRB)/f = 2.9709
(1-6) Bf/TL = 0.16082
(1-7) XRF/f = 0.0920
(1-8) fRF/fFF = 0.0571

TABLE 2-continued

Second Example (1-9)  fF/fR = 0.7451
(1-10) fFA/fFF = 0.1058
(1-11) f/fFF = 0.0420
(1-12) f/fRF = 0.7354
(1-13) TL/(Fno · Bf) = 3.3311
(1-14) |Ainf − Amod|/f = 0.0392
(1-15) νFFp − νFFn = 59.8300
(1-16) (FFr2 + FFr1)/(FFr2 − FFr1) = 0.2957
(1-17) nRBp − nRBn = 0.1427
(1-18) nRBp + 0.005νRBp = 2.0327
(1-19) nRBn + 0.005νRBn = 1.8446
(2-1)  fRF/fFF = 0.0571
(2-2)  Bf/f = 0.9181
(2-3)  ST/TL = 0.4225
(2-4)  βRF/βFF = 0.3322
(2-5)  fF/fR = 0.7451
(2-6)  fFA/fFF = 0.1058
(2-7)  f/fFF = 0.0420
(2-8)  f/fRF = 0.7354
(2-9)  TL/(Fno · Bf) = 3.3311
(2-10) |Ainf − Amod|/f = 0.0392
(2-11) νFFp − νFFn = 59.8300
(2-12) (FFr2 + FFr1)/(FFr2 − FFr1) = 0.2957
(2-13) (−fRB)/f = 2.9709
(2-14) nRBp − nRBn = 0.1427
(2-15) nRBp + 0.005νRBp = 2.0327
(2-16) nRBn + 0.005νRBn = 1.8446

Figure 4A:
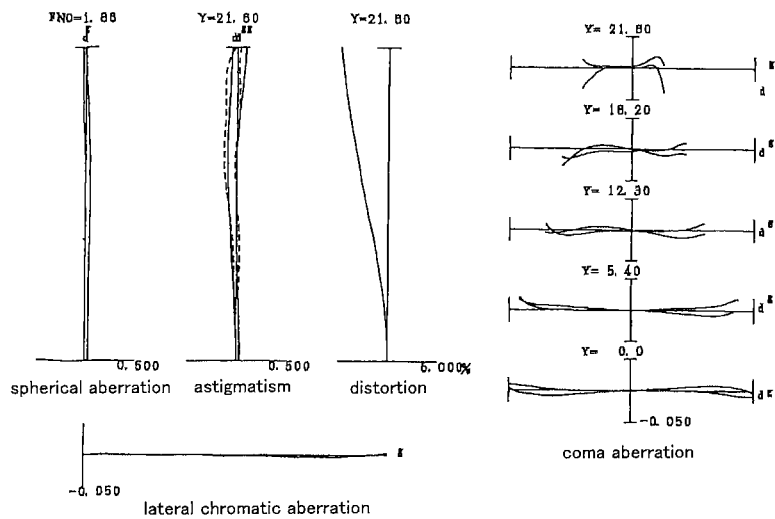
FIG. 4 is graphs showing various aberrations of the optical system according to the Second Example.
Figure 4B:
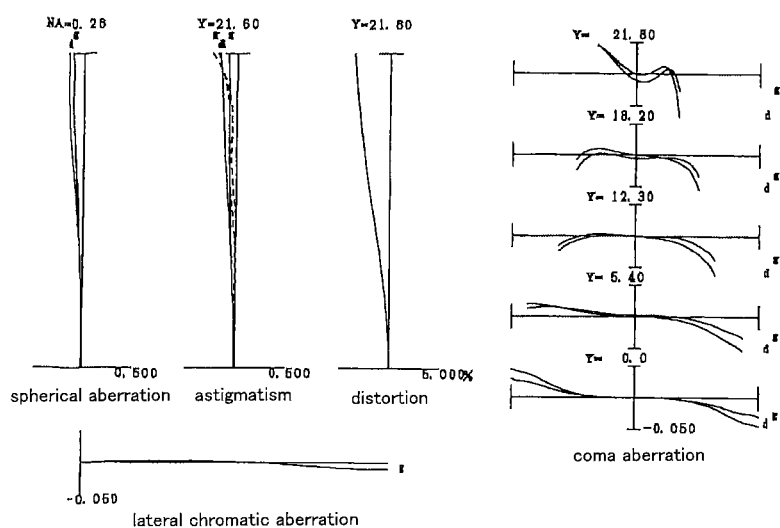

FIG. 4A and FIG. 4B are graphs showing various aberrations of the Second Example upon focusing on an infinitely distant object and on a close distance object, respectively.

As is apparent from the respective graphs, the optical system according to the present Example correct superbly various aberrations and has excellent optical performance, from the time when an infinitely distant object is focused to the time when a close distance object is focused.

THIRD EXAMPLE

Figures 5A, 5B:
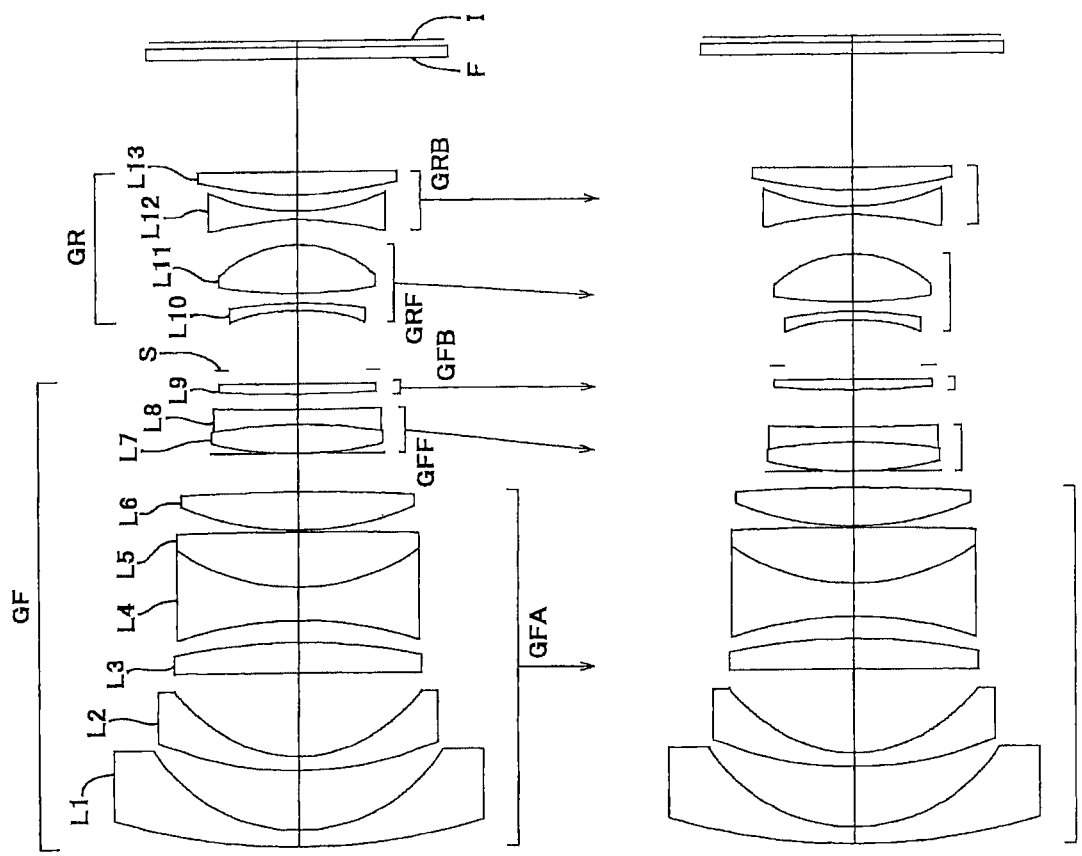
FIG. 5 is a sectional view showing an optical system according to a Third Example.

FIG. 5A and FIG. 5B are sectional views showing an optical system according to a Third Example, respectively, upon focusing on an infinitely distant object and upon focusing on a closely distant object.

The optical system according to the Third Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the object side, a positive lens group GFA having positive refractive power, a front focusing group GFF having positive refractive power, and a positive lens group GFB having positive refractive power.

The positive lens group GFA consists of, in order from the object side, a negative meniscus lens L1 having a convex surface toward the object side, a negative meniscus lens L2 having a convex surface toward the object side, a positive meniscus lens L3 having a convex surface toward the image side, a cemented lens constructed by a double concave negative lens L4 cemented with a double convex positive lens L5, and a double convex positive lens L6.

The front focusing group GFF consists of a cemented lens constructed by, in order from the object side, a double convex positive lens L7 cemented with a double concave negative lens L8.

The positive lens group GFB consists of a plano-convex positive lens L9 having a convex surface toward the object side.

The rear group GR consists of, in order from the object side, a rear focusing group GRF having positive refractive power, and a negative lens group GRB having negative refractive power.

The rear focusing group GRF consists of, in order from the object side, a negative meniscus lens L10 having a convex surface toward the image side, and a double convex positive lens L11.

The negative lens group GRB consists of, in order from the object side, a double concave negative lens L12 and a plano-convex positive lens L13 having a convex surface toward the object side.

In the optical system according to the Third Example, focusing from an infinite distance object to a close distance object is carried out by moving the front focusing group GFF and the rear focusing group GRF along the optical axis toward the object side. Meanwhile, upon carrying out focusing, the positive lens group GFA, the positive lens group GFB, the aperture stop S and the negative lens group GRB are fixed in position.

Table 3 below shows various values of the optical system according to the Third Example.

TABLE 3

| | | Third Example | | | |
|---|---|---|---|---|---|
| | | [Surface Data] | | | |
| m | r | d | nd | νd | |
| OP | ∞ | | 1.000000 | | |
| 1) | 97.1220 | 2.5000 | 1.744000 | 44.80 | |
| 2) | 25.5141 | 8.5243 | 1.000000 | | |
| 3) | 54.3787 | 2.0000 | 1.588870 | 61.13 | |
| *4) | 19.3078 | 12.0516 | 1.000000 | | |
| 5) | −2541.0384 | 4.4832 | 1.903658 | 31.31 | |
| 6) | −89.4461 | 3.2029 | 1.000000 | | |
| 7) | −55.7529 | 4.8378 | 1.620040 | 36.40 | |
| 8) | 31.5163 | 8.0322 | 1.851500 | 40.78 | |
| 9) | −603.1050 | 0.2000 | 1.000000 | | |
| 10) | 44.5738 | 5.5569 | 1.851500 | 40.78 | |
| 11) | −295.5770 | variable | 1.000000 | | |
| 12) (IP) | ∞ | 0.0000 | 1.000000 | | |
| 13) | 56.3391 | 4.1355 | 1.497820 | 82.57 | |
| 14) | −77.0418 | 2.0843 | 1.808090 | 22.74 | |
| 15) | 274.8271 | variable | 1.000000 | | |
| 16) | 150.0000 | 1.6000 | 1.487490 | 70.32 | |
| 17) | ∞ | 2.0000 | 1.000000 | | |
| 18) (Stop S) | ∞ | variable | 1.000000 | | |
| *19) | −43.8243 | 1.2000 | 1.860999 | 37.10 | |
| 20) | −57.8611 | 1.3930 | 1.000000 | | |
| 21) | 70.5507 | 6.9944 | 1.497820 | 82.57 | |
| 22) | −17.1866 | variable | 1.000000 | | |
| *23) | −32.2891 | 1.3000 | 1.689480 | 31.02 | |
| 24) | 34.1671 | 2.2422 | 1.000000 | | |
| 25) | 37.1466 | 3.3825 | 1.832199 | 40.10 | |
| 26) | ∞ | 16.2621 | 1.000000 | | |
| 27) | ∞ | 1.6000 | 1.516800 | 63.88 | |
| 28) | ∞ | 1.0000 | 1.000000 | | |
| Image plane | ∞ | | | | |

| | | [Aspherical Data] | | | |
|---|---|---|---|---|---|
| m | κ | A4 | A6 | A8 | A10 | A12 |
| 4 | 0.0000 | 6.01620E−06 | 6.79387E−09 | −4.02993E−11 | 1.20323E−13 | −0.15113E−15 |
| 19 | 0.0000 | −4.87007E−05 | −8.95876E−08 | −3.14165E−10 | −2.43481E−12 | −0.23860E−13 |
| 23 | 5.5636 | 1.08484E−04 | −7.41132E−07 | 6.01375E−09 | −3.07989E−11 | 0.79304E−13 |
| 25 | 1.0000 | −6.01745E−05 | 3.38304E−07 | −1.58920E−09 | 5.05882E−12 | −0.65680E−14 |

[Various Data]

| | | |
|---|---|---|
| f | 20.2698 | |
| Fno | 1.84435 | |
| 2ω | 96.5219 | |
| Ymax | 21.60 | |
| TL | 116.60345 | |
| Air converted TL | 116.05825 | |
| Bf | 18.86209 | |
| Air converted Bf | 18.31689 | |
| Ainf | 48.94839 | |
| Amod | 48.37479 | |
| | INF | CLO |
| f | 20.2698 | |
| β | | −0.1902 |
| d0 | ∞ | 85.4430 |
| d11 | 5.6165 | 2.4956 |
| d15 | 2.2463 | 5.3672 |
| d18 | 8.5521 | 6.5490 |
| d22 | 3.6056 | 5.6088 |
| 2ω | 96.5219 | |
| ω | 48.2609 | |

| | [Lens Group Data] | |
|---|---|---|
| Group | Starting surface | f |
| GF | 1 | 34.2040 |
| GR | 17 | 66.9283 |
| GFA | 1 | 54.0606 |
| GFF | 12 | 486.5933 |
| GFB | 16 | 307.6986 |

TABLE 3-continued

Third Example

| | | |
|---|---|---|
| GRF | 19 | 31.4696 |
| GRB | 23 | −58.8568 |

[Values for Conditional Expressions]

(1-1) XRF/XFF = 0.6418
(1-2) Bf/f = 0.9037
(1-3) ST/TL = 0.4049
(1-4) βRF/βFF = 0.5105
(1-5) (−fRB)/f = 2.9037
(1-6) Bf/TL = 0.1578
(1-7) XRF/f = 0.0988
(1-8) fRF/fFF = 0.0647
(1-9) fF/fR = 0.5111
(1-10) fFA/fFF = 0.1111
(1-11) f/fFF = 0.0417
(1-12) f/fRF = 0.6441
(1-13) TL/(Fno · Bf) = 3.4354
(1-14) |Ainf − Amod|/f = 0.0283
(1-15) νFFp − νFFn = 59.8300
(1-16) (FFr2 + FFr1)/(FFr2 − FFr1) = 0.1552
(1-17) nRBp − nRBn = 0.1427
(1-18) nRBp + 0.005νRBp = 2.0327
(1-19) nRBn + 0.005νRBn = 1.8446
(2-1) fRF/fFF = 0.0647
(2-2) Bf/f = 0.9037
(2-3) ST/TL = 0.4049
(2-4) βRF/βFF = 0.5105
(2-5) fF/fR = 0.5111
(2-6) fFA/fFF = 0.1111
(2-7) f/fFF = 0.0417
(2-8) f/fRF = 0.6441
(2-9) TL/(Fno · Bf) = 3.4354
(2-10) |Ainf − Amod|/f = 0.0283
(2-11) νFFp − νFFn = 59.8300
(2-12) (FFr2 + FFr1)/(FFr2 − FFr1) = 0.1552
(2-13) (−fRB)/f = 2.9037
(2-14) nRBp − nRBn = 0.1427
(2-15) nRBp + 0.005νRBp = 2.0327
(2-16) nRBn + 0.005νRBn = 1.8446

Figure 6A:
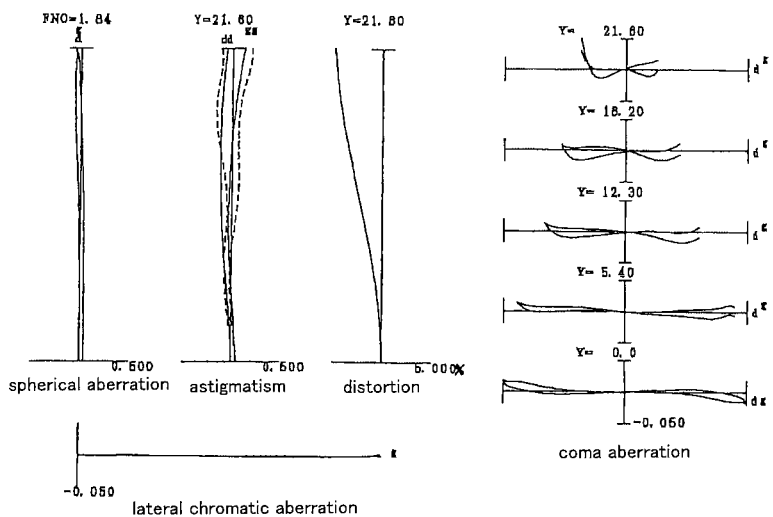
FIG. 6 is graphs showing various aberrations of the optical system according to the Third Example.
Figure 6B:
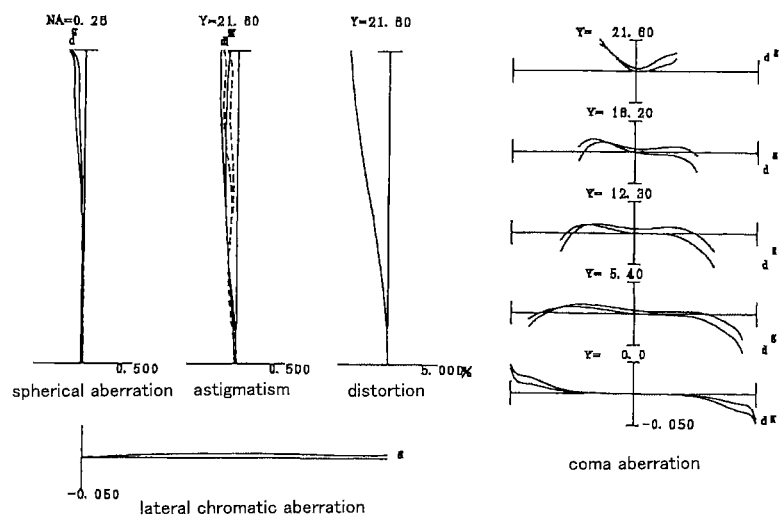

FIG. 6A and FIG. 6B are graphs showing various aberrations of the Third Example upon focusing on an infinitely distant object and on a close distance object, respectively.

As is apparent from the respective graphs, it is understood that the optical system according to the present Example correct superbly various aberrations and has excellent optical performance, from the time when an infinitely distant object is focused to the time when a close distance object is focused.

FOURTH EXAMPLE

FIG. 7A and FIG. 7B are sectional views showing an optical system according to a Fourth Example, respectively, upon focusing on an infinitely distant object and upon focusing on a closely distant object.

The optical system according to the Fourth Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the object side, a positive lens group GFA having positive refractive power, and a front focusing group GFF having positive refractive power.

The positive lens group GFA consists of, in order from the object side, a negative meniscus lens L1 having a convex surface toward the object side, a negative meniscus lens L2 having a convex surface toward the object side, a positive meniscus lens L3 having a convex surface toward the image side, a cemented lens constructed by a double concave negative lens L4 cemented with a double convex positive lens L5, and a double convex positive lens L6.

The front focusing group GFF consists of a cemented lens constructed by, in order from the object side, a double convex positive lens L7 cemented with a double concave negative lens L8.

The rear group GR consists of, in order from the object side, a rear focusing group GRF having positive refractive power, and a negative lens group GRB having negative refractive power.

The rear focusing group GRF consists of, in order from the object side, a positive meniscus lens L9 having a convex surface toward the image side, and a double convex positive lens L10.

The negative lens group GRB consists of, in order from the object side, a double concave negative lens L11 and a plano-convex positive lens L12 having a convex surface toward the object side.

In the optical system according to the Fourth Example, focusing from an infinite distance object to a close distance object is carried out by moving the front focusing group GFF and the rear focusing group GRF along the optical axis toward the object side. Meanwhile, upon carrying out focusing, the positive lens group GFA, the aperture stop S and the negative lens group GRB are fixed in position.

Table 4 below shows various values of the optical system according to the Fourth Example.

TABLE 4

Fourth Example

[Surface Data]

| m | r | d | nd | νd |
|---|---|---|---|---|
| OP | ∞ |  | 1.000000 |  |
| 1) | 105.1730 | 2.5000 | 1.717000 | 47.97 |
| 2) | 28.0761 | 6.9819 | 1.000000 |  |
| 3) | 54.1318 | 2.0000 | 1.568830 | 56.00 |
| *4) | 19.1358 | 12.2439 | 1.000000 |  |
| 5) | −1386.9567 | 3.2295 | 1.903658 | 31.31 |
| 6) | −106.4455 | 2.3599 | 1.000000 |  |
| 7) | −63.4529 | 3.3027 | 1.620040 | 36.40 |
| 8) | 29.5793 | 7.1269 | 1.851500 | 40.78 |
| 9) | −2671.7190 | 2.3092 | 1.000000 |  |
| 10) | 42.2306 | 5.3571 | 1.851500 | 40.78 |
| 11) | −303.1326 | variable | 1.000000 |  |
| 12) (IP) | ∞ | 0.0000 | 1.000000 |  |
| 13) | 58.1267 | 4.5140 | 1.497820 | 82.57 |
| 14) | −67.7518 | 2.5150 | 1.808090 | 22.74 |
| 15) | 464.6438 | variable | 1.000000 |  |
| 16) (Stop S) | ∞ | variable | 1.000000 |  |
| *17) | −58.9498 | 2.0443 | 1.860999 | 37.10 |
| 18) | −56.5635 | 1.3930 | 1.000000 |  |
| 19) | 119.9079 | 7.3545 | 1.497820 | 82.57 |
| 20) | −17.3792 | variable | 1.000000 |  |
| *21) | −27.6859 | 1.3000 | 1.689480 | 31.02 |
| 22) | 41.8186 | 1.7994 | 1.000000 |  |
| *23) | 39.3203 | 3.4174 | 1.808350 | 40.55 |
| 24) | ∞ | 18.4523 | 1.000000 |  |
| 25) | ∞ | 1.6000 | 1.516800 | 64.13 |
| 26) | ∞ | 0.9866 | 1.000000 |  |
| Image plane | ∞ |  |  |  |

[Aspherical Data]

| m | κ | A4 | A6 | A8 | A10 | A12 |
|---|---|---|---|---|---|---|
| 4 | 0.0000 | 1.01451E−05 | 3.09662E−10 | 2.61797E−11 | −5.26695E−14 | 0.49110E−16 |
| 17 | 0.0000 | −4.44232E−05 | −7.92259E−08 | −9.22854E−10 | 6.75991E−12 | −0.57395E−13 |
| 21 | 2.0933 | 1.10413E−04 | −7.62492E−07 | 5.30334E−09 | −2.25140E−11 | 0.40859E−13 |
| 23 | 1.0000 | −7.16079E−05 | 4.39983E−07 | −2.36885E−09 | 7.66187E−12 | −0.10235E−13 |

[Various Data]

| | | |
|---|---|---|
| f | 23.0000 | |
| Fno | 1.85172 | |
| 2ω | 90.6552 | |
| Ymax | 21.60 | |
| TL | 114.98658 | |
| Air converted TL | 114.44138 | |
| Bf | 21.03884 | |
| Air converted Bf | 20.49364 | |
| Ainf | 45.31854 | |
| Amod | 44.51854 | |
| | INF | CLO |
| f | 23.0000 | |
| β | | −0.1828 |
| d0 | ∞ | 104.9388 |
| d11 | 5.9052 | 2.4996 |
| d15 | 4.0403 | 7.4460 |
| d16 | 8.5116 | 6.6677 |
| d20 | 3.7419 | 5.5858 |
| 2ω | 90.6552 | |
| ω | 45.3276 | |

[Lens Group Data]

| Group | Starting surface | f |
|---|---|---|
| GF | 1 | 44.7746 |
| GR | 17 | 64.6935 |
| GFA | 1 | 57.4905 |
| GFF | 12 | 413.4387 |

TABLE 4-continued

Fourth Example

| | | |
|---|---|---|
| GRF | 17 | 29.9133 |
| GRB | 21 | −52.0504 |

[Values for Conditional Expressions]

(1-1) XRF/XFF = 0.5414
(1-2) Bf/f = 0.8910
(1-3) ST/TL = 0.4374
(1-4) βRF/βFF = 0.4327
(1-5) (−fRB)/f = 2.2631
(1-6) Bf/TL = 0.1791
(1-7) XRF/f = 0.0802
(1-8) fRF/fFF = 0.0724
(1-9) fF/fR = 0.6921
(1-10) fFA/fFF = 0.1391
(1-11) f/fFF = 0.0556
(1-12) f/fRF = 0.7689
(1-13) TL/(Fno · Bf) = 3.0157
(1-14) |Ainf − Amod|/f = 0.0348
(1-15) νFFp − νFFn = 59.8300
(1-16) (FFr2 + FFr1)/(FFr2 − FFr1) = 0.0765
(1-17) nRBp − nRBn = 0.1189
(1-18) nRBp + 0.005νRBp = 2.0111
(1-19) nRBn + 0.005νRBn = 1.8446
(2-1) fRF/fFF = 0.0724
(2-2) Bf/f = 0.8910
(2-3) ST/TL = 0.4374
(2-4) βRF/βFF = 0.4327
(2-5) fF/fR = 0.6921
(2-6) fFA/fFF = 0.1391
(2-7) f/fFF = 0.0556
(2-8) f/fRF = 0.7689
(2-9) TL/(Fno · Bf) = 3.0157
(2-10) |Ainf − Amod|/f = 0.0348
(2-11) νFFp − νFFn = 59.8300
(2-12) (FFr2 + FFr1)/(FFr2 − FFr1) = 0.0765
(2-13) (−fRB)/f = 2.2631
(2-14) nRBp − nRBn = 0.1189
(2-15) nRBp + 0.005νRBp = 2.0111
(2-16) nRBn + 0.005νRBn = 1.8446

Figure 8A:
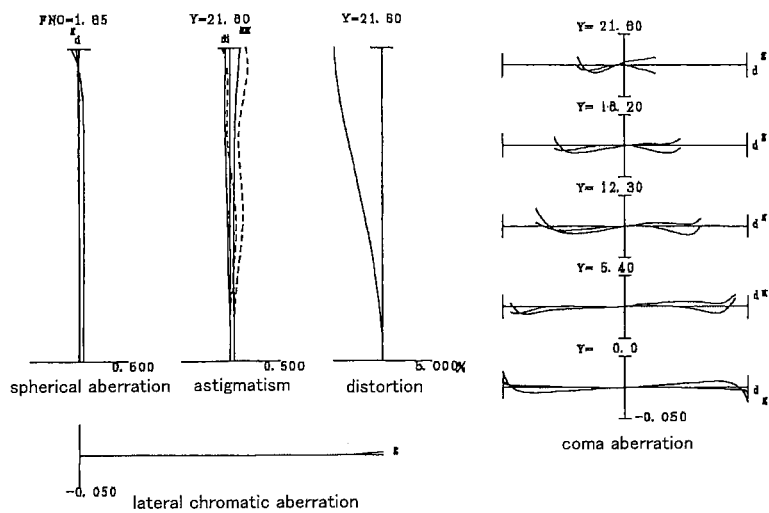
FIG. 8 is graphs showing various aberrations of the optical system according to the Fourth Example.
Figure 8B:
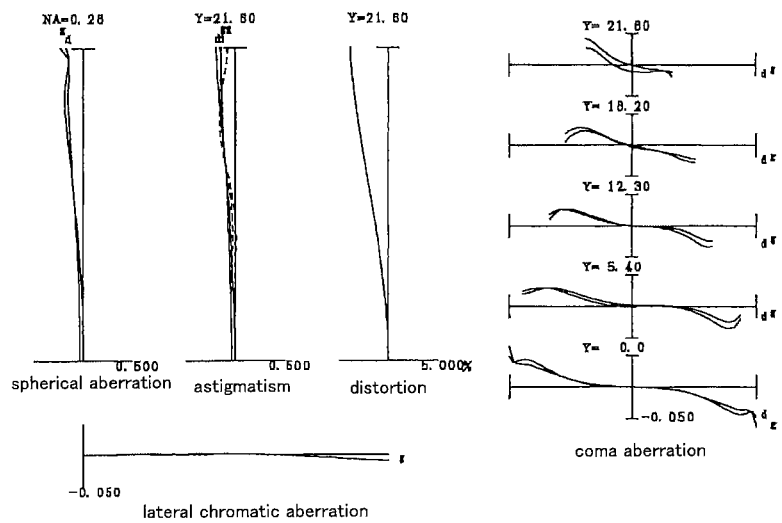

FIG. 8A and FIG. 8B are graphs showing various aberrations of the Fourth Example upon focusing on an infinitely distant object and on a close distance object, respectively.

As is apparent from the respective graphs, it is understood that the optical system according to the present Example correct superbly various aberrations and has excellent optical performance, from the time when an infinitely distant object is focused to the time when a close distance object is focused.

FIFTH EXAMPLE

Figures 9A, 9B:
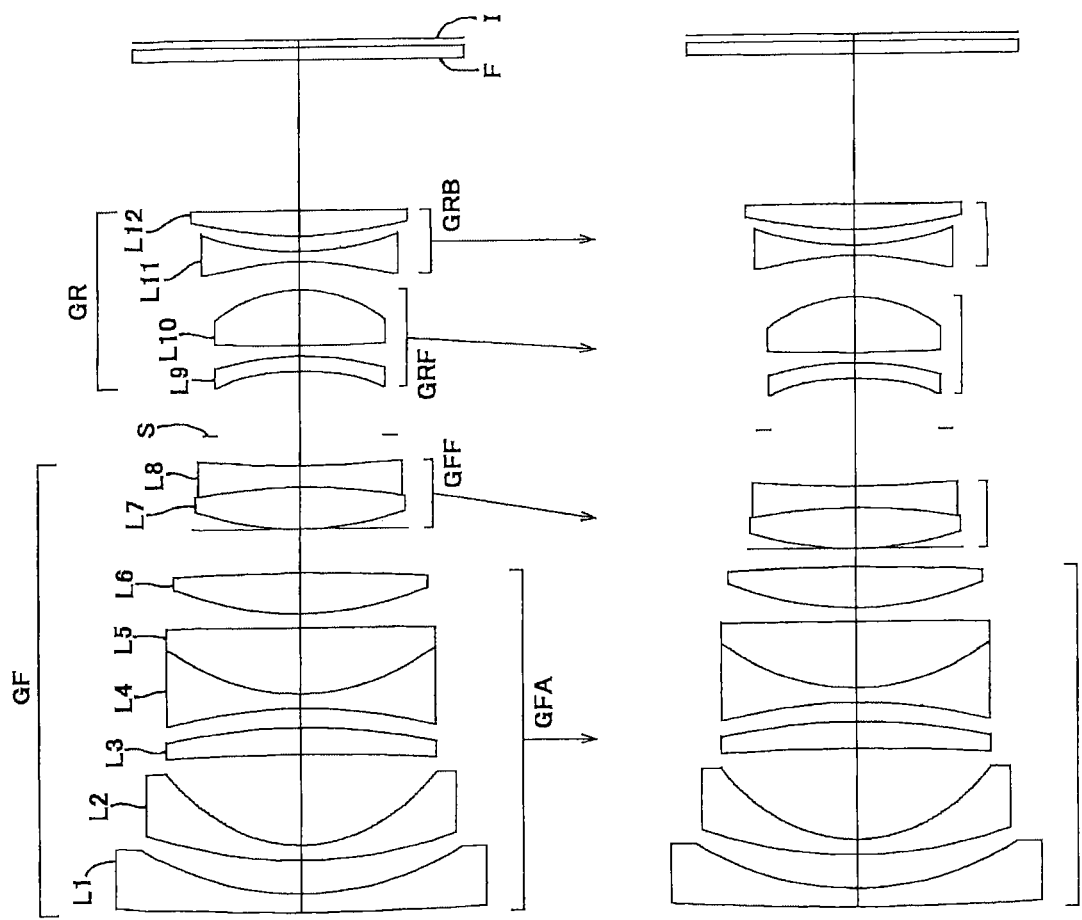
FIG. 9 is a sectional view showing an optical system according to a Fifth Example.

FIG. 9A and FIG. 9B are sectional views showing an optical system according to a Fifth Example, respectively, upon focusing on an infinitely distant object and upon focusing on a closely distant object.

The optical system according to the Fifth Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the optical axis, a positive lens group GFA having positive refractive power, and a front focusing group GFF having positive refractive power.

The positive lens group GFA consists of, in order from the object side, a negative meniscus lens L1 having a convex surface toward the object side, a negative meniscus lens L2 having a convex surface toward the object side, a positive meniscus lens L3 having a convex surface toward the image side, a cemented lens constructed by a double concave negative lens L4 cemented with a double convex positive lens L5, and a double convex positive lens L6.

The front focusing group GFF consists of a cemented lens constructed by, in order from the object side, a double convex positive lens L7 cemented with a double concave negative lens L8.

The rear group GR consists of, in order from the object side, a rear focusing group GRF having positive refractive power, and a negative lens group GRB having negative refractive power.

The rear focusing group GRF consists of, in order from the object side, a positive meniscus lens L9 having a convex surface toward the image side, and a double convex positive lens L10.

The negative lens group GRB consists of, in order from the object side, a double concave negative lens L11 and a plano-convex positive lens L12 having a convex surface toward the object side.

In the optical system according to the Fifth Example, focusing from an infinitely distant object to a close distance object is carried out by moving the front focusing group GFF and the rear focusing group GRF along the optical axis toward the object side. Meanwhile, upon carrying out focusing, the front lens group GFA, the aperture stop S and the negative lens group GRB are fixed in position.

Table 5 below shows various values of the optical system according to the Fifth Example.

TABLE 5

Fifth Example

[Surface Data]

| m | r | d | nd | νd |
|---|---|---|---|---|
| OP | ∞ | | 1.000000 | |
| 1) | 397.0808 | 2.5000 | 1.655234 | 44.96 |
| 2) | 41.1626 | 4.3963 | 1.000000 | |
| 3) | 63.8851 | 2.0000 | 1.556354 | 55.30 |
| *4) | 19.8504 | 11.8696 | 1.000000 | |
| 5) | −335.9120 | 3.4498 | 1.891325 | 32.78 |
| 6) | −92.0502 | 2.6562 | 1.000000 | |
| 7) | −66.8872 | 1.9012 | 1.620040 | 36.40 |
| 8) | 29.5548 | 8.8222 | 1.851500 | 40.78 |
| 9) | −2141.5083 | 1.8071 | 1.000000 | |
| 10) | 44.7902 | 5.3588 | 1.851500 | 40.78 |
| 11) | −299.4337 | variable | 1.000000 | |
| 12) (IP) | ∞ | 0.0000 | 1.000000 | |
| 13) | 44.5714 | 5.4239 | 1.497820 | 82.57 |
| 14) | −78.9223 | 2.8047 | 1.805180 | 25.45 |
| 15) | 160.0738 | variable | 1.000000 | |
| 16) (Stop S) | ∞ | variable | 1.000000 | |
| *17) | −46.7376 | 2.0809 | 1.860999 | 37.10 |
| 18) | −42.7565 | 1.3930 | 1.000000 | |
| 19) | 262.5587 | 7.2654 | 1.497820 | 82.57 |
| 20) | −18.8498 | variable | 1.000000 | |
| *21) | −30.1253 | 1.3000 | 1.689480 | 31.02 |
| 22) | 40.4709 | 1.9883 | 1.000000 | |
| *23) | 37.2836 | 3.3332 | 1.808350 | 40.55 |
| 24) | ∞ | 19.7825 | 1.000000 | |
| 25) | ∞ | 1.6000 | 1.516800 | 64.13 |
| 26) | ∞ | 1.0059 | 1.000000 | |
| Image plane | ∞ | | | |

[Aspherical Data]

| m | κ | A4 | A6 | A8 | A10 | A12 |
|---|---|---|---|---|---|---|
| 4 | 0.0000 | 9.77757E−06 | −1.86856E−10 | 3.61428E−11 | −7.97773E−14 | 0.95711E−16 |
| 17 | 0.0000 | −3.98939E−05 | −3.97571E−08 | −4.94760E−10 | 2.83561E−12 | −0.20949E−13 |
| 21 | 2.6936 | 1.03810E−04 | −7.47656E−07 | 5.22059E−09 | −2.32930E−11 | 0.46411E−13 |
| 23 | 1.0000 | −6.38484E−05 | 4.30545E−07 | −2.33889E−09 | 8.08344E−12 | −0.12063E−13 |

[Various Data]

| | | |
|---|---|---|
| f | 27.0000 | |
| Fno | 1.8511 | |
| 2ω | 80.1035 | |
| Ymax | 21.60 | |
| TL | 115.00586 | |
| Air converted TL | 114.46066 | |
| Bf | 22.38833 | |
| Air converted Bf | 21.84313 | |
| Ainf | 40.75144 | |
| Amod | 39.9517 | |
| | INF | CLO |
| f | 27.0000 | |
| β | | −0.1432 |
| d0 | ∞ | 168.6086 |
| d11 | 5.9402 | 2.4572 |
| d15 | 4.0055 | 7.4884 |
| d16 | 8.4916 | 6.7346 |
| d20 | 3.8298 | 5.5867 |
| 2ω | 80.1035 | |
| ω | 40.0518 | |

[Lens Group Data]

| Group | Starting surface | f |
|---|---|---|
| GF | 1 | 50.0572 |
| GR | 17 | 68.9718 |
| GFA | 1 | 67.4727 |
| GFF | 12 | 375.4378 |

TABLE 5-continued

| Fifth Example | | |
|---|---|---|
| GRF | 17 | 32.8785 |
| GRB | 21 | −60.8771 |

[Values for Conditional Expressions]

(1-1) XRF/XFF = 0.5044
(1-2) Bf/f = 0.8090
(1-3) ST/TL = 0.4502
(1-4) βRF/βFF = 0.4980
(1-5) (-fRB)/f = 2.2547
(1-6) Bf/TL = 0.1908
(1-7) XRF/f = 0.0651
(1-8) fRF/fFF = 0.0876
(1-9) fF/fR = 0.7258
(1-10) fFA/fFF = 0.1797
(1-11) f/fFF = 0.0719
(1-12) f/fRF = 0.8212
(1-13) TL/(Fno · Bf) = 2.8308
(1-14) |Ainf − Amod|/f = 0.0296
(1-15) νFFp − νFFn = 57.3000
(1-16) (FFr2 + FFr1)/(FFr2 − FFr1) = 0.2782
(1-17) nRBp − nRBn = 0.1189
(1-18) nRBp + 0.005νRBp = 2.0111
(1-19) nRBn + 0.005νRBn = 1.8446
(2-1) fRF/fFF = 0.0876
(2-2) Bf/f = 0.8090
(2-3) ST/TL = 0.4502
(2-4) βRF/βFF = 0.4980
(2-5) fF/fR = 0.7258
(2-6) fFA/fFF = 0.1797
(2-7) f/fFF = 0.0719
(2-8) f/fRF = 0.8212
(2-9) TL/(Fno · Bf) = 2.8308
(2-10) |Ainf − Amod|/f = 0.0296
(2-11) νFFp − νFFn = 57.3000
(2-12) (FFr2 + FFr1)/(FFr2 − FFr1) = 0.2782
(2-13) (−fRB)/f = 2.2547
(2-14) nRBp − nRBn = 0.1189
(2-15) nRBp + 0.005νRBp = 2.0111
(2-16) nRBn + 0.005νRBn = 1.8446

Figure 10A:
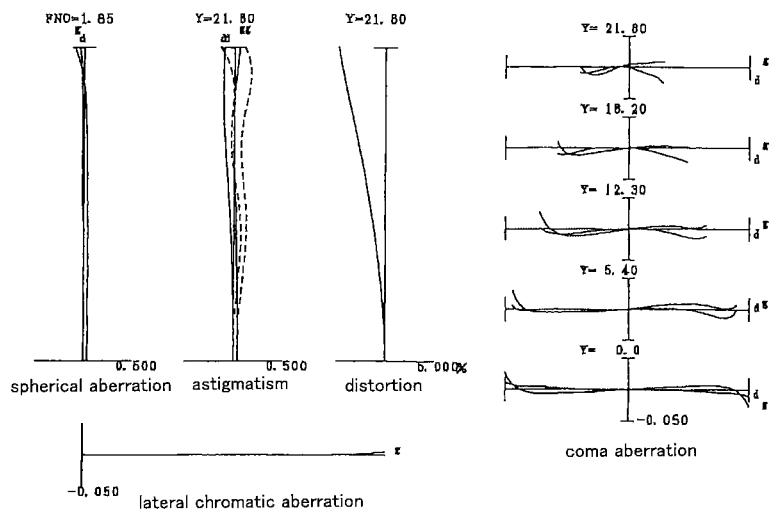
FIG. 10 is graphs showing various aberrations of the optical system according to the Fifth Example.
Figure 10B:
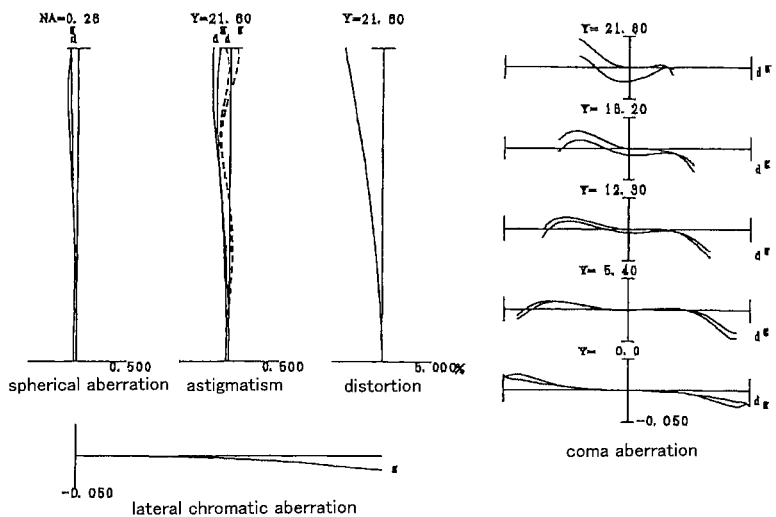

FIG. 10A and FIG. 10B are graphs showing various aberrations of the Fifth Example upon focusing on an infinitely distant object and on a close distance object, respectively.

As is apparent from the respective graphs, it is understood that the optical system according to the present Example correct superbly various aberrations and has excellent optical performance, from the time when an infinitely distant object is focused to the time when a close distance object is focused.

SIXTH EXAMPLE

Figures 11A, 11B:
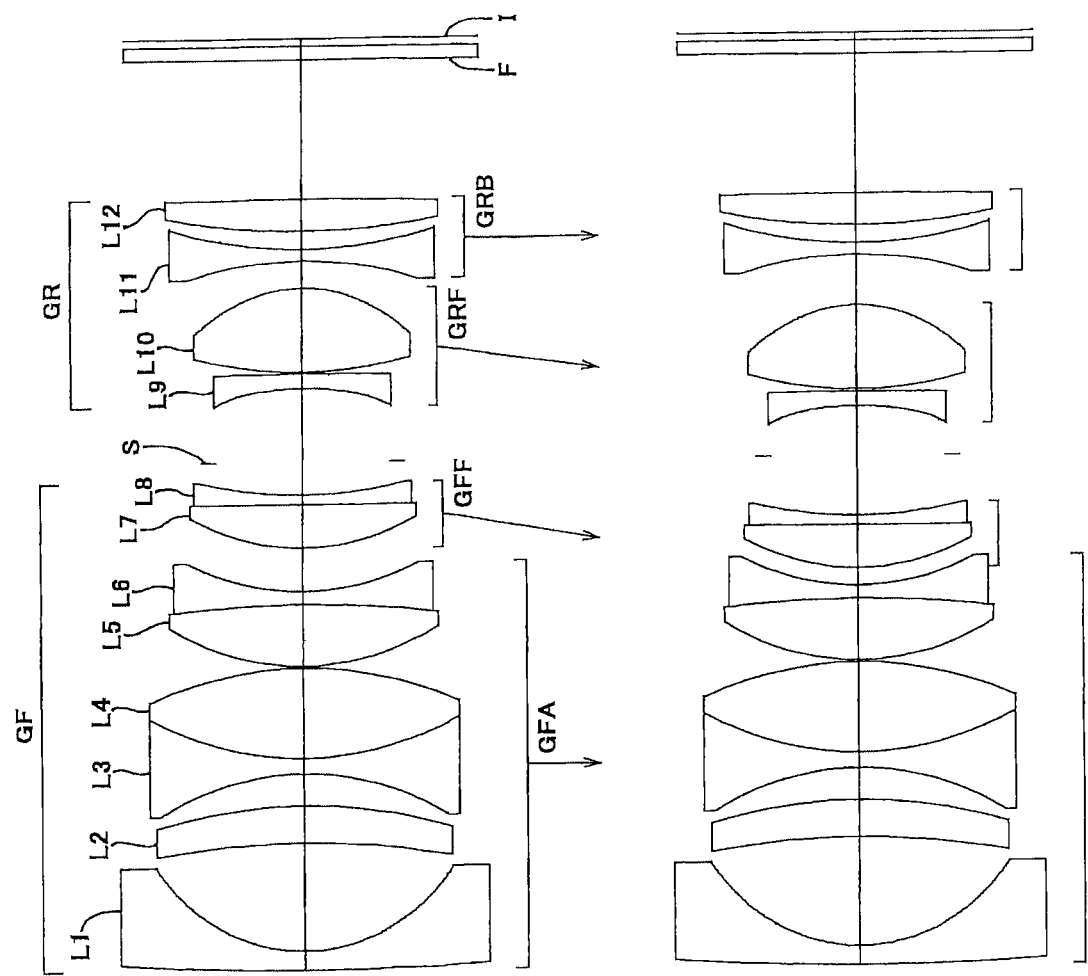
FIG. 11 is a sectional view showing an optical system according to a Sixth Example.

FIG. 11A and FIG. 11B are sectional views showing an optical system according to a Sixth Example, respectively, upon focusing on an infinitely distant object and upon focusing on a closely distant object.

The optical system according to the Sixth Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the object side, a positive lens group GFA having positive refractive power, and a front focusing group GFF having positive refractive power.

The positive lens group GFA consists of, in order from the object side, a negative meniscus lens L1 having a convex surface toward the object side, a positive meniscus lens L2 having a convex surface toward the image side, a cemented lens constructed by a double concave negative lens L3 cemented with a double convex positive lens L4, and a cemented lens constructed by a double convex positive lens L5 cemented with a double concave negative lens L6.

The front focusing group GFF consists of a cemented lens constructed by, in order from the object side, a plano-convex positive lens L7 having a convex surface toward the object side cemented with a plano-concave negative lens L8 having a concave surface toward the image side.

The rear group GR consists of, in order from the object side, a rear focusing group GRF having positive refractive power, and a negative lens group GRB having negative refractive power.

The rear focusing group GRF consists of, in order from the object side, a negative meniscus lens L9 having a convex surface toward the image side, and a double convex positive lens L10.

The negative lens group GRB consists of, in order from the object side, a double concave negative lens L11 and a plano-convex positive lens L12 having a convex surface toward the object side.

In the optical system according to the Sixth Example, focusing from an infinite distance object to a close distance object is carried out by moving the front focusing group GFF and the rear focusing group GRF along the optical axis toward the object side. Meanwhile, upon carrying out focusing, the front lens group GFA, the aperture stop S and the negative lens group GRB are fixed in position.

Table 6 below shows various values of the optical system according to the Sixth Example.

TABLE 6

| Sixth Example |

[Surface Data]

| m | r | d | nd | vd |
|---|---|---|---|---|
| OP | ∞ | | 1.000000 | |
| 1) | 348.4574 | 2.4000 | 1.504120 | 59.90 |
| *2) | 21.4609 | 13.4044 | 1.000000 | |
| 3) | −105.0871 | 4.5427 | 1.922860 | 20.88 |
| 4) | −64.8044 | 3.8789 | 1.000000 | |
| 5) | −34.8938 | 2.0000 | 1.632947 | 34.71 |
| 6) | 40.3703 | 11.1155 | 1.834810 | 42.73 |
| 7) | −48.0907 | 0.2187 | 1.000000 | |
| 8) | 31.3856 | 7.6538 | 1.834810 | 42.73 |
| 9) | −144.1208 | 1.6000 | 1.657414 | 32.27 |
| 10) | 31.7227 | variable | 1.000000 | |
| 11) | 28.8127 | 5.3410 | 1.497820 | 82.57 |
| 12) | ∞ | 1.2002 | 1.713322 | 30.66 |
| 13) | 55.4010 | variable | 1.000000 | |
| 14) (Stop S) | ∞ | variable | 1.000000 | |
| *15) | −46.5696 | 1.8000 | 1.728267 | 45.36 |
| 16) | −592.3084 | 0.2365 | 1.000000 | |
| 17) | 51.5274 | 10.3228 | 1.497820 | 82.57 |
| *18) | −18.0668 | variable | 1.000000 | |
| 19) | −48.0041 | 1.4000 | 1.593929 | 38.23 |
| 20) | 55.8143 | 2.2498 | 1.000000 | |
| *21) | 102.4799 | 3.8639 | 1.906998 | 28.77 |
| 22) | −1000.0000 | 17.2535 | 1.000000 | |
| 23) | ∞ | 1.6000 | 1.516800 | 64.13 |
| 24) | ∞ | 0.9835 | 1.000000 | |
| Image plane | ∞ | | | |

[Aspherical Surface Data]

| m | κ | A4 | A6 | A8 | A10 | A12 |
|---|---|---|---|---|---|---|
| 2 | 0.0000 | 1.12877E−05 | 7.54278E−09 | 3.77786E−11 | −8.64032E−14 | 0.22683E−15 |
| 15 | 0.0000 | −3.85799E−05 | −9.55276E−08 | 2.02210E−10 | −5.21627E−12 | 0.22387E−13 |
| 18 | 1.0000 | 1.16752E−05 | −2.00823E−08 | 2.86154E−10 | −7.78259E−13 | 0.34805E−14 |
| 21 | 1.0000 | 3.63716E−06 | −5.43228E−09 | 2.25434E−11 | −7.54064E−14 | 0.77846E−16 |

[Various Data]

| | | |
|---|---|---|
| f | 34.0000 | |
| Fno | 1.84694 | |
| 2ω | 68.7634 | |
| Ymax | 21.60 | |
| YL | 114.98352 | |
| Air converted TL | 114.43832 | |
| Bf | 19.83701 | |
| Air converted Bf | 19.29181 | |
| Ainf | 34.37218 | |
| Amod | 33.44787 | |
| | INF | CLO |
| f | 34.0000 | |
| β | | −0.1434 |
| d0 | ∞ | 216.6806 |
| d10 | 5.4302 | 2.1248 |
| d13 | 4.0990 | 7.4045 |
| d14 | 9.0459 | 6.1458 |
| d18 | 3.3432 | 6.2432 |
| 2ω | 68.7634 | |
| ω | 34.3817 | |

[Lens Group Data]

| Group | Starting surface | f |
|---|---|---|
| GF | 1 | 47.9103 |
| GR | 15 | 86.8580 |
| GFA | 1 | 78.4519 |
| GFF | 11 | 186.8714 |
| GRF | 15 | 40.9478 |
| GRB | 19 | −78.5376 |

[Values for Conditional Expressions]

(1-1) XRF/XFF = 0.8773
(1-2) Bf/f = 0.5674

TABLE 6-continued

Sixth Example (1-3) ST/TL = 0.4505
(1-4) βRF/βFF = 0.8696
(1-5) (−fRB)/f = 2.3099
(1-6) Bf/TL = 0.1686
(1-7) XRF/f = 0.0853
(1-8) fRF/fFF = 0.2191
(1-9) fF/fR = 0.5516
(1-10) fFA/fFF = 0.4198
(1-11) f/fFF = 0.1819
(1-12) f/fRF = 0.8303
(1-13) TL/(Fno · Bf) = 3.2118
(1-14) |Ainf − Amod|/f = 0.0272
(1-15) νFFp − νFFn = 51.9700
(1-16) (FFr2 + FFr1)/(FFr2 − FFr1) = 1.0000
(1-17) nRBp − nRBn = 0.3130
(1-18) nRBp + 0.005νRBp = 2.0508
(1-19) nRBn + 0.005νRBn = 1.7851
(2-1) fRF/fFF = 0.2191
(2-2) Bf/f = 0.5674
(2-3) ST/TL = 0.4505
(2-4) βRF/βFF = 0.8696
(2-5) fF/fR = 0.5516
(2-6) fFA/fFF = 0.4198
(2-7) f/fFF = 0.1819
(2-8) f/fRF = 0.8303
(2-9) TL/(Fno · Bf) = 3.2118
(2-10) |Ainf − Amod|/f = 0.0272
(2-11) νFFp − νFFn = 51.9700
(2-12) (FFr2 + FFr1)/(FFr2 − FFr1) = 1.0000
(2-13) (−fRB)/f = 2.3099
(2-14) nRBp − nRBn = 0.3130
(2-15) nRBp + 0.005νRBp = 2.0508
(2-16) nRBn + 0.005νRBn = 1.7851

Figure 12A:
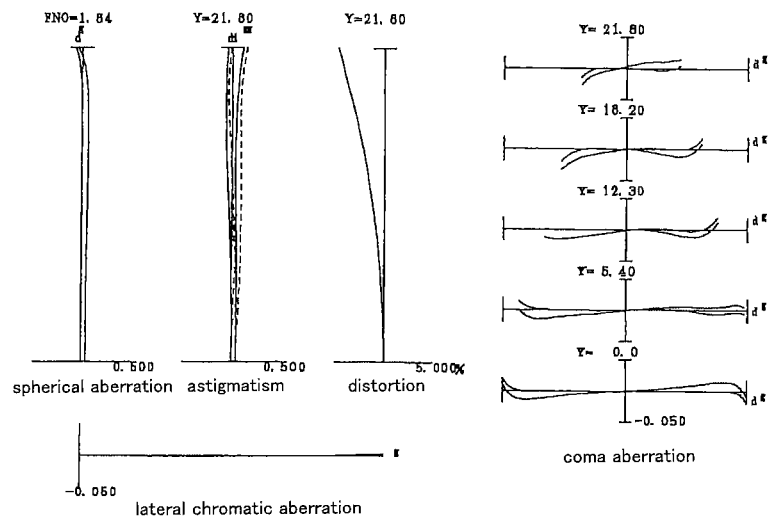
FIG. 12 is graphs showing various aberrations of the optical system according to the Sixth Example.
Figure 12B:
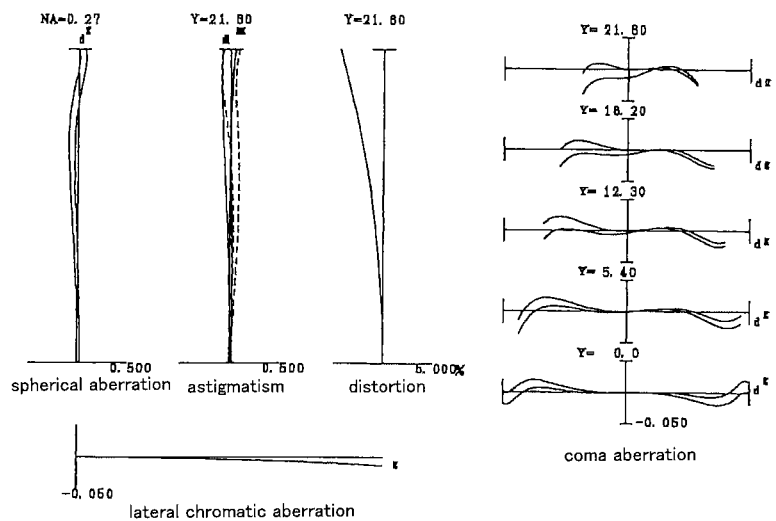

FIG. 12A and FIG. 12B are graphs showing various aberrations of the Sixth Example upon focusing on an infinitely distant object and on a close distance object, respectively.

As is apparent from the respective graphs, the optical system according to the present Example correct superbly various aberrations and has excellent optical performance, from the time when an infinitely distant object is focused to the time when a close distance object is focused.

SEVENTH EXAMPLE

Figures 13A, 13B:
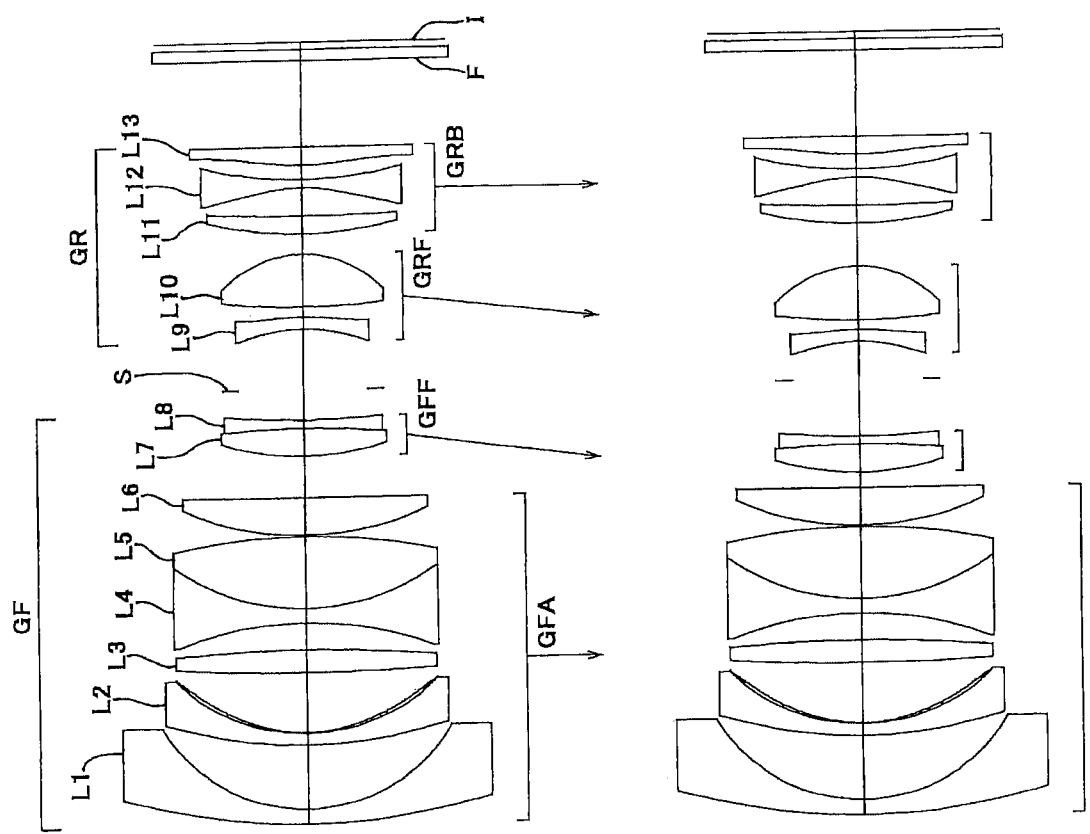
FIG. 13 is a sectional view showing an optical system according to a Seventh Example.

FIG. 13A and FIG. 13B are sectional views showing an optical system according to a Seventh Example, respectively, upon focusing on an infinitely distant object and upon focusing on a closely distant object.

The optical system according to the Seventh Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the object side, a positive lens group GFA having positive refractive power, and a front focusing group GFF having positive refractive power.

The positive lens group GFA consists of, in order from the object side, a negative meniscus lens L1 having a convex surface toward the object side, a negative meniscus lens L2 having a convex surface toward the image side, a double convex positive lens L3, a cemented lens constructed by a double concave negative lens L4 cemented with a double convex positive lens L5, and a double convex positive lens L6. Meanwhile, the negative meniscus lens L2 is a compound type aspherical lens of which an image side lens surface is provided with resin material and aspherically shaped.

The front focusing group GFF consists of a cemented lens constructed by, in order from the object side, a double convex positive lens L7 cemented with a double concave negative lens L8.

The rear group GR consists of, in order from the object side, a rear focusing group GRF having positive refractive power, and a negative lens group GRB having negative refractive power.

The rear focusing group GRF consists of, in order from the object side, a negative meniscus lens L9 having a convex surface toward the image side, and a double convex positive lens L10.

The negative lens group GRB consists of, in order from the object side, a positive meniscus lens L11 having a convex surface toward the object side, a double concave negative lens L12, and a plano-convex positive lens L13 having a convex surface toward the object side.

In the optical system according to the Seventh Example, focusing from an infinitely distant object to a close distance object is carried out by moving the front focusing group GFF and the rear focusing group GRF along the optical axis toward the object side. Meanwhile, upon carrying out focusing, the front lens group GFA, the aperture stop S and the negative lens group GRB are fixed in position.

Table 7 below shows various values of the optical system according to the Seventh Example.

TABLE 7

Seventh Example

[Surface Data]

| m | r | d | nd | νd |
|---|---|---|---|---|
| OP | ∞ |  | 1.000000 |  |
| 1) | 97.4192 | 2.2000 | 1.768494 | 44.86 |
| 2) | 25.3748 | 9.4393 | 1.000000 |  |
| 3) | 73.0366 | 1.6500 | 1.611353 | 59.10 |
| 4) | 28.1065 | 0.1500 | 1.513800 | 52.97 |
| *5) | 23.3508 | 8.7999 | 1.000000 |  |
| 6) | 314.3211 | 3.3152 | 1.922860 | 20.88 |
| 7) | −230.9882 | 3.9581 | 1.000000 |  |
| 8) | −54.6239 | 2.1432 | 1.620040 | 36.40 |
| 9) | 34.0933 | 10.7170 | 1.834810 | 42.73 |
| 10) | −93.8515 | 0.2008 | 1.000000 |  |
| 11) | 45.4462 | 5.5158 | 1.834810 | 42.73 |
| 12) | −76941.34500 | variable | 1.000000 |  |
| 13) | 40.4893 | 4.1495 | 1.497820 | 82.57 |
| 14) | −135.4706 | 1.2000 | 1.808090 | 22.74 |
| 15) | 126.4048 | variable | 1.000000 |  |
| 16) (Stop S) | ∞ | variable | 1.000000 |  |
| *17) | −20.6195 | 1.7865 | 1.860999 | 37.10 |
| *18) | −32.1327 | 1.4206 | 1.000000 |  |
| 19) | 102.6671 | 7.8877 | 1.497820 | 82.57 |
| 20) | −16.3909 | variable | 1.000000 |  |
| 21) | 57.0592 | 2.6167 | 1.710936 | 47.27 |
| 22) | 304.2075 | 4.1090 | 1.000000 |  |
| *23) | −22.4255 | 1.3000 | 1.689480 | 31.02 |
| 24) | 61.5136 | 2.0782 | 1.000000 |  |
| *25) | 36.1918 | 2.6262 | 1.820980 | 42.50 |
| 26) | ∞ | 12.6819 | 1.000000 |  |
| 27) | ∞ | 1.6000 | 1.516800 | 63.88 |
| 28) | ∞ | 1.0000 | 1.000000 |  |
| Image plane | ∞ |  |  |  |

[Aspherical Surface Data]

| m | K | A4 | A6 | A8 |
|---|---|---|---|---|
| 5 | 0.0000 | 4.47584E−07 | −6.22190E−09 | 1.22365E−11 |

| | A10 | A12 |
|---|---|---|
| | −3.40101E−14 | 0.32669E−16 |

| m | K | A4 | A6 | A8 |
|---|---|---|---|---|
| 17 | 0.0000 | 9.62834E−05 | −4.19153E−07 | −3.28271E−09 |

| | A10 | A12 |
|---|---|---|
| | 2.90182E−11 | −0.13502E−12 |

| m | K | A4 | A6 | A8 |
|---|---|---|---|---|
| 18 | 1.0000 | 1.33216E−04 | −1.90915E−07 | −3.36920E−09 |

| | A10 | A12 |
|---|---|---|
| | 2.71394E−11 | −0.83703E−13 |

| m | K | A4 | A6 | A8 |
|---|---|---|---|---|
| 23 | 1.9124 | 1.43602E−04 | −8.35674E−07 | 5.32507E−09 |

| | A10 | A12 |
|---|---|---|
| | −1.97434E−11 | 0.34513E−13 |

TABLE 7-continued

Seventh Example

| m | K | A4 | A6 | A8 |
|---|---|---|---|---|
| 25 | 1.0000 | −8.47161E−05 | 4.39056E−07 | −2.13972E−09 |

| | A10 | A12 |
|---|---|---|
| | 6.18894E−12 | −0.71916E−14 |

[Various Data]

| | |
|---|---|
| f | 20.4000 |
| Fno | 1.85009 |
| 2ω | 96.1353 |
| Ymax | 21.60 |
| TL | 115.02541 |
| Air converted TL | 114.48021 |
| Bf | 15.28192 |
| Air converted Bf | 14.73672 |
| Ainf | 48.76762 |
| Amod | 48.15648 |

| | INF | CLO |
|---|---|---|
| f | 20.4000 | |
| β | | −0.1972 |
| d0 | ∞ | 84.0279 |
| d12 | 6.0921 | 2.2355 |
| d15 | 4.3398 | 8.1964 |
| d16 | 9.0834 | 5.6834 |
| d20 | 2.9645 | 6.3646 |
| 2ω | 96.1353 | |
| ω | 48.0677 | |

[Lens Group Data]

| Group | Starting surface | f |
|---|---|---|
| GF | 1 | 40.2194 |
| GR | 17 | 51.7452 |
| GFA | 1 | 59.7587 |
| GFF | 13 | 253.1359 |
| GRF | 17 | 40.2592 |
| GRB | 21 | −156.7545 |

[Values for Conditional Expressions]

(1-1) XRF/XFF = 0.8816
(1-2) Bf/f = 0.7224
(1-3) ST/TL = 0.4421
(1-4) βRF/βFF = 0.6742
(1-5) (−fRB)/f = 7.684
(1-6) Bf/TL = 0.1287
(1-7) XRF/f = 0.1667
(1-8) fRF/fFF = 0.1590
(1-9) fF/fR = 0.7773
(1-10) fFA/fFF = 0.2361
(1-11) f/fFF = 0.0806
(1-12) f/fRF = 0.5067
(1-13) TL/(Fno · Bf) = 4.1989
(1-14) |Ainf − Amod|/f = 0.0300
(1-15) νFFp − νFFn = 59.8300
(1-16) (FFr2 + FFr1)/(FFr2 − FFr1) = 0.5398
(1-17) nRBp − nRBn = 0.0765
(1-18) nRBp + 0.005νRBp = 1.9904
(1-19) nRBn + 0.005νRBn = 1.8446
(2-1) fRF/fFF = 0.1590
(2-2) Bf/f = 0.7224
(2-3) ST/TL = 0.4421
(2-4) βRF/βFF = 0.6742
(2-5) fF/fR = 0.7773
(2-6) fFA/fFF = 0.2361
(2-7) f/fFF = 0.0806
(2-8) f/fRF = 0.5067
(2-9) TL/(Fno · Bf) = 4.1989
(2-10) |Ainf − Amod|/f = 0.0300
(2-11) νFFp − νFFn = 59.8300
(2-12) (FFr2 + FFr1)/(FFr2 − FFr1) = 0.5398
(2-13) (−fRB)/f = 7.684

TABLE 7-continued

Seventh Example (2-14) nRBp − nRBn = 0.0765
(2-15) nRBp + 0.005vRBp = 1.9904
(2-16) nRBn + 0.005vRBn = 1.8446

Figure 14A:
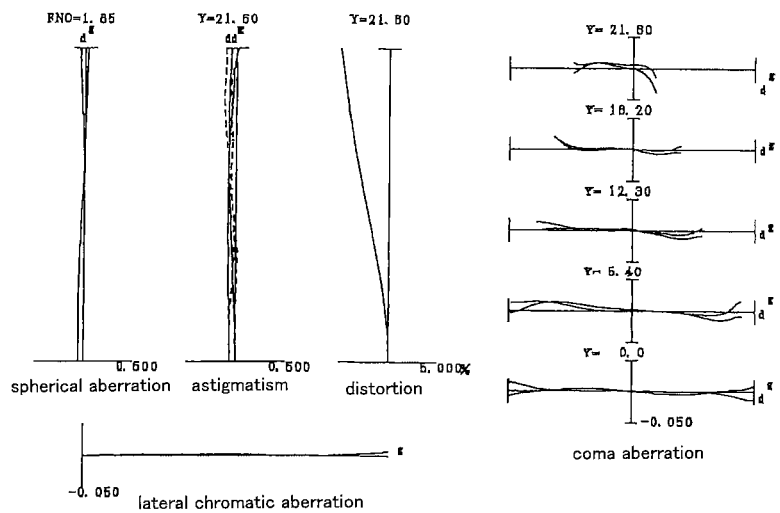
FIG. 14 is graphs showing various aberrations of the optical system according to the Seventh Example.
Figure 14B:
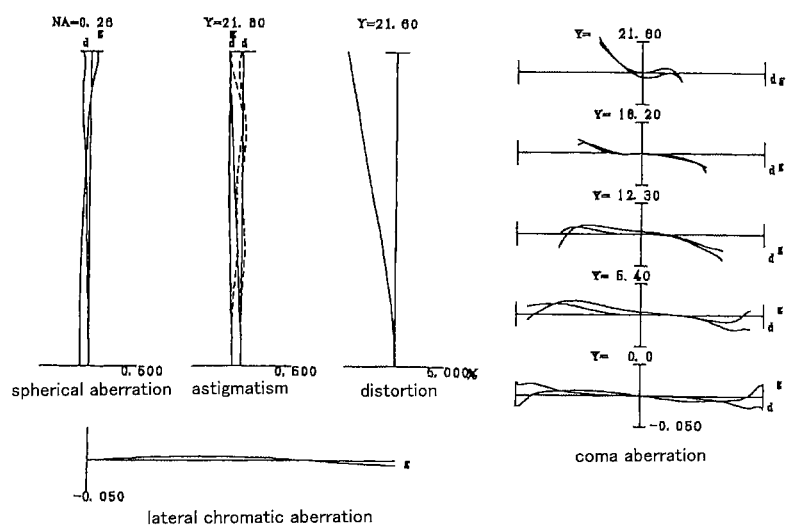

FIG. 14A and FIG. 14B are graphs showing various aberrations of the optical system according to the Seventh Example upon focusing on an infinitely distant object and on a close distance object, respectively.

As is apparent from the respective graphs, the optical system according to the present Example correct superbly various aberrations and has excellent optical performance, from the time when an infinitely distant object is focused to the time when a close distance object is focused.

EIGTH EXAMPLE

FIG. 15A and FIG. 15B are sectional views showing an optical system according to an Eighth Example, respectively, upon focusing on an infinitely distant object and upon focusing on a closely distant object.

The optical system according to the Eighth Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the optical axis, a positive lens group GFA having positive refractive power, and a front focusing group GFF having positive refractive power.

The positive lens group GFA consists of, in order from the object side, a double concave negative lens L1, a cemented lens constructed by a double concave negative lens L2 cemented with a double convex positive lens L3, and a cemented lens constructed by a double convex positive lens L4 cemented with a double concave negative lens L5.

The front focusing group GFF consists of a cemented lens constructed by, in order from the object side, a double convex positive lens L6 cemented with a double concave negative lens L7.

The rear group GR consists of, in order from the object side, a rear focusing group GRF having positive refractive power, and a negative lens group GRB having negative refractive power.

The rear focusing group GRF consists of, in order from the object side, a double concave negative lens L8, and a double convex positive lens L9.

The negative lens group GRB consists of, in order from the object side, a negative meniscus lens L10 having a convex surface toward the image side and a negative meniscus lens L11 having a convex surface toward the image side.

In the optical system according to the Eighth Example, focusing from an infinitely distant object to a close distance object is carried out by moving the front focusing group GFF and the rear focusing group GRF along the optical axis toward the object side. Meanwhile, upon carrying out focusing, the positive lens group GFA, the aperture stop S and the negative lens group GRB are fixed in position.

Table 8 below shows various values of the optical system according to the Eighth Example.

TABLE 8

Eighth Example

[Surface Data]

| m | r | d | nd | vd |
|---|---|---|---|---|
| OP | ∞ |  | 1.000000 |  |
| 1) | −1384.5606 | 2.4000 | 1.518230 | 58.82 |
| *2) | 22.7521 | 19.5726 | 1.000000 |  |
| 3) | −210.4727 | 2.0000 | 1.603420 | 38.03 |
| 4) | 34.8221 | 11.0013 | 1.834810 | 42.73 |
| 5) | −98.9663 | 0.2000 | 1.000000 |  |
| 6) | 41.5127 | 8.8597 | 1.834810 | 42.73 |
| 7) | −70.1358 | 1.6000 | 1.647690 | 33.72 |
| 8) | 41.7744 | variable | 1.000000 |  |
| 9) | 30.8554 | 5.2069 | 1.497820 | 82.57 |
| 10) | −344.9897 | 1.2000 | 1.672700 | 32.18 |
| 11) | 59.4370 | variable | 1.000000 |  |
| 12) (Stop S) | ∞ | variable | 1.000000 |  |
| *13) | −128.3993 | 1.8000 | 1.834810 | 42.73 |
| 14) | 316.2495 | 1.3930 | 1.000000 |  |
| 15) | 98.6994 | 10.2289 | 1.497820 | 82.57 |
| *16) | −18.9378 | variable | 1.000000 |  |
| 17) | −47.2364 | 3.0654 | 1.902650 | 35.72 |
| 18) | −35.8672 | 5.9831 | 1.000000 |  |
| 19) | −30.0877 | 1.4000 | 1.688931 | 31.07 |
| 20) | −1077.5863 | 14.3679 | 1.000000 |  |
| 21) | ∞ | 1.6000 | 1.516800 | 64.13 |
| 22) | ∞ | 0.9778 | 1.000000 |  |
| Image plane | ∞ |  |  |  |

[Aspherical Data]

| m | K | A4 | A6 | A8 |
|---|---|---|---|---|
| 2 | 0.0000 | 8.60806E−06 | −2.33850E−09 | 3.59347E−11 |

| A10 | A12 |
|---|---|
| −7.01381E−14 | 0.61254E−16 |

| m | K | A4 | A6 | A8 |
|---|---|---|---|---|
| 13 | 0.0000 | −3.09776E−05 | −8.13151E−08 | −2.38297E−10 |

| A10 | A12 |
|---|---|
| 2.73111E−14 | −0.12604E−13 |

| m | K | A4 | A6 | A8 |
|---|---|---|---|---|
| 16 | 1.0000 | 4.53043E−07 | −2.70015E−08 | 4.55831E−11 |

| A10 | A12 |
|---|---|
| −6.17207E−13 | 0.12765E−14 |

[Various Data]

| f | 34.1413 |
|---|---|
| Fno | 1.85683 |
| 2ω | 65.0328 |
| Ymax | 21.60 |
| TL | 114.97777 |
| Air converted TL | 114.43257 |
| Bf | 53.1934 |
| Air converted Bf | 54.6482 |
| Ainf | 33.09508 |
| Amod | 32.1484 |

|  | INF | CLO |
|---|---|---|
| f | 34.1413 |  |
| β |  | −0.1418 |
| d0 | ∞ | 221.3238 |
| d8 | 5.7439 | 2.0995 |
| d11 | 4.0000 | 7.6445 |
| d12 | 9.1921 | 6.0059 |

TABLE 8-continued

Eighth Example

| d16 | 3.1853 | 6.3715 |
| --- | --- | --- |
| 2ω | 65.0328 | |
| ω | 32.5164 | |

[Lens Group Data]

| Group | Starting surface | f |
| --- | --- | --- |
| GF | 1 | 57.9019 |
| GR | 13 | 86.1509 |
| GFA | 1 | 102.0669 |
| GFF | 9 | 196.0962 |
| GRF | 13 | 42.5650 |
| GRB | 17 | −65.8197 |

[Values for Conditional Expressions]

(1-1) XRF/XFF = 0.8743
(1-2) Bf/f = 1.5421
(1-3) ST/TL = 0.1433
(1-4) βRF/βFF = 0.8301
(1-5) (−fRB)/f = 1.9279
(1-6) Bf/TL = 0.4600
(1-7) XRF/f = 0.0933
(1-8) fRF/fFF = 0.2171
(1-9) fF/fR = 0.6721
(1-10) fFA/fFF = 0.5205
(1-11) f/fFF = 0.1741
(1-12) f/fRF = 0.8021
(1-13) TL/(Fno · Bf) = 1.1706
(1-14) |Ainf − Amod|/f = 0.0277
(1-15) νFFp − νFFn = 50.3900
(1-16) (FFr2 + FFr1)/(FFr2 − FFr1) = 0.8358
(1-17) nRBp − nRBn = 0.2137
(1-18) nRBp + 0.005νRBp = 2.0813
(1-19) nRBn + 0.005νRBn = 1.8443
(2-1) fRF/fFF = 0.2171
(2-2) Bf/f = 1.5421
(2-3) ST/TL = 0.1433
(2-4) βRF/βFF = 0.8301
(2-5) fF/fR = 0.6721
(2-6) fFA/fFF = 0.5205
(2-7) f/fFF = 0.1741
(2-8) f/fRF = 0.8021
(2-9) TL/(Fno · Bf) = 1.1706
(2-10) |Ainf − Amod|/f = 0.0277
(2-11) νFFp − νFFn = 50.3900
(2-12) (FFr2 + FFr1)/(FFr2 − FFr1) = 0.8358
(2-13) (−fRB)/f = 1.9279
(2-14) nRBp − nRBn = 0.2137
(2-15) nRBp + 0.005νRBp = 2.0813
(2-16) nRBn + 0.005νRBn = 1.8443

Figure 16A:
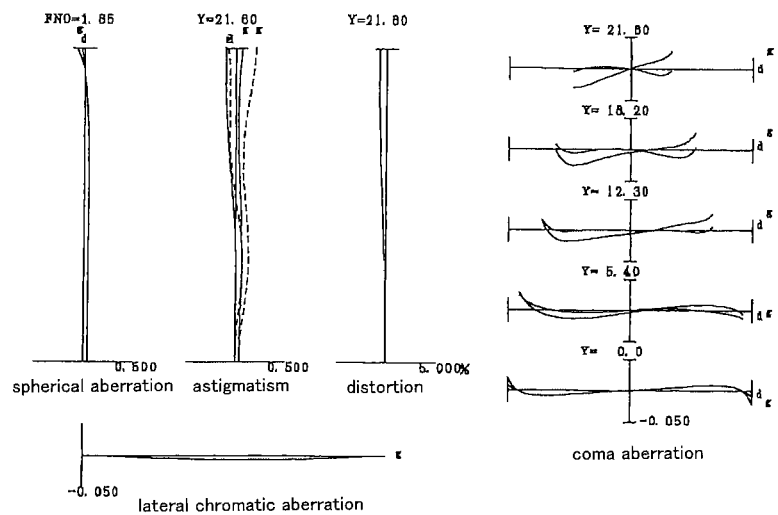
FIG. 16 is graphs showing various aberrations of the optical system according to the Eighth Example.
Figure 16B:
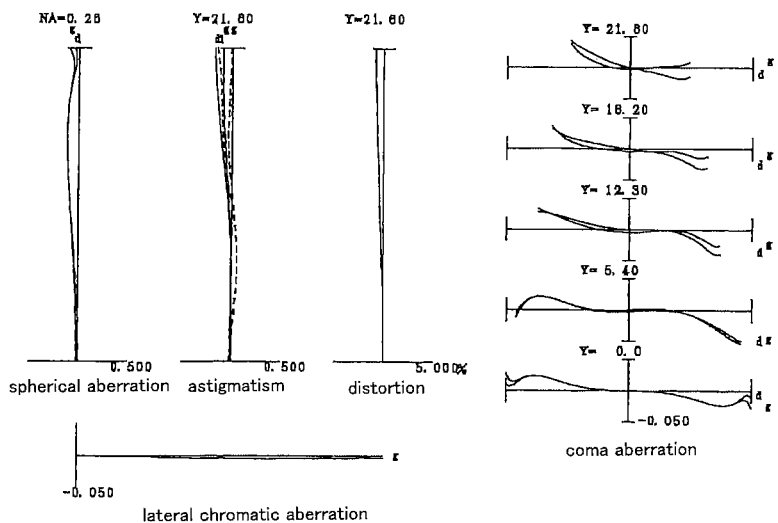

FIG. 16A and FIG. 16B are graphs showing various aberrations of the optical system according to the Eighth Example upon focusing on an infinitely distant object and on a close distance object, respectively.

As is apparent from the respective graphs, the optical system according to the present Example correct superbly various aberrations and has excellent optical performance, from the time when an infinitely distant object is focused to the time when a close distance object is focused.

NINTH EXAMPLE

FIG. 17A and FIG. 17B are sectional views showing an optical system according to a Ninth Example, respectively, upon focusing on an infinitely distant object and upon focusing on a closely distant object.

The optical system according to the Ninth Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the object side, a positive lens group GFA having positive refractive power, and a front focusing group GFF having positive refractive power.

The positive lens group GFA consists of, in order from the object side, a negative meniscus lens L1 having a convex surface toward the object side, a negative meniscus lens L2 having a convex surface toward the object side, a double concave negative lens L3, a cemented lens constructed by a negative meniscus lens L4 having a convex surface toward the object side cemented with a double convex positive lens L5, and a positive meniscus lens L6 having a convex surface toward the object side.

The front focusing group GFF consists of a cemented lens constructed by, in order from the object side, a double convex positive lens L7 cemented with a double concave negative lens L8.

The rear group GR consists of, in order from the object side, a rear focusing group GRF having positive refractive power, and a negative lens group GRB having negative refractive power.

The rear focusing group GRF consists of, in order from the object side, a negative meniscus lens L9 having a convex surface toward the image side, and a double convex positive lens L10.

The negative lens group GRB consists of, in order from the object side, a double concave negative lens L11 and a double convex positive lens L12.

In the optical system according to the Ninth Example, focusing from an infinitely distant object to a close distance object is carried out by moving the front focusing group GFF and the rear focusing group GRF along the optical axis toward the object side. Meanwhile, upon carrying out focusing, the front lens group GFA, the aperture stop S and the negative lens group GRB are fixed in position.

Table 9 below shows various values of the optical system according to the Ninth Example.

TABLE 9

Ninth Example

[Surface Data]

| m | r | d | nd | νd |
| --- | --- | --- | --- | --- |
| OP | ∞ | | 1.000000 | |
| 1) | 90.1539 | 2.0000 | 1.658440 | 50.83 |
| 2) | 35.0000 | 1.0023 | 1.000000 | |
| 3) | 38.0000 | 1.8000 | 1.622910 | 58.30 |
| *4) | 17.5155 | 13.7363 | 1.000000 | |
| 5) | −135.7140 | 1.6000 | 1.593190 | 67.90 |
| 6) | 48.9808 | 6.5355 | 1.000000 | |
| 7) | 861.6049 | 2.4809 | 1.620040 | 36.40 |
| 8) | 31.3689 | 9.0000 | 1.851500 | 40.78 |
| 9) | −150.1624 | 3.1783 | 1.000000 | |
| 10) | 40.3712 | 5.2632 | 1.851500 | 40.78 |
| 11) | 1025.5030 | variable | 1.000000 | |
| 12) | 32.7343 | 4.0000 | 1.497820 | 82.57 |
| 13) | −155.0414 | 1.2000 | 1.808090 | 22.74 |
| 14) | 62.0187 | variable | 1.000000 | |
| 15) (Stop S) | ∞ | variable | 1.000000 | |
| *16) | −45.5353 | 2.0000 | 1.860999 | 37.10 |
| *17) | −52.3373 | 1.5881 | 1.000000 | |
| 18) | 60.0000 | 7.3310 | 1.497820 | 82.57 |
| 19) | −19.2015 | variable | 1.000000 | |
| *20) | −27.0655 | 1.2000 | 1.689480 | 31.02 |
| 21) | 81.9849 | 1.4246 | 1.000000 | |

TABLE 9-continued

Ninth Example

| | | | | |
|---|---|---|---|---|
| *22) | 43.0859 | 4.0000 | 1.882023 | 37.22 |
| 23) | −1000.0000 | 17.7393 | 1.000000 | |
| 24) | ∞ | 1.6000 | 1.516800 | 63.88 |
| 25) | ∞ | 1.0000 | 1.000000 | |
| Image plane | ∞ | | | |

[Aspherical Data]

| m | K | A4 | A6 | A8 |
|---|---|---|---|---|
| 4 | 0.0000 | 1.52130E−05 | −1.37943E−09 | 1.13792E−10 |
| | | A10 | A12 | |
| | | −3.10899E−13 | 0.49329E−15 | |

| m | K | A4 | A6 | A8 |
|---|---|---|---|---|
| 16 | 0.0000 | −3.46585E−05 | 1.35812E−08 | 1.68641E−09 |
| | | A10 | A12 | |
| | | −1.95052E−11 | 0.59812E−13 | |

| m | K | A4 | A6 | A8 |
|---|---|---|---|---|
| 17 | 1.0000 | 2.60772E−06 | 8.97314E−08 | 1.41490E−09 |
| | | A10 | A12 | |
| | | −1.26537E−11 | 0.35190E−13 | |

| m | K | A4 | A6 | A8 |
|---|---|---|---|---|
| 20 | 1.5918 | 1.23579E−04 | −8.07461E−07 | 5.37616E−09 |
| | | A10 | A12 | |
| | | −2.11181E−11 | 0.34821E−13 | |

| m | K | A4 | A6 | A8 |
|---|---|---|---|---|
| 22 | 1.0000 | −8.27671E−05 | 4.88811E−07 | −2.91586E−09 |
| | | A10 | A12 | |
| | | 9.85401E−12 | −0.14168E−13 | |

[Various Data]

| | |
|---|---|
| f | 20.0000 |
| Fno | 1.854 |
| 2ω | 97.6294 |
| Ymax | 21.60 |
| TL | 114.09 |
| Air converted TL | 113.5448 |
| Bf | 20.33935 |
| Air converted Bf | 19.79415 |
| Ainf | 48.68147 |
| Amod | 47.75113 |

| | INF | CLO |
|---|---|---|
| f | 20.0000 | |
| β | | −0.1987 |
| d0 | ∞ | 80.5848 |
| d11 | 8.0031 | 5.1763 |
| d14 | 5.0918 | 7.9186 |
| d15 | 7.1424 | 4.7424 |
| d19 | 4.1730 | 6.5730 |
| 2ω | 97.6294 | |
| ω | 48.8147 | |

TABLE 9-continued

Ninth Example

[Lens Group Data]

| Group | Starting surface | f |
|---|---|---|
| GF | 1 | 51.8791 |
| GR | 16 | 47.3528 |
| GFA | 1 | 59.9544 |
| GFF | 12 | 1108.3235 |
| GRF | 16 | 31.1504 |
| GRB | 20 | −88.9793 |

[Values for Conditional Expressions]

(1-1) XRF/XFF = 0.8490
(1-2) Bf/f = 0.9897
(1-3) ST/TL = 0.4285
(1-4) βRF/βFF = 0.3388
(1-5) (−fRB)/f = 4.4490
(1-6) Bf/TL = 0.1743
(1-7) XRF/f = 0.1200
(1-8) fRF/fFF = 0.0281
(1-9) fF/fR = 1.0956
(1-10) fFA/fFF = 0.0541
(1-11) f/fFF = 0.0180
(1-12) f/fRF = 0.6420
(1-13) TL/(Fno · Bf) = 3.0940
(1-14) |Ainf − Amod|/f = 0.0465
(1-15) vFFp − vFFn = 59.8300
(1-16) (FFr2 + FFr1)/(FFr2 − FFr1) = 0.6513
(1-17) nRBp − nRBn = 0.1925
(1-18) nRBp + 0.005vRBp = 1.6719
(1-19) nRBn + 0.005vRBn = 2.0681
(2-1) fRF/fFF = 0.0281
(2-2) Bf/f = 0.9897
(2-3) ST/TL = 0.4285
(2-4) βRF/βFF = 0.3388
(2-5) fF/fR = 1.0956
(2-6) fFA/fFF = 0.0541
(2-7) f/fFF = 0.0180
(2-8) f/fRF = 0.6420
(2-9) TL/(Fno · Bf) = 3.0940
(2-10) |Ainf − Amod|/f = 0.0465
(2-11) vFFp − vFFn = 59.8300
(2-12) (FFr2 + FFr1)/(FFr2 − FFr1) = 0.6513
(2-13) (−fRB)/f = 4.4490
(2-14) nRBp − nRBn = 0.1925
(2-15) nRBp + 0.005vRBp = 1.6719
(2-16) nRBn + 0.005vRBn = 2.0681

Figure 18A:
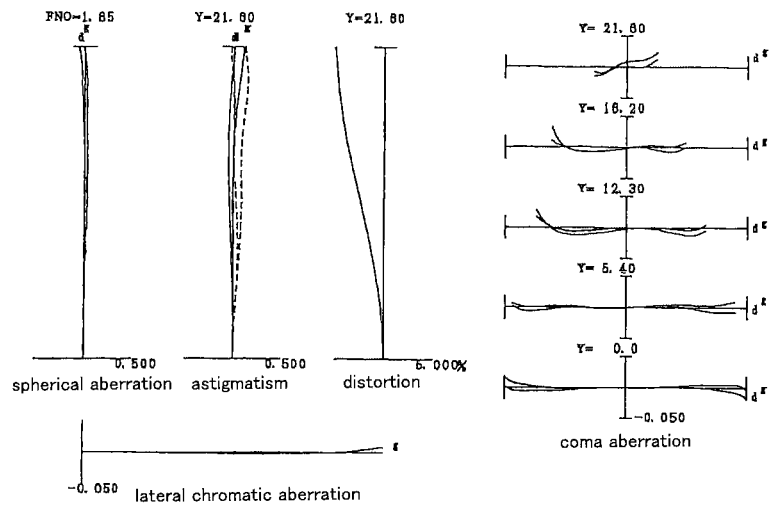
FIG. 18 is graphs showing various aberrations of the optical system according to the Ninth Example.
Figure 18B:
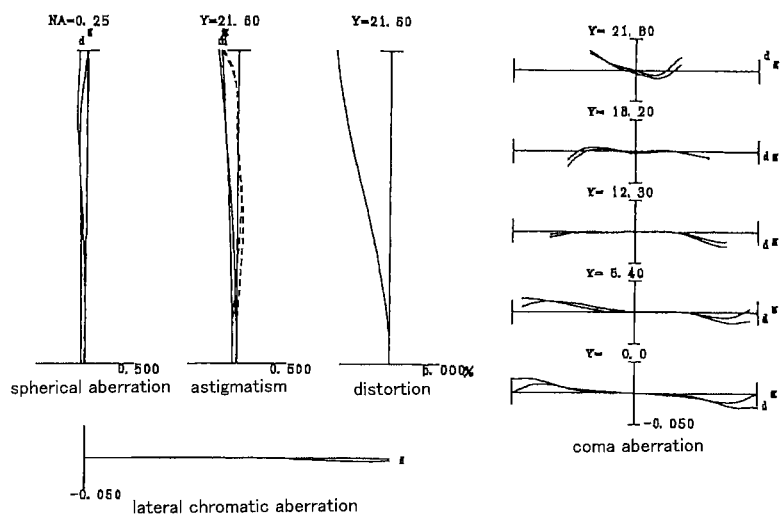

FIG. 18A and FIG. 18B are graphs showing various aberrations of the Ninth Example upon focusing on an infinite distance object and on a close distance object, respectively.

As is apparent from the respective graphs, the optical system according to the present Example correct superbly various aberrations and has excellent optical performance, from the time when an infinite distance object is focused to the time when a close distance object is focused.

TENTH EXAMPLE

FIG. 19A and FIG. 19B are sectional views showing an optical system according to a Tenth Example, respectively, upon focusing on an infinitely distant object and upon focusing on a closely distant object.

The optical system according to the Tenth Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the optical axis, a positive lens group GFA having positive refractive power, and a front focusing group GFF having positive refractive power.

The positive lens group GFA consists of, in order from the object side, a negative meniscus lens L1 having a convex surface toward the object side, a negative meniscus lens L2 having a convex surface toward the object side, a positive meniscus lens L3 having a convex surface toward the image side, a cemented lens constructed by a double concave negative lens L4 cemented with a double convex positive lens L5, and a double convex positive lens L6.

The front focusing group GFF consists of a cemented lens constructed by, in order from the object side, a double convex positive lens L7 cemented with a double concave negative lens L8.

The rear group GR consists of, in order from the object side, a rear focusing group GRF having positive refractive power, and a negative lens group GRB having negative refractive power.

The rear focusing group GRF consists of, in order from the object side, a negative meniscus lens L9 having a convex surface toward the image side, and a double convex positive lens L10.

The negative lens group GRB consists of a double concave negative lens L11.

In the optical system according to the Tenth Example, focusing from an infinitely distant object to a close distance object is carried out by moving the front focusing group GFF and the rear focusing group GRF along the optical axis toward the object side. Meanwhile, upon carrying out focusing, the positive lens group GFA, the aperture stop S and the negative lens group GRB are fixed in position.

Table 10 below shows various values of the optical system according to the Tenth Example.

TABLE 10

Tenth Example

[Surface Data]

| m | r | d | nd | νd |
|---|---|---|---|---|
| OP | ∞ | | 1.000000 | |
| 1) | 105.7357 | 2.3000 | 1.785897 | 43.93 |
| 2) | 30.3881 | 7.3810 | 1.000000 | |
| 3) | 55.0000 | 2.0000 | 1.658441 | 50.88 |
| *4) | 18.9645 | 13.6074 | 1.000000 | |
| 5) | −171.0476 | 4.6738 | 1.785896 | 44.20 |
| 6) | −49.1804 | 3.4817 | 1.000000 | |
| 7) | −43.6767 | 1.7001 | 1.603420 | 38.01 |
| 8) | 37.4040 | 8.0414 | 1.851500 | 40.78 |
| 9) | −251.6551 | 4.7235 | 1.000000 | |
| 10) | 37.7511 | 6.3961 | 1.851500 | 40.78 |
| 11) | −472.8256 | variable | 1.000000 | |
| 12) (IP) | ∞ | 0.0000 | 1.000000 | |
| 13) | 56.1535 | 4.8469 | 1.497820 | 82.57 |
| 14) | −61.5295 | 1.7129 | 1.808090 | 22.74 |
| 15) | 251.7243 | variable | 1.000000 | |
| 16) (Stop S) | ∞ | variable | 1.000000 | |
| *17) | −60.5230 | 1.2000 | 1.860999 | 37.10 |
| *18) | −100.0047 | 1.3930 | 1.000000 | |
| 19) | 59.4711 | 7.5979 | 1.497820 | 82.57 |
| 20) | −16.5046 | variable | 1.000000 | |
| *21) | −554.5946 | 1.3092 | 1.740769 | 27.79 |
| *22) | 32.1694 | 17.9272 | 1.000000 | |
| 23) | ∞ | 1.6000 | 1.516800 | 64.13 |
| 24) | ∞ | 0.9825 | 1.000000 | |
| Image plane | ∞ | | | |

TABLE 10-continued

Tenth Example

[Aspherical Surface Data]

| m | K | A4 | A6 | A8 |
|---|---|---|---|---|
| 4 | 0.0000 | 9.44198E−06 | −7.85173E−10 | 1.82058E−11 |

| | A10 | A12 | | |
|---|---|---|---|---|
| | −5.42737E−14 | 0.53658E−16 | | |

| m | K | A4 | A6 | A8 |
|---|---|---|---|---|
| 17 | 1.0000 | −3.05779E−05 | −1.19989E−07 | −2.26470E−09 |

| | A10 | A12 | | |
|---|---|---|---|---|
| | 4.74211E−12 | −0.32614E−15 | | |

| m | K | A4 | A6 | A8 |
|---|---|---|---|---|
| 18 | 1.0000 | 1.85793E−05 | 6.97129E−09 | −1.71822E−09 |

| | A10 | A12 | | |
|---|---|---|---|---|
| | 6.73792E−12 | 0.27686E−13 | | |

| m | K | A4 | A6 | A8 |
|---|---|---|---|---|
| 21 | 1.0000 | −2.35430E−05 | −5.88083E−08 | 1.25271E−09 |

| | A10 | A12 | | |
|---|---|---|---|---|
| | −1.14966E−11 | 0.26434E−13 | | |

| m | K | A4 | A6 | A8 |
|---|---|---|---|---|
| 22 | 1.0000 | −1.41315E−05 | −1.06653E−07 | 1.37968E−09 |

| | A10 | A12 | | |
|---|---|---|---|---|
| | −9.70244E−12 | 0.22570E−13 | | |

[Various Data]

| f | 20.6000 |
|---|---|
| Fno | 1.85674 |
| 2ω | 95.6062 |
| Ymax | 21.60 |
| TL | 114.98248 |
| Air converted TL | 114.43728 |
| Bf | 20.50968 |
| Air converted Bf | 19.96448 |
| Ainf | 48.46075 |
| Amod | 48.04852 |

| | INF | CLO |
|---|---|---|
| f | 20.6000 | |
| β | | −0.1881 |
| d0 | ∞ | 87.1901 |
| d11 | 5.6564 | 2.5472 |
| d15 | 4.2430 | 7.3520 |
| d16 | 8.5222 | 6.5750 |
| d20 | 3.6864 | 5.6336 |
| 2ω | 95.6062 | |
| ω | 47.8031 | |

[Lens Group Data]

| Group | Starting surface | f |
|---|---|---|
| GF | 1 | 33.8040 |
| GR | 17 | 81.1675 |
| GFA | 1 | 37.0214 |
| GFF | 12 | 1160.9972 |
| GRF | 17 | 30.1283 |
| GRB | 21 | −41.0072 |

TABLE 10-continued

Tenth Example

[Values for Conditional Expressions]

(1-1) XRF/XFF = 0.6263
(1-2) Bf/f = 0.9691
(1-3) ST/TL = 0.3816
(1-4) βRF/βFF = 0.4486
(1-5) (−fRB)/f = 1.9906
(1-6) Bf/TL = 0.1745
(1-7) XRF/f = 0.0945
(1-8) fRF/fFF = 0.0260
(1-9) fF/fR = 0.4165
(1-10) fFA/fFF = 0.0319
(1-11) f/fFF = 0.0177
(1-12) f/fRF = 0.6837
(1-13) TL/(Fno · Bf) = 3.0872
(1-14) |Ainf − Amod|/f = 0.0200
(1-15) vFFp − vFFn = 59.8300
(1-16) (FFr2 + FFr1)/(FFr2 − FFr1) = 0.0457
(1-19) nRBn + 0.005vRBn = 1.8797

Figure 20A:
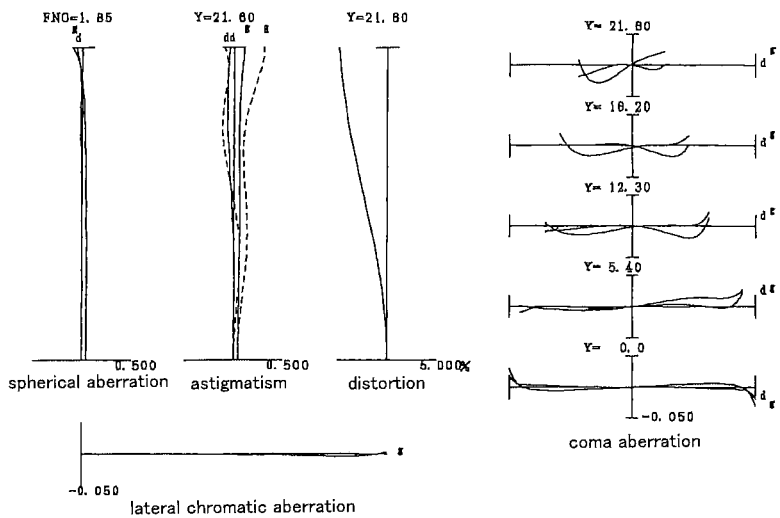
FIG. 20 is graphs showing various aberrations of the optical system according to the Tenth Example.
Figure 20B:
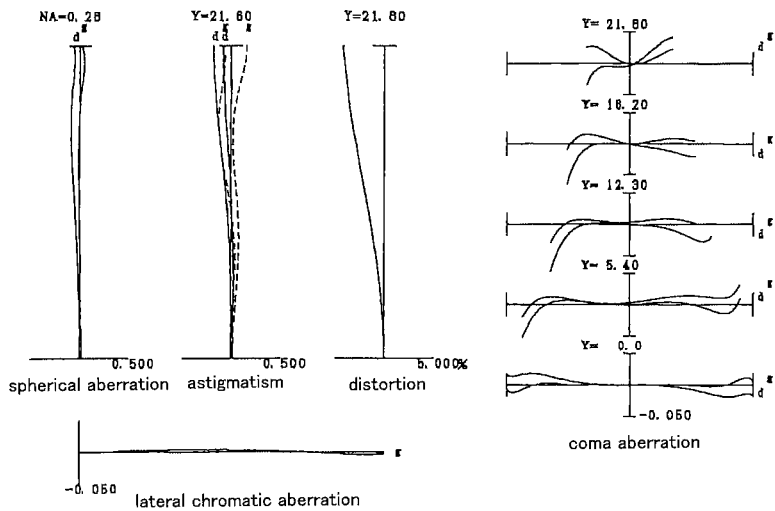

FIG. 20A and FIG. 20B are graphs showing various aberrations of the Tenth Example upon focusing on an infinite distance object and on a close distance object, respectively.

As is apparent from the respective graphs, the optical system according to the present Example correct superbly various aberrations and has excellent optical performance, from the time when an infinitely distant object is focused to the time when a close distance object is focused.

ELEVENTH EXAMPLE

Figure 21A:
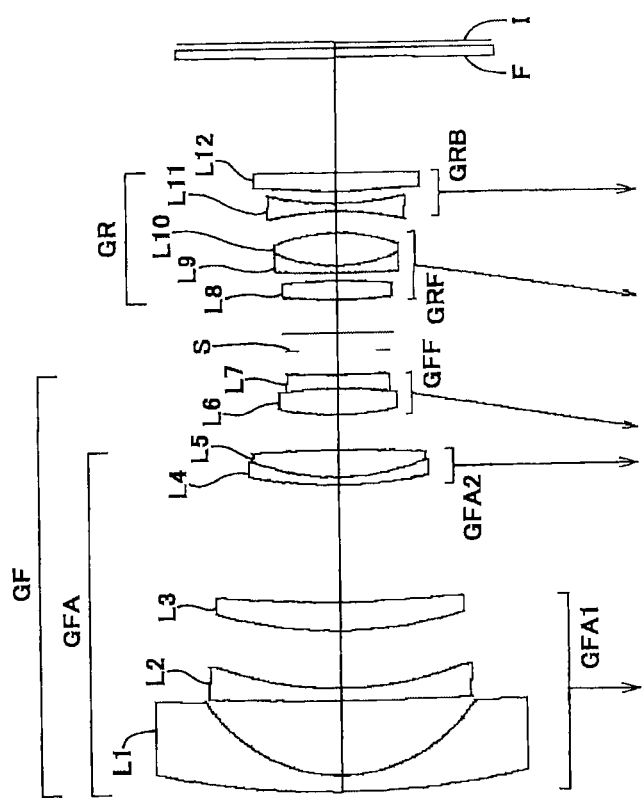
FIG. 21 is a sectional view showing a variable magnification optical system according to an Eleventh Example.
Figure 21B:
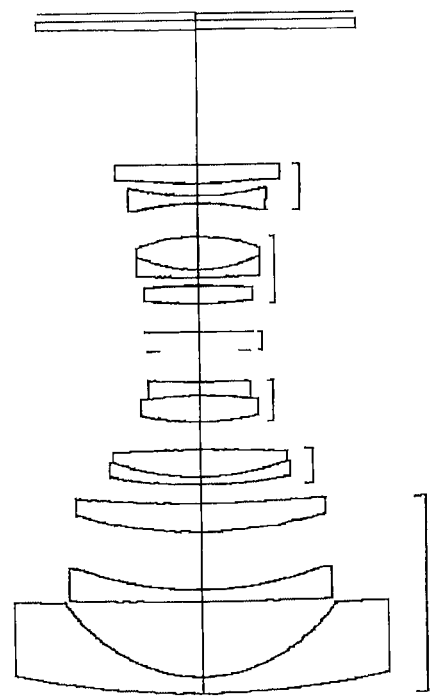

FIG. 21A and FIG. 21B are sectional views showing a variable magnification optical system according to an Eleventh Example, respectively, upon focusing on an infinitely distant object and upon focusing on a closely distant object.

The variable magnification optical system according to the Eleventh Example is composed of, in order from an object side, a front group GF having positive refractive power, an aperture stop S, and a rear group GR having positive refractive power. Meanwhile, a filter F is disposed in the neighborhood of an object side of the image plane I.

The front group GF consists of, in order from the object side, a positive lens group GFA having positive refractive power, and a front focusing group GFF having positive refractive power.

The positive lens group GFA consists of, in order from the object side, a negative lens group GFA1 having negative refractive power, and a positive lens group GAF2 having positive refractive power.

The negative lens group GFA1 consists of, in order from the object side, a negative meniscus lens L1 having a convex surface toward the object side, a negative meniscus lens L2 having a convex surface toward the object side, and a positive meniscus lens L3 having a convex surface toward the object side.

The positive lens group GAF2 consists of a cemented lens constructed by, in order from the object side, a negative meniscus lens L4 having a convex surface toward the object side cemented with a double convex positive lens L5.

The front focusing group GFF consists of a cemented lens constructed by, in order from the object side, a double convex positive lens L6 cemented with a double concave negative lens L7.

The rear group GR consists of, in order from the object side, a rear focusing group GRF having positive refractive power, and a negative lens group GRB having negative refractive power.

The rear focusing group GRF consists of, in order from the object side, a double convex positive lens L8 and a cemented lens constructed by a negative meniscus lens L9 having a convex surface toward the object side and a double convex positive lens L10.

The negative lens group GRB consists of a double concave negative lens L11 and a plano-convex positive lens L12 having a convex surface toward the object side.

In the variable magnification optical system according to the Eleventh Example, upon varying magnification from a wide angle end state to a telephoto end state, the negative lens group GFA1 is moved toward the image side along the optical axis; the positive lens group GAF2, the front focusing group GFF, the aperture stop S and the rear focusing group GRF are moved along the optical axis toward the object side as one body; and the negative lens group GRB is moved toward the object side along the optical axis, such that a distance between the negative lens group GFA1 and the positive lens group GFA2 is reduced and a distance between the rear focusing group GRF and the negative lens group GRB is increased.

In the optical system according to the Eleventh Example, focusing from an infinitely distant object to a close distance object is carried out by moving the front focusing group GFF and the rear focusing group GRF along the optical axis toward the object side. Meanwhile, upon carrying out focusing, the negative lens group GFA1, the positive lens group GFA2, the aperture stop S and the negative lens group GRB are fixed in position.

Table 11 below shows various values of the magnification varying optical system according to the Eleventh Example. Meanwhile, in Table 10, W denotes a wide angle end state, M denotes an intermediate focal end state and T denotes a telephoto end state.

TABLE 11

Eleventh Example

[Surface Data]

| m | r | d | nd | vd |
|---|---|---|---|---|
| OP | ∞ | | 1.000000 | |
| 1) | 109.0633 | 2.7000 | 1.638540 | 55.34 |
| *2) | 18.2077 | 12.4865 | 1.000000 | |
| 3) | 495.8681 | 2.0000 | 1.832199 | 40.10 |
| *4) | 44.2568 | 9.5236 | 1.000000 | |
| 5) | 52.5025 | 4.8000 | 1.903658 | 31.31 |
| 6) | 159.6343 | variable | 1.000000 | |
| 7) | 57.0442 | 1.3000 | 1.903658 | 31.31 |
| 8) | 30.3255 | 4.5545 | 1.834000 | 37.18 |
| 9) | −195.4912 | variable | 1.000000 | |
| 10) | 34.2035 | 4.3182 | 1.487490 | 70.32 |
| 11) | −47.4756 | 2.2701 | 1.784696 | 26.29 |
| 12) | 111.8345 | variable | 1.000000 | |
| 13) (Stop S) | ∞ | 3.0000 | 1.000000 | |
| 14) (IP) | ∞ | variable | 1.000000 | |
| *15) | 47.8005 | 3.0298 | 1.801000 | 34.92 |
| *16) | −89.2527 | 1.3930 | 1.000000 | |
| 17) | 147.9048 | 1.2000 | 1.717000 | 47.97 |
| 18) | 18.1175 | 5.5049 | 1.497820 | 82.57 |
| 19) | −21.4691 | variable | 1.000000 | |
| *20) | −28.3302 | 1.3000 | 1.800999 | 34.97 |
| 21) | 40.6201 | 1.9545 | 1.000000 | |
| *22) | 42.1307 | 3.1144 | 1.516800 | 64.13 |
| 23) | ∞ | 19.0966 | 1.000000 | |
| 24) | ∞ | 1.6000 | 1.516800 | 64.13 |
| 25) | ∞ | variable | 1.000000 | |
| Image plane | ∞ | | | |

TABLE 11-continued

Eleventh Example

[Aspherical Surface Data]

| m | K | A4 | A6 | A8 |
|---|---|---|---|---|
| 2 | 0.0000 | 8.83674E-06 | 1.69121E-08 | -7.80852E-13 |

| | A10 | A12 | | |
|---|---|---|---|---|
| | -2.62893E-14 | 0.29153E-15 | | |

| m | K | A4 | A6 | A8 |
|---|---|---|---|---|
| 4 | 0.0000 | 4.63846E-06 | -4.54541E-09 | 8.68492E-12 |

| | A10 | A12 | | |
|---|---|---|---|---|
| | -6.95178E-14 | 0.99796E-16 | | |

| m | K | A4 | A6 | A8 |
|---|---|---|---|---|
| 15 | 0.0000 | -1.84011E-05 | -1.16137E-07 | 2.01508E-10 |

| | A10 | A12 | | |
|---|---|---|---|---|
| | -2.76953E-11 | -0.12398E-12 | | |

| m | K | A4 | A6 | A8 |
|---|---|---|---|---|
| 16 | 1.0000 | 2.48230E-06 | -1.38570E-08 | -4.12767E-09 |

| | A10 | A12 | | |
|---|---|---|---|---|
| | 5.44261E-11 | -0.60620E-12 | | |

| m | K | A4 | A6 | A8 |
|---|---|---|---|---|
| 20 | 0.0000 | 6.56671E-05 | -4.14077E-07 | 7.30290E-11 |

| | A10 | A12 | | |
|---|---|---|---|---|
| | 2.75237E-11 | -0.16734E-12 | | |

| m | K | A4 | A6 | A8 |
|---|---|---|---|---|
| 22 | 1.0000 | -9.56724E-05 | 5.39674E-07 | -2.04380E-09 |

| | A10 | A12 | | |
|---|---|---|---|---|
| | 1.77405E-14 | 0.25533E-13 | | |

[Various Data]

Variable Magnification Ratio   1.31707

| | W | M | T |
|---|---|---|---|
| f | 20.5000 | 23.87447 | 27.0000 |
| Fno | 3.98168 | 4.21631 | 4.45032 |
| 2ω | 99.4639 | | 78.1570 |
| Ymax | 22.10 | 22.10 | 22.10 |
| TL | 124.40748 | 117.05375 | 112.89064 |
| Air converted TL | 123.86228 | 116.50855 | 112.34544 |
| Bf | 21.65029 | 23.31104 | 25.1404 |
| Air converted Bf | 21.10509 | 22.76584 | 24.5952 |
| Ainf | 49.6919 | 43.47611 | 39.14618 |
| Amod | 49.31936 | 43.09172 | 38.74231 |

| | W INF | W CLO | T INF | T CLO |
|---|---|---|---|---|
| f | 20.5000 | | 27.0000 | |
| β | | -0.0971 | | -0.0976 |
| d0 | ∞ | 190.2532 | ∞ | 259.2733 |
| d6 | 19.4177 | 19.4177 | 3.0621 | 3.0622 |
| d9 | 5.8637 | 4.8842 | 5.8637 | 4.6753 |
| d12 | 4.0208 | 5.0002 | 4.0208 | 5.2088 |
| d14 | 5.4611 | 4.9170 | 5.4611 | 4.8304 |
| d19 | 3.5448 | 4.0891 | 4.8933 | 5.5240 |
| d25 | 0.9537 | 0.9537 | 4.4438 | 4.4438 |
| 2ω | 99.4639 | | 78.1570 | |
| ω | 49.7319 | | 39.0785 | |

[Lens Group Data]

| Group | Starting surface | W f | T f |
|---|---|---|---|
| GF | 1 | 53.8809 | 118.2665 |
| GR | 15 | 75.7150 | 66.6110 |
| GFA1 | 1 | -32.1287 | |
| GFA2 | 7 | 56.6718 | |
| GFA | 1 | 71.4662 | 199.6032 |
| GFF | 10 | 625.4485 | |
| GRF | 15 | 25.9374 | |
| GRB | 20 | -28.8034 | |

[Values for Conditional Expressions]

(1-1) XRF/XFF = 0.5556
(1-2) Bf/f = 1.0295
(1-3) ST/TL = 0.4086
(1-4) βRF/βFF = 0.2630
(1-5) (-fRB)/f = 1.4050
(1-6) Bf/TL = 0.1704
(1-7) XRF/f = 0.0266
(1-8) fRF/fFF = 11.0363
(1-9) fF/fR = 0.7116
(1-10) fFA/fFF = 0.1143 (wide angle end), 0.3191 (telephote end)
(1-11) f/fFF = 0.0328
(1-12) f/fRF = 0.7904
(1-13) TL/(Fno · Bf) = 1.4740
(1-14) |Ainf − Amod|/f = 0.0182
(1-15) vFFp − vFFn = 44.0300
(1-16) (FFr2 + FFr1)/(FFr2 − FFr1) = 0.1625
(1-17) nRBp − nRBn = 0.2842
(1-18) nRBp + 0.005vRBp = 1.8375
(1-19) nRBn + 0.005vRBn = 1.9758

Figure 22A:
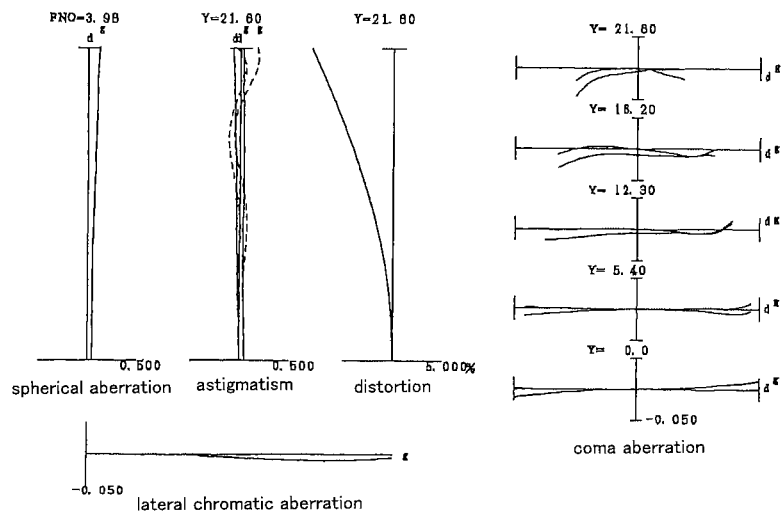
FIG. 22 is graphs showing various aberrations of the variable magnification optical system in a wide angle end state according to the Eleventh Example.
Figure 22B:
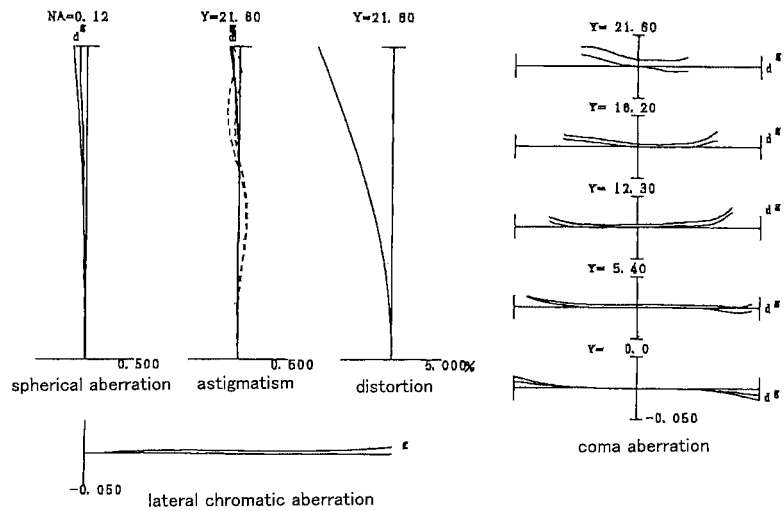

FIG. 22A and FIG. 22B are graphs showing various aberrations in a wide angle end state of the variable magnification optical system according to the Eleventh Example upon focusing on an infinite distance object and on a close distance object, respectively.

Figure 23A:
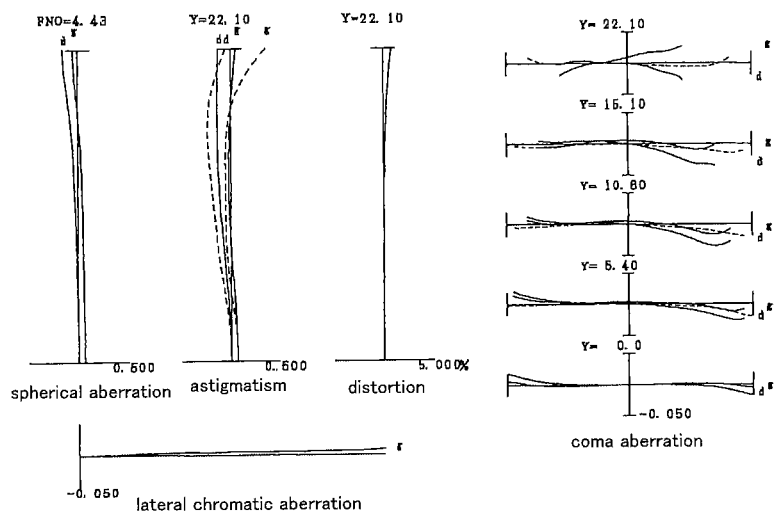
FIG. 23 is graphs showing various aberrations of the variable magnification optical system in a telephoto end state according to the Eleventh Example.
Figure 23B:
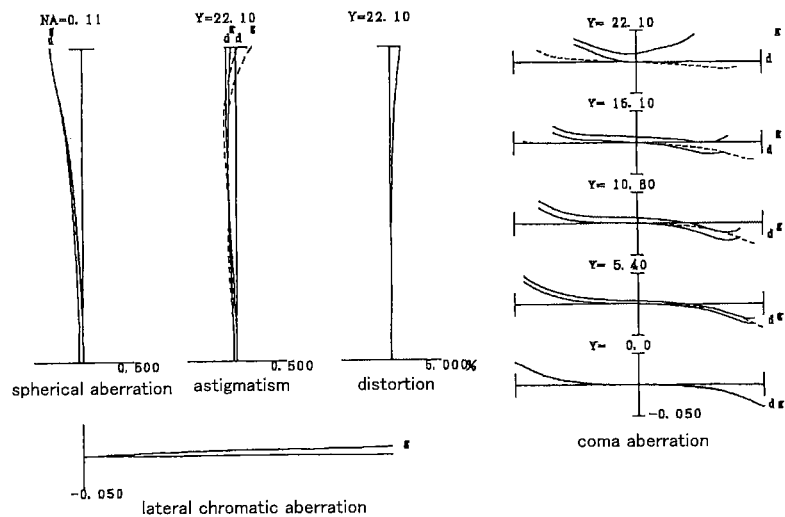

FIG. 23A and FIG. 23B are graphs showing various aberrations in a telephoto end state of the variable magnification optical system according to the Eleventh Example upon focusing on an infinitely distant object and on a close distance object, respectively.

As is apparent from the respective graphs, the optical system according to the present Example corrects superbly various aberrations and has excellent optical performance, from the time when an infinitely distant object is focused to the time when a close distance object is focused.

According to each of the above Examples, it is possible to realize an optical system which is suitable for a mirror-less camera and which can suppress variations in various aberrations upon carrying out focusing and has superb optical performance, while focusing group being reduced in weight.

Incidentally, it is noted that each of the above described Examples is a concrete example of the invention of the present application, and the invention of the present application is not limited to them. The contents described below can be adopted without deteriorating optical performance of the optical systems according to the first and second embodiments.

Although optical systems each having a 2 group configuration were illustrated above as numerical examples of the optical systems according to the first and second embodiments, the present application is not limited to them and optical systems having other configurations (for example, a 3 group configuration and the like) can be configured. Concretely, a lens configuration that a lens or a lens group is added to the most object side or to the most image side of the optical system of each Example described above is possible. Further, Examples in which the front lens group and the rear lens group each was composed of 2 or 3 group configuration, were illustrated, but the present application is not limited thereto, and any other configuration such as a 4 group configuration may be adopted. Concretely, in each of the above Examples, a lens or a lens group may be added at a most object side or at a most image side, or between the positive lens group and the front focusing group, in the front group, or at a most object side or at a most image side, or between the rear focusing group and the negative lens group in the rear group.

Further, in the optical system according to each Example described above, the front focusing group as well as the rear focusing group is made as focusing lens group. Such focusing lens group may be used for auto focus and suitably driven by a motor for auto focus, such as, ultra sonic motor, stepping motor, or VCM motor, and high speedy auto focus as well as quiet auto focus can be excellently attained.

Further, in the optical system according to each Example described above, any lens group in the entirety thereof or a portion thereof can be so moved, as a vibration reduction lens group, to have a component in a direction perpendicular to the optical axis, or rotationally moved (swayed) in an intra-plane direction including the optical axis to carry out vibration reduction.

Further, in the optical system according to each Example described above, an aperture stop may be substituted by a lens frame without disposing a member as an aperture stop.

Further, the lens surface (s) of the lenses configuring the optical system according to each Example described above, may be a spherical surface, a plane surface, or an aspherical surface.

Further, each lens may be made from glass material or resin material or mixture of glass material and resin material.

When a lens surface is an aspherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable.

When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Moreover, the lens surface(s) of the lenses configuring the optical system according to each Example described above, may be coated with anti-reflection coating(s). With this contrivance, it is feasible to reduce a flare as well as ghost and attain a high optical performance with high contrast. In particular, it is preferable that, in the optical system according to each Example described above, the object side lens surface of the second lens counted from the most object side is coated with anti-reflection coating.

Next, a camera equipped with the optical system according to the first and second embodiments, will be explained with referring to FIG. 24.

Figure 24:
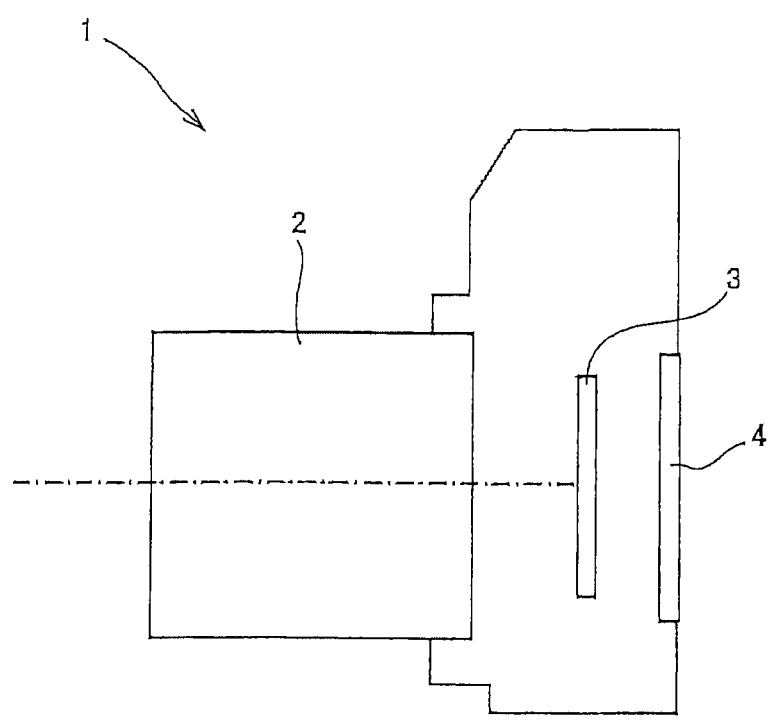
FIG. 24 is a view showing a configuration of a camera equipped with the optical system.

FIG. 24 shows a configuration of a camera equipped with the optical system according to the first and second embodiments of the present application. The camera 1, as shown in FIG. 24, is a lens changeable type mirror-less camera equipped with the optical system according to the First Example as an imaging lens 2.

In the present camera 1, light emitted from an unillustrated object (object to be photo taken) is converged by the imaging lens 2, through an unillustrated OLPF (optical low pass filter), and forms an object image on an imaging plane of an imaging portion 3. The object image is photoelectrically converted by a photoelectric conversion element provided on the imaging portion 3, thereby a picture image of the object to be phototaken being formed. This picture image is displayed on an EVF(electronic view finder) 4 provided in the camera. Accordingly, a photographer can observe the object image through the EVF 4.

When the photographer presses an unillustrated release button down, the picture image of the object generated in the imaging portion 3, is stored in an unillustrated memory as a photographed image of the object. In this manner, the photographer can take a picture of an object by the camera 1.

The present camera 1 in which the optical system according to the First Example, is installed as the imaging lens 2, is suitable for a mirror-less camera.

Accordingly, while the focusing group being reduced in weight, variations in various aberrations upon carrying out focusing can be suppressed, thus superb optical performance being attained.

Incidentally, even if an optical system according to each of the Second to the Eleventh Examples is installed as an imaging lens 2 in a camera, the same effect as the said camera 1 can be obtained. Further, even if an optical system according to each of the above Examples is installed in a camera which includes a quick return mirror and in which an object to be photographed is observed through a view finder optical system, the same effect as the above described camera 1 can be obtained.

Figure 25:
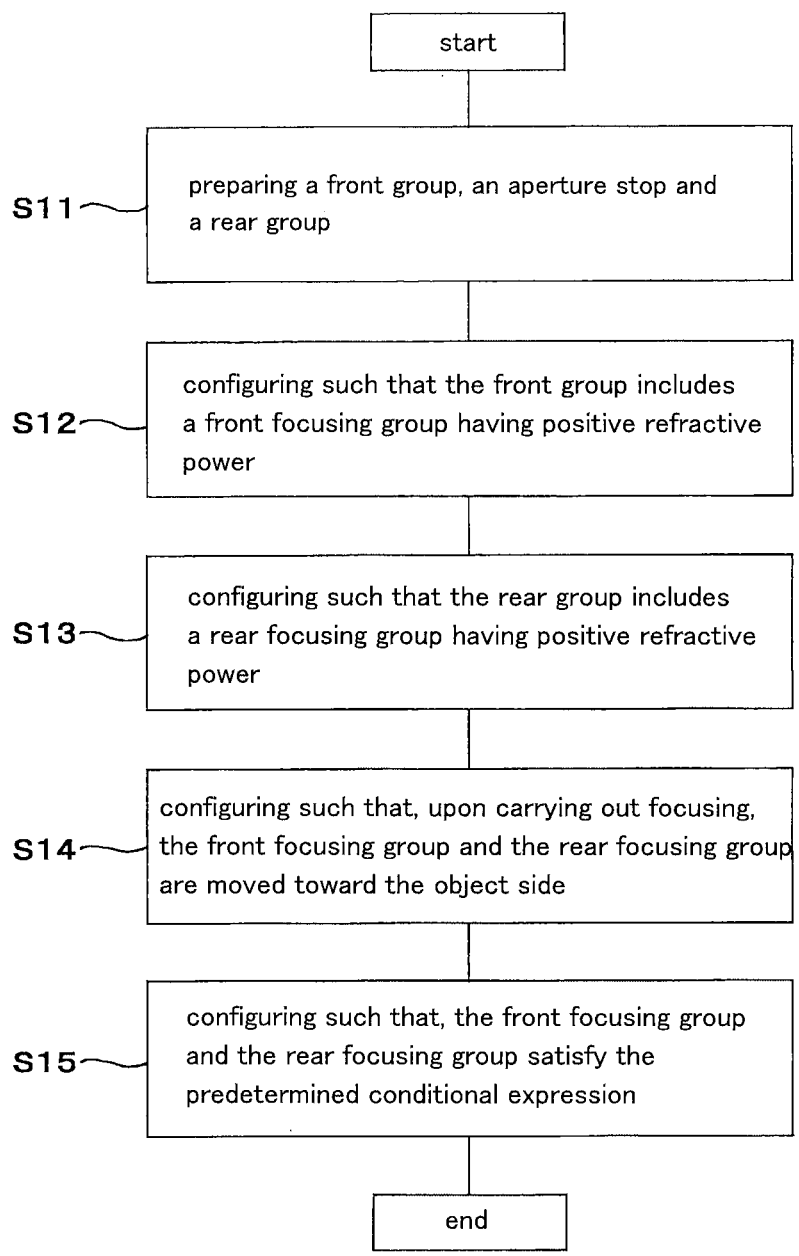
FIG. 25 is a schematic view showing a manufacturing method for an optical system.
Figure 26:
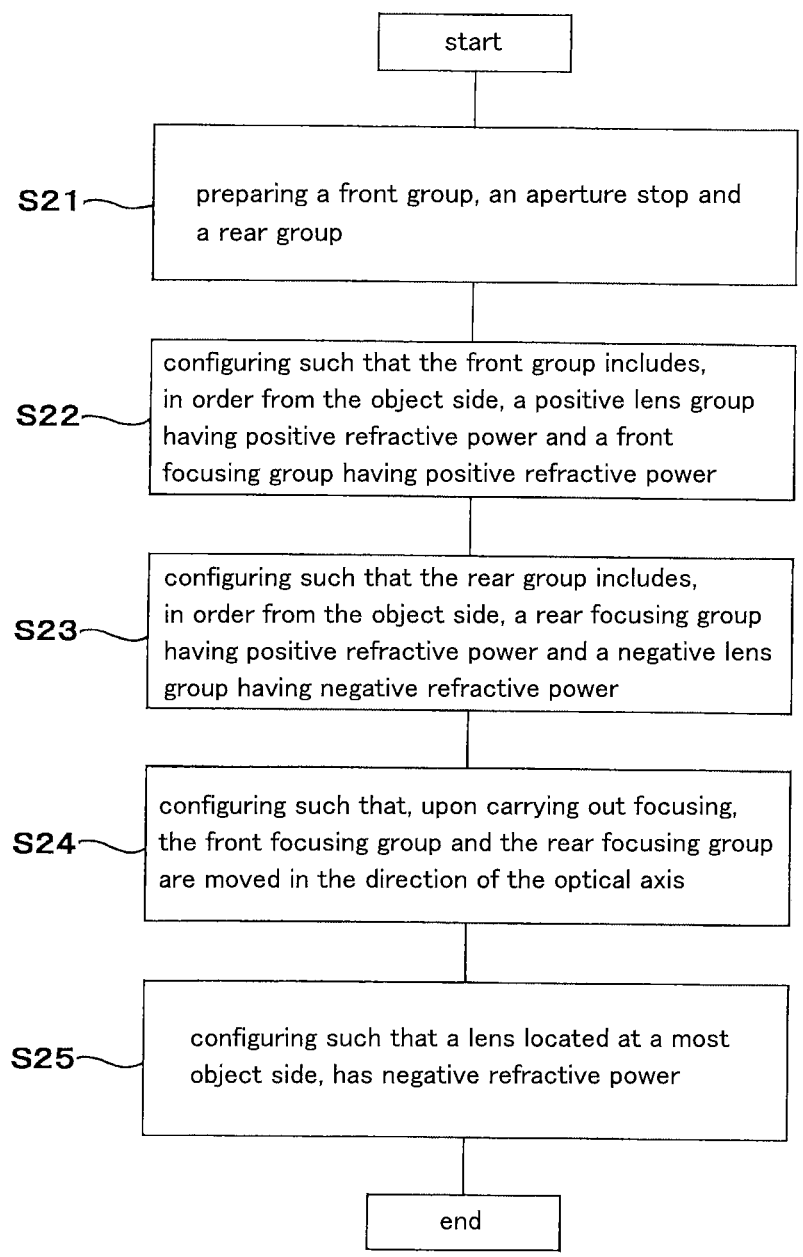
FIG. 26 is a schematic view showing a manufacturing method for an optical system.

Finally, an outline of a method for manufacturing an optical system according to each of the first and second embodiments of the present application, is described with referring to FIG. 25 and FIG. 26.

FIG. 25 is a flowchart showing an outline of a method for manufacturing an optical system according to the first embodiment.

The method for manufacturing the optical system according to the first embodiment shown in FIG. 25, is a method for manufacturing an optical system comprising, in order from an object side: a front group having positive refractive power, an aperture stop, a rear group; the method comprising the following steps S11 to S15:

Step S11: preparing the front group, the aperture stop and the rear group, and disposing them, in order from the object side, in a lens barrel.

Step S12: configuring such that the front group includes a front focusing group having positive refractive power.

Step S13: configuring such that the rear group includes a rear focusing group having positive refractive power.

Step S14: configuring such that, upon carrying out focusing, the front focusing group and the rear focusing group are moved toward the object side.

Step S15: configuring such that the front focusing group and the rear focusing group satisfy the following conditional expression (1-1):

$$0.250 < XRF/XFF < 1.500 \qquad (1\text{-}1),$$

where XFF denotes an amount of movement of the front focusing group upon carrying out focusing from an infinitely distant object to a closely distant object. and XRF denotes an amount of movement of the rear focusing group upon carrying out focusing from the infinitely distant object to the closely distant object.

According to such method for manufacturing an optical system according to the first embodiment, it is possible to manufacture an optical system which is suitably used for a mirror-less camera and whose focusing groups can be reduced in weight, while suppressing variations in various aberrations upon carrying out focusing and attaining superb optical performance.

FIG. 26 is a flowchart showing an outline of a method for manufacturing an optical system according to the second embodiment.

The method for manufacturing the optical system according to the second embodiment shown in FIG. 26, is a method for manufacturing an optical system comprising, in order from an object side: a front group having positive refractive power, an aperture stop, a rear group having positive refractive power; the method comprising the following steps S21 to S25:

Step S21: preparing the front group, the aperture stop and the rear group, and disposing them, in order from the object side, in a lens barrel.

Step S22: configuring such that the front group includes, in order from the object side, a positive lens group having positive refractive power and a front focusing group having positive refractive power.

Step S23: configuring such that the rear group includes, in order from the object side, a rear focusing group having positive refractive power and a negative lens group having negative refractive power.

Step 24: providing a known movement mechanism and configuring such that, upon carrying out focusing, the front focusing group and the rear focusing group are moved in the direction of the optical axis.

Step 25: configuring such that a lens located at a most object side, has negative refractive power.

According to such method for manufacturing an optical system according to the second embodiment, it is possible to manufacture an optical system which is suitably used for a mirror-less camera and whose focusing groups can be reduced in weight, while suppressing variations in various aberrations upon carrying out focusing and attaining superb optical performance.

What is claimed is:

1. An optical system comprises, in order from an object side, a front group having positive refractive power, an aperture stop, and a rear group;
    said front group including a front focusing group having positive refractive power;
    said rear group including a rear focusing group having positive refractive power;
    upon carrying out focusing, said front focusing group and said rear focusing group being moved toward the object side; and
    the following conditional expression being satisfied:

$0.250 < XRF/XFF < 1.500$ where XFF denotes an amount of movement of said front focusing group at the time of carrying out focusing from an infinitely distant object to a closely distant object;

and XRF denotes an amount of movement of said rear focusing group at the time of carrying out focusing from the infinitely distant object to the closely distant object.

2. An optical system according to claim 1, wherein, upon carrying out focusing, said aperture stop is fixed in position.

3. An optical system according to claim 1, wherein the following conditional expression is satisfied:

$0.400 < Bf/f < 2.000$ where Bf denotes a distance from an image side lens surface of a lens located at the most image side upon focusing on an infinitely distant object to the image plane; and f denotes a focal length of said optical system upon focusing on the infinitely distant object.

4. An optical system according to claim 1, wherein the following conditional expression is satisfied:

$0.100 < ST/TL < 0.600$ where ST denotes a distance from said aperture stop to the image plane at the time when an infinitely distant object is focused; and TL denotes a distance from an object side lens surface of said most object side lens to the image plane at the time when the infinitely distant object is focused.

5. An optical system according to claim 1, wherein the following conditional expression is satisfied:

$0.200 < \beta RF/\beta FF < 1.100$ where BFF denotes a magnification of said front focusing group; and BRF denote a magnification of said rear focusing group.

6. An optical system according to claim 1, wherein upon carrying out focusing, said lens group located at the most object side is fixed in position.

7. An optical system according to claim 1, wherein, upon carrying out focusing, said lens group located at the most image side is fixed in position.

8. An optical system according to claim 1, wherein said front focusing group includes at least one positive lens and at least one negative lens.

9. An optical system according to claim 1, wherein said rear focusing group includes at least one positive lens and at least one negative lens.

10. An optical system according to claim 1, wherein said rear group includes, in order from the object side, said rear focusing group and a negative lens group which has a negative refractive power.

11. An optical system according to claim 1, wherein said rear group includes, in order from the object side, said rear focusing group and a negative lens group which has a negative refractive power, and
    the following conditional expression is satisfied:

$0.800 < (-fRB)/f < 10.000$ where fRB denotes a focal length of said negative lens group; and f denotes a focal length of said optical system upon focusing on the infinitely distant object.

12. An optical system according to claim 1, wherein the following conditional expression is satisfied:

$0.060 < Bf/TL < 0.650$ where Bf denotes a distance from an image side lens surface of a lens located on the most image side upon focusing on an infinitely distant object to the image plane; and TL denotes a distance from an object side lens surface of said lens located on the most object side upon focusing on the infinitely distant object to the image plane.

13. An optical system according to claim 1, wherein the following conditional expression is satisfied:

$$0.010 < XRF/f < 0.240$$

where XRF denotes an amount of movement of said rear focusing group at the time of carrying out focusing from the infinitely distant object to the closely distant object; and f denotes the focal length of said optical system upon focusing on the infinitely distant object.

14. An optical system according to claim 1, wherein a lens located on the most object side has negative refractive power.

15. An optical system according to claim 1, wherein said rear group has positive refractive power.

16. An optical system according to claim 1, wherein the following conditional expression is satisfied:

$$0.010 < fRF/fFF < 0.900$$

where fFF denotes a focal length of said front focusing group; and fRF denotes a focal length of said rear focusing group.

17. An optical system according to claim 1, wherein the following conditional expression is satisfied:

$$0.300 < fF/fR < 1.300$$

where fF denotes a focal length of said front group upon focusing on an infinitely distant object; and fR denotes a focal length of said rear group upon focusing on the infinitely distant object.

18. An optical system according to claim 1, wherein said front group includes, in order from the object side, a positive lens group having positive refractive power and said front focusing group.

19. An optical system according to claim 1, wherein said front group includes, in order from the object side, a positive lens group having positive refractive power and said front focusing group; and
the following conditional expression is satisfied:

$$0.010 < fFA/fFF < 0.750$$

where fFA denotes a focal length of said positive lens group; and fFF denotes a focal length of said front focusing group.

20. An optical system according to claim 1, wherein the following conditional expression is satisfied:

$$0.010 < f/fFF < 0.300$$

where f denotes a focal length of said optical system upon focusing on an infinitely distant object; and fFF denotes a focal length of said front focusing group.

21. An optical system according to claim 1, wherein the following conditional expression is satisfied:

$$0.300 < f/fRF < 1.100$$

where f denotes a focal length of said optical system upon focusing on the infinitely distant object; and fRF denotes a focal length of said rear focusing group.

22. An optical system according to claim 1, wherein the following conditional expression is satisfied:

$$0.800 < TL/(Fno \cdot Bf) < 6.000$$

where TL denotes a distance from an object side lens surface of a lens located on the most object side upon focusing on the infinitely distant object to the image plane; Fno denotes a full open F-number of said optical system; and Bf denotes a distance from an image side lens surface of a lens located on the most image side upon focusing on the infinitely distant object to the image plane.

23. An optical system according to claim 1, wherein the following conditional expression is satisfied:

$$|Ainf - Amod|/f < 0.070$$

where Ainf denotes a half angle of view of said optical system upon focusing on an infinitely distant object; and Amod denotes a half angle of view of said optical system upon focusing on an extremely close distant object.

24. An optical system according to claim 1, wherein said front focusing group consists of one positive lens and one negative lens; and
the following conditional expression is satisfied:

$$30.00 < vFFp - vFFn < 75.00$$

where vFFp denotes an Abbe number of said positive lens in said front focusing group; and vFFn denotes an Abbe number of said negative lens in said front focusing group.

25. An optical system according to claim 1, wherein the following conditional expression is satisfied:

$$-1.000 < (FFr2 + FFr1)/(FFr2 - FFr1) < 2.000$$

where FFr1 denotes a radius of curvature of an object side lens surface of a positive lens located at a most image side in said front focusing group; and FFr2 denotes a radius of curvature of an image side lens surface of the positive lens located at the most image side in said front focusing group.

26. An optical system according to claim 1, wherein the following conditional expression is satisfied:

$$0.030 < nRBp - nRBn$$

where nRBp denotes a refractive index of a positive lens in a lens group located at a most image side; and nRBn denotes a refractive index of a negative lens in the lens group located at the most image side.

27. An optical system according to claim 1, wherein the following conditional expressions are satisfied:

$$1.000 < nRBp + 0.005vRBp < 2.500$$

$$1.000 < nRBn + 0.005vRBn < 2.500$$

where nRBp denotes a refractive index of a positive lens in a lens group located at a most image side; nRBn denotes a refractive index of a negative lens in the lens group located at the most image side; vRBp denotes an Abbe number of the positive lens in the lens group located at the most image side; and vRBn denotes an Abbe number of the negative lens in the lens group located at the most image side.

28. An optical equipment equipped with the optical system according to claim 1.

29. A method for manufacturing one of a first optical system and a second optical system:
the first optical system configuring to comprise, in order from an object side, a first front group having positive refractive power, a first aperture stop, and a first rear group;
for said first front group to comprise a first front focusing group having positive refractive power;
for said first rear group to comprise a first rear focusing group having positive refractive power;

upon carrying out focusing, for said first front focusing group and said first rear focusing group to be moved toward the object side; and for the following conditional expression to be satisfied:

$$0.250 < XRF/XFF < 1.500$$

where XFF denotes an amount of movement of said first front focusing group at the time of carrying out focusing from an infinitely distant object to a closely distant object; and XRF denotes an amount of movement of said first rear focusing group at the time of carrying out focusing from the infinitely distant object to the closely distant object; and the second optical system configuring to comprise, in order from an object side, a second front group having positive refractive power, a second aperture stop, and a second rear group having positive refractive power;

for said second front group to comprise, in order from the object side, a second positive lens group having positive refractive power and a second front focusing group having positive refractive power;

for said second rear group to comprise, in order from the object side, a second rear focusing group having positive refractive power and a second negative lens group having negative refractive power;

upon carrying out focusing, for said second front focusing group and said second rear focusing group to be moved in the direction of the optical axis of said second optical system; and for a lens located at a most object side to have negative refractive power.

* * * * *